(12) United States Patent
Watanabe et al.

(10) Patent No.: US 6,324,554 B1
(45) Date of Patent: *Nov. 27, 2001

(54) CHARACTER PROCESSING APPARATUS

(75) Inventors: Yasuhiro Watanabe, Yokohama; Takahiro Kato, Tokyo; Masayuki Utsumi, Tokyo; Masaka Hamada, Tokyo; Hiroshi Takakura, Yokohama; Taketo Hasegawa, Tokyo; Masaaki Shimizu, Sagamihara; Masaki Sagoh, Kawasaki; Fumio Furukawa, Tokyo; Yasuhisa Ishizawa, Yokohama; Takashi Minagawa, Yokohama; Kensaku Tanaka, Yokohama; Kenzoh Ina, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/451,002

(22) Filed: May 25, 1995

Related U.S. Application Data

(63) Continuation of application No. 07/825,405, filed on Jan. 24, 1992, now abandoned, which is a continuation of application No. 07/588,946, filed on Sep. 27, 1990, now abandoned, which is a division of application No. 07/304,000, filed on Jan. 31, 1989, now Pat. No. 5,018,083, which is a continuation of application No. 06/797,831, filed on Nov. 13, 1985, now abandoned.

(30) Foreign Application Priority Data

| Nov. 14, 1984 | (JP) | 59-239993 |
|---|---|---|
| Nov. 14, 1984 | (JP) | 59-239994 |
| Nov. 19, 1984 | (JP) | 59-243914 |
| Nov. 19, 1984 | (JP) | 59-243915 |
| Nov. 19, 1984 | (JP) | 59-243916 |
| Nov. 19, 1984 | (JP) | 59-243917 |
| Nov. 19, 1984 | (JP) | 59-243918 |
| Nov. 19, 1984 | (JP) | 59-243919 |
| Nov. 19, 1984 | (JP) | 59-243920 |
| Nov. 19, 1984 | (JP) | 59-243921 |

(51) Int. Cl.$^7$ .................................................. G06F 17/21
(52) U.S. Cl. ..................... 707/517; 707/523; 345/348
(58) Field of Search ................... 395/144–151, 395/155, 161, 785, 353, 779, 766–768, 352, 348; 707/500, 517, 522, 523, 530, 531; 345/348–350

(56) References Cited

U.S. PATENT DOCUMENTS 4,028,681 * 6/1977 Vittorelli .......................... 364/900 X (List continued on next page.)

FOREIGN PATENT DOCUMENTS

| 3411939 | 10/1984 | (DE) . |
| 0094494 | 11/1983 | (EP) . |

OTHER PUBLICATIONS

Smith et al., Designing the Star User Interface, BYTE, Apr. 1982, pp. 242–282, Apr. 1982.*

(List continued on next page.)

Primary Examiner—Joseph H. Feild
(74) Attorney, Agent, or Firm—Fitzpatrick, Cella, Harper & Scinto

(57) ABSTRACT

A character processing apparatus provides improved layout and formatting. In a preferred embodiment, the character processing apparatus includes a character data memory for storing a plurality of groups of character data, a first format data memory for storing a plurality of format data each having a correspondence with a different one of the groups of character data and a second format data memory for storing a plurality of format data having no correspondence with character data. The apparatus designates either one of (a) the groups of character data stored in the character data memory and (b) the plurality of format data stored in the first format data memory, and further designates one of the plurality of format data stored in the second format data memory.

45 Claims, 49 Drawing Sheets

U.S. PATENT DOCUMENTS

| | | | | |
|---|---|---|---|---|
| 4,310,840 | * | 1/1982 | Williams et al. | 364/900 X |
| 4,417,322 | * | 11/1983 | Berry et al. | 395/785 |
| 4,433,377 | * | 2/1984 | Eustis et al. | 364/200 X |
| 4,451,900 | * | 5/1984 | Mayer et al. | 395/145 |
| 4,470,129 | * | 9/1984 | Disbrow et al. | 395/785 |
| 4,538,183 | * | 8/1985 | Kanno et al. | 364/523 X |
| 4,539,653 | * | 9/1985 | Bartlett et al. | 395/148 |
| 4,581,710 | * | 4/1986 | Hasselmeier | 364/523 |
| 4,587,631 | * | 5/1986 | Nielson et al. | 395/146 |
| 4,642,790 | * | 2/1987 | Minshull et al. | 395/158 |
| 4,688,167 | * | 8/1987 | Agarwal | 395/155 X |
| 4,692,757 | * | 9/1987 | Tsuhara et al. | 345/116 |
| 4,712,191 | * | 12/1987 | Penna | 395/353 |
| 4,751,740 | * | 6/1988 | Wright | 395/785 |
| 5,276,792 | * | 1/1994 | Masaki | 395/146 |

OTHER PUBLICATIONS

Nelson, Computer Lib / Dream Machines, p. DM19, DM31, DM51, 1974.*

Laurie, The Joy of Computers, 1983, pp. 46–47, 98–99.*

S. M. Goldwasser, "Page Composition Of Continuous Tone Imagery", IEEE Computer Society Conference On Pattern Recognition And Image Processing, Jun. 1982, pp. 411–419.

R. S. M. Wulff, "Multiple Micros Distribute Text And Graphics Functions", Computer Design, vol. 23, No. 12, Oct. 1984, pp. 141–147.

"Multiple Micros Distribute Text And Graphics Functions", R. S. M. Wulff, Computer Design, vol. 23, No. 12, Oct. 1984, pp. 141–147.

"Electronic Composition System", J. S. Greenberg, et al., IEEE Transactions on Aerospace and Electronic Systems, vol.AES–6, No. 3, May 1970 pp. 270–275.

"MFS: A Modular Text Formatting System", J. D. Mooney, AFIPS Conference Proceedings, 7th–10th Jun. 1982, pp. 529–535.

"Page Composition Of Continuous Tone Imagery", Goldwasser, et al., Computer Vision, Graphics And Image Processing, vol. 26, No. 1, Apr. 1984, pp. 30–44.

K. Assmann et al., "Software Tools for the Development of Pictorial Information Systems in Medicine—the ISQL Experience", NATO Advanced Study Institute on Pictorial Information Systems in Medicine, Aug. 27–Sep. 7, 1984 (pp. 334–355).

S. Goldwasser et al., "Page Composition of Continuous Tone Imagery", Institute of Electrical and Electronics Engineers, 1982, pp. 411–419.

* cited by examiner

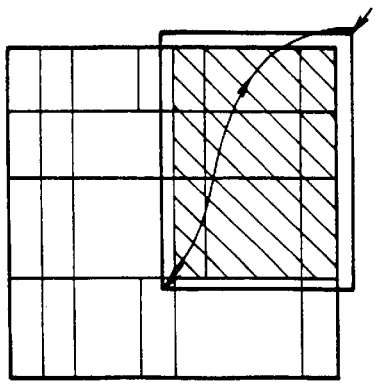
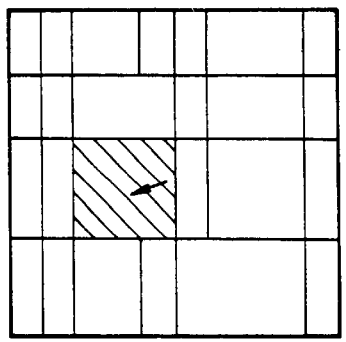
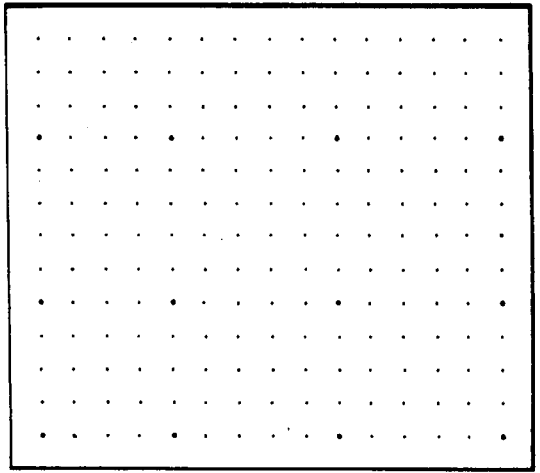
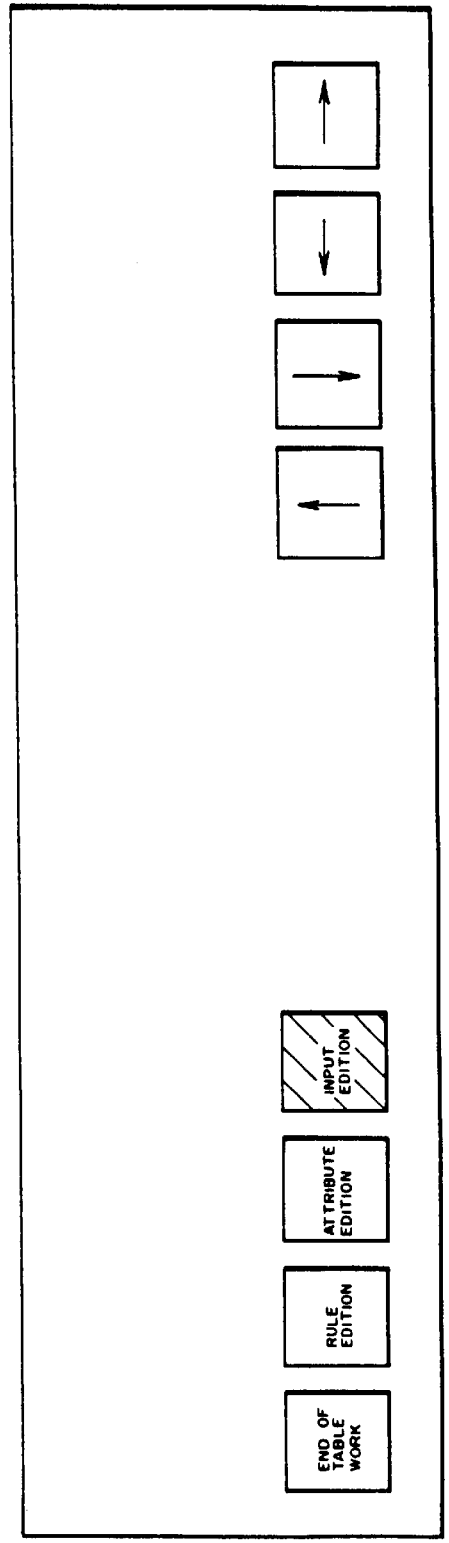

FIG. 16

| CHARACTER CODE | | JAPANESE | ALPHANUMERI CHARACTER AND KATAKANA | LEFT AND RIGHT ALIGNMENT | LEFT | RIGHT | CENTERING | EQUAL DIVISION | |
|---|---|---|---|---|---|---|---|---|---|
| DIRECTION | | VERTICAL | HORIZONTAL | UP AND DOWN ALIGNMENT | UPWARD | DOWNWARD | CENTERING | EQUAL DIVISION | DECIMAL POINT |
| CHARACTER STYLE | | MING | GOTHIC | MARGIN | NONE | NARROW | MEDIUM | WIDE | |
| CHARACTER SIZE | | | xx. x P | SPACE BETWEEN LINES | NONE | NARROW | MEDIUM | WIDE | MESH |
| | | | | | | | | | x x |

| END OF TABLE WORK | RULE EDITION | ATTRIBUTE EDITION | INPUT EDITION | ATTRIBUTE REFERENCE | ATTRIBUTE ASSIGNMENT |

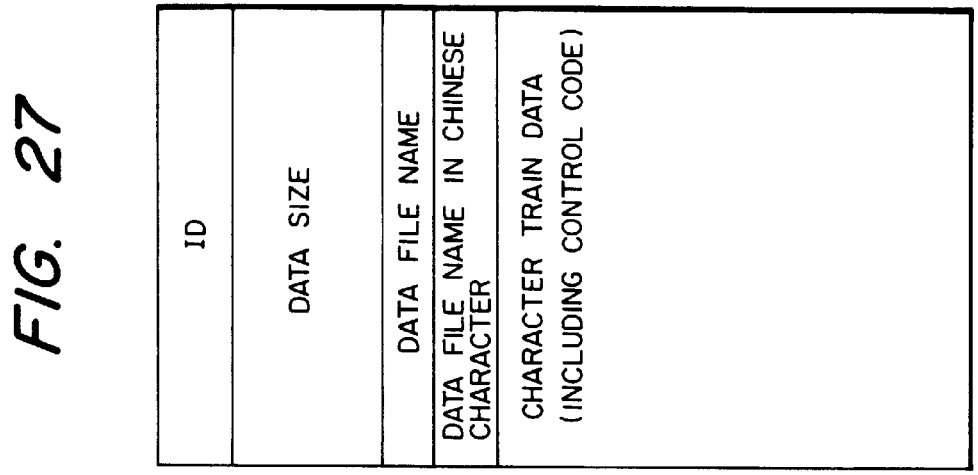
FIG. 27
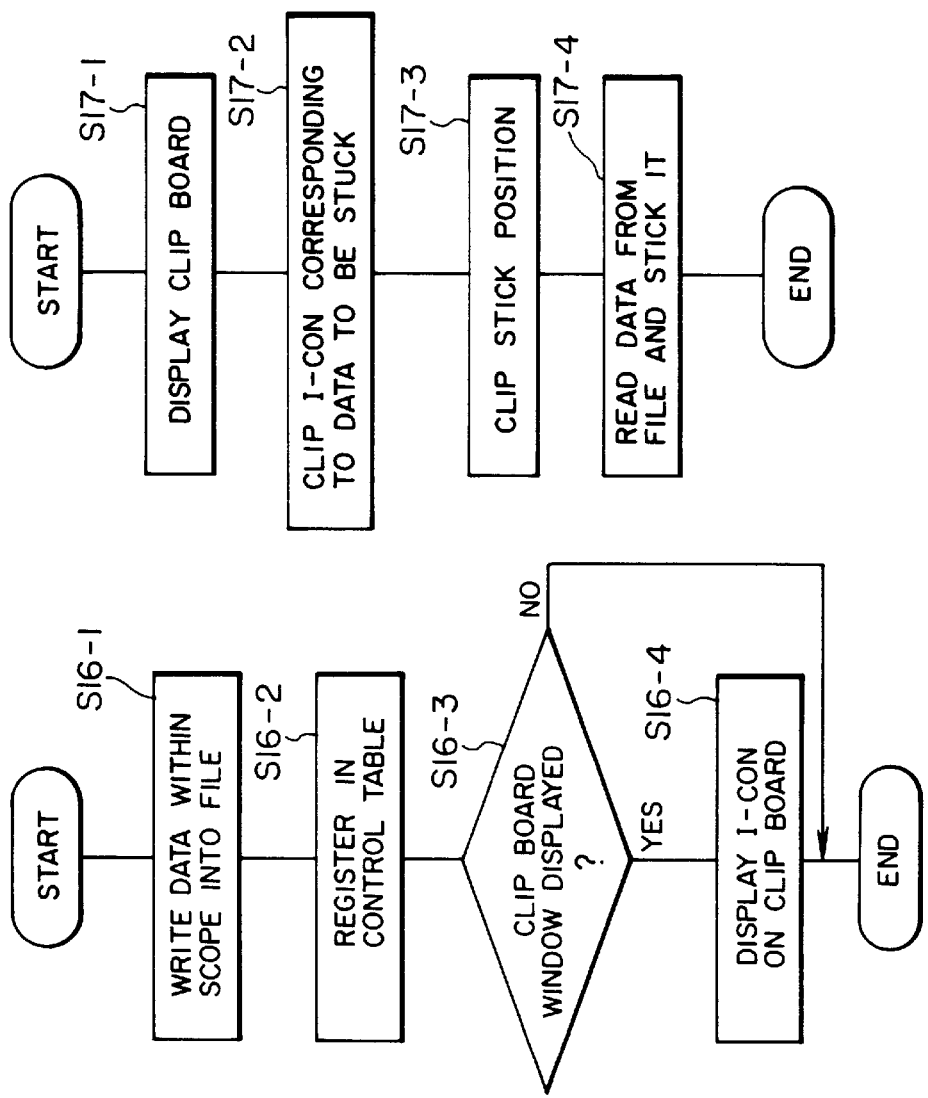
FIG. 26B
FIG. 26A

FIG. 28-1

THIS IS A HEADLINE. THE FOLLOWING IS A BODY.

FIG. 28-5

THIS IS A HEADLINE. THE FOLLOWING IS A BODY.

BEGINNING OF BIG HEADLINE

END OF BIG HEADLINE

FIG. 28-2

THIS IS A HEADLINE.    THE FOLLOWING
IS A BODY. ⌐CR

AR

HIRAGANA/CLAUSE | LAY-OUT | FORMAT | ABBR REGISTRATION
FIGURE | RESERVATION
TABLE WORK | RESTART | ↑ PAGE

BIG HEADLINE | MIDDLE HEADLINE | SUBHEAD

WRITING PAD | GRAPH PAPER | TABLE WORK | GRAPH WORK | SIDE DESK | LITTER BOX | CABINET | PRINTER | READER    ⇩

FIG. 28-4

| HEAD (1/10mm) | |
|---|---|
| BINDING MARGIN (1/10mm) | |
| COLUMN NUMBER | COLUMN ALIGNMENT |
| LINE LENGTH (CHARACTER NUMBER IN BODY) | |
| LINE NUMBER (IN BODY) | |
| SPACE BETWEEN COLUMNS (1/10mm) | |
| --- | --- |
| CHARACTER POINT NUMBER | CHARACTER STYLE NUMBER |
| SPACE BETWEEN CHARACTERS (1/10 P) | |
| LINE SPACING (1/10 P) | |
| PARAGRAPH INDENTION | (BLANK) |

⎫ P-I

| COLUMN OMISSION NUMBER | FLAG TRAIN |
|---|---|
| HEADLINE NUMBER STYLE | ALIGNMENT |
| --- | --- |
| CHARACTER POINT NUMBER | CHARACTER STYLE NUMBER |
| SPACE BETWEEN CHARACTERS (1/10 P) | |
| SPACE BETWEEN LINES (1/10 P) | |
| CHARACTER SPACE (CHARACTER NUMBER) | |
| CHARACTER DOWN (1/10mm) | |
| FRONT SPACE (1/10mm) | |
| BACK SPACE (1/10mm) | |
| COLUMN END RULE (LINE NUMBER) | |

⎫ P-II

| FLAG TRAIN | ALIGNMENT |
|---|---|
| POSITION (1/10mm) | |
| OFFSET (1/10mm) | |
| --- | --- |
| CHARACTER POINT NUMBER | CHARACTER STYLE NUMBER |
| SPACE BETWEEN CHARACTERS (1/10 P) | |
| CHARACTER SPACE (CHARACTER NUMBER) | |
| CHARACTER TRAIN | (BLANK) |

⎫ P-III

| FLAG TRAIN | ALIGNMENT |
|---|---|
| POSITION (1/10mm) | |
| OFFSET (1/10mm) | |
| --- | --- |
| CHARACTER POINT NUMBER | CHARACTER STYLE NUMBER |
| KIND OF SYMBOL | (BLANK) |

⎫ P-IV

LEFT PAGE          RIGHT PAGE

FIG. 36

| PRIORITY | KIND OF LINE |
|---|---|
| FRAME ATTRIBUTE FLAG ||
| PAGE NUMBER/FLOATING BLOCK NUMBER ||
| FRAME LEFT TOP COORDINATES X ||
| FRAME LEFT TOP COORDINATES Y ||
| FRAME WIDTH ||
| FRAME HEIGHT ||
| SUB FRAME WIDTH ||
| FORMAT DEFINITION ADDRESS ||
| DOCUMENT DATA ADDRESS ||
| FIGURE DATA ADDRESS ||
| SUB-FRAME DATA ADDRESS ||
| IMAGE DATA FILE NAME ||

FRAME ATTRIBUTE FLAG

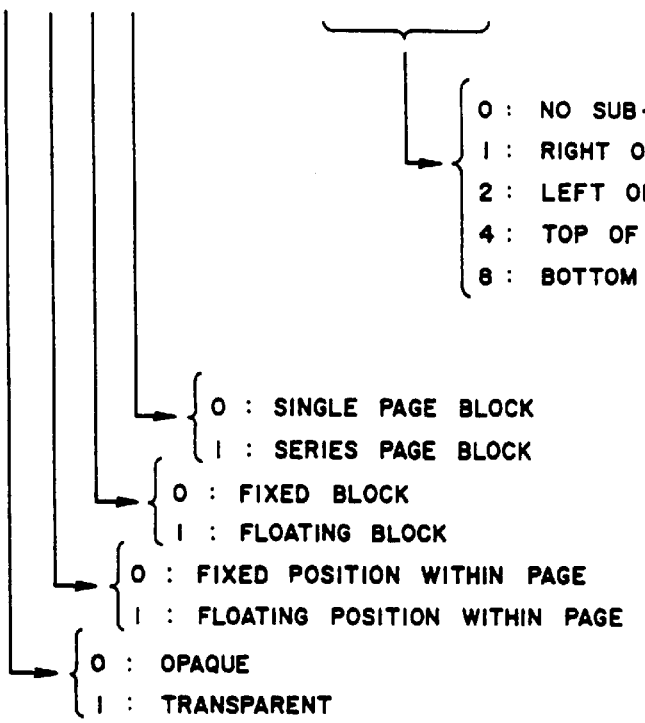

- 0 : NO SUB-FRAME
- 1 : RIGHT OF BLOCK
- 2 : LEFT OF BLOCK
- 4 : TOP OF BLOCK
- 8 : BOTTOM OF BLOCK

- 0 : SINGLE PAGE BLOCK
- 1 : SERIES PAGE BLOCK

- 0 : FIXED BLOCK
- 1 : FLOATING BLOCK

- 0 : FIXED POSITION WITHIN PAGE
- 1 : FLOATING POSITION WITHIN PAGE

- 0 : OPAQUE
- 1 : TRANSPARENT

CHARACTER PROCESSING APPARATUS

This application is a continuation of application Ser. No. 07/825,405 filed Jan. 24, 1992, now abandoned, which was a continuation of application Ser. No. 07/588,946 filed Sep. 27, 1990, now abandoned, which was a division of application Ser. No. 07/304,000 filed Jan. 31, 1989, now U.S. Pat. No. 5,018,083, which was a continuation of application Ser. No. 06/797,831 filed Nov. 13, 1985 now abandoned.

BACKGROUND OF THE INVENTION

1. Field of the Invention

The present invention relates to a document editing system which inputs, edits, produces, prints and outputs a document and, more particularly, to an advanced image processing system in which a beautiful style is aligned on the basis of a print type set-up rule and also edits different information such as figures, images, tables, graphs, etc.

The invention also relates to an image processing system which can synthesize document data (including images, graphs, etc.) and perform the type set-up process or the like and having a function to print and output the document data and, more particularly, to an image processing system which can display or print the number of lines for every predetermined lines.

The present invention also relates to an image processing system which can edit document data (including image data or the like) and print an output or display the document data and, more particularly, to an image processing system in which a working efficiency is improved by the cutting and pasting of the data.

Further, the invention relates to an image processing system which inputs and edits document images and, more particularly, to an advanced image processing system in which a beautiful style including headlines, page number, catchwords, etc. is aligned on the basis of a type set-up rule and also different information such as figures, images, tables, graphs, etc. is edited.

2. Description of the Prior Art

Recently, the use of word processors has become widespread and the document inputting works are being mechanized and rationalized; however, the rationalization is limited to the inputting works of the character train such as in the case of the Katakana-Chinese character conversion, Romaji-Chinese character conversion, or the like. Therefore, an output apparatus of a high resolution to print a high-grade document, namely, a document which is beautiful and easy to read is not presented yet. In addition, existing output apparatuses do not have performance of what is called a type of set-up rule in the print field, such as a device of arrangement of characters or the like. Therefore, it is difficult to make a document in excess of a constant print level.

On one hand, in the print field, a great amount of know-how of type set-up depends on the manual works such as arrangement of characters, style of column set-up, and the like which have been accumulated as knowledge of specialists. Complicated steps are required to make a high-grade document, resulting in high cost. Particularly, the produced document has a problem such that it can be proofread only after it has once been outputted as a form of a galley proof or the like and it is repeatedly corrected, so that a long step is repeated.

For example, when a two-sided output is now considered, the arrangement of body, catchwords, Nombre, and the like is not decided in consideration of symmetry with respect to the front side and back side of a print or recording paper or to the binding margins of both of right and left double spread pages when they are bound. On one hand, type set-up machines which are used in the print field do not automatically perform those processes; therefore, it is necessary to input complicated development (print) position parameters for every page.

In addition, hitherto, there has not been presented an apparatus which adds the line number of character train, namely, what is called a line counter to a document and outputs the document when a document is inputted, edited, and displayed or printed and outputted.

Although an apparatus having functions to cut and paste data has been conventionally presented, it is difficult to discriminate from which data the cut data was taken out because of an i-con of the constant style. With respect to data to be pasted as well, it is difficult to discriminate which data should be pasted to obtain a desired data.

For example, in the case where tables, photographs, figures, etc. are laid out in sentences with information processing apparatuses for making a document or the like, it is difficult to make the document since the explanatory sentences, comments, or the like to describe those image data are influenced when the sentences are reedited.

SUMMARY OF THE INVENTION

It is therefore an object of the present invention to provide an information processing system in which addition information to be added to information which is inputted from input means is set and both of the input information and the addition information can be easily handled, in consideration of the above-mentioned points.

It is an object of the present invention to provide an image processing system in which methods of typesetting and its arrangement and print format based on the print type set-up rule such as definition of format parameters, table work, small work, etc. are displayed on a display, and a method of editing a document rapidly can also be realized using a keyboard and a pointing device with respect to an arbitrary area on the display screen or an area which is formed in that area by a frame spacing in consideration of the conventional technologies.

Another object of the invention is to provide an image processing system comprising: output means for printing at least a document or images on a page unit basis; control means for developing the document in accordance with a print type set-up rule by the use of format parameters such as a print format, a column set-up style, and the like which are preliminarily defined to constitute the document which is outputted by the output means; display means for displaying the document whose style was coordinated equivalently to the print output; and editing means for performing document edition such as character input, movement, copy, insertion, deletion, replacement, etc. with regard to the document displayed by the display means by the use of a keyboard and a pointing device, and thereby always reflecting the print state after conversion.

Still another object of the invention is to provide an image processing system having lay-out processing means for frame spacing, pasting, frame movement, frame deletion, cut, etc. in order to synthesize information such as figures, image tables, graphs, etc. which are different from characters and being capable of displaying and editing document data with a style which is equal to the print output with regard to those synthesized documents.

Still another object of the invention is to provide an image processing system in which the document edition such as character input, movement, copy, insertion, deletion, replacement, etc. with regard to the document on the display, and the command processes regarding the format and type set-up, and the like can be executed by any one of a keyboard and a Mouse.

Still another object of the invention is to provide an image processing system in which when a document is outputted, the line number is added to the document for every predetermined lines and then the document is outputted, in consideration of the above-mentioned points.

Still another object of the invention is to provide an image processing system in which when data which mixedly includes document data and image data is outputted, a line counter is accurately added for every predetermined number of lines without counting the area of the image data.

Still another object of the invention is to provide an image processing system in which a virtual window where the cut data is pasted is provided, and both information indicating from which data the cut data was taken out and information representative of the kind of the cut data are displayed in the virtual window so that this information can be discriminated, in consideration of the above-mentioned points.

Still another object of the invention is to provide a method of editing a document at a high response speed whereby methods of typesetting and its arrangement and its print format, etc. based on a type set-up rule such as definition of format parameters, headlines, page numbers, catchwords, etc. are displayed on a display and a document is edited at a high response speed using a keyboard and a pointing device and, more particularly, to provide an image processing system which can extremely efficiently print headlines, catchwords, page numbers, etc. in accordance with a format and right and left pages, in consideration of the conventional technologies.

Still another object of the invention is to provide an image processing system in which format definition is adopted and the output of the style which is unified throughout the whole documents can be obtained by once inputting the format definition parameter, and the style of the whole documents can be easily changed by changing only the document definition.

Still another object of the invention is to provide an image processing system comprising: output means for outputting a document or images; control means for developing the document images in accordance with a type set-up rule by the use of format parameters such as print format, column set-up style, and the like which are preliminarily defined in order to constitute the document which is outputted by the output means; display means for displaying the document whose style was coordinated equivalently to the above-mentioned output; and editing means for performing the document edition such as character image input, movement, copy, insertion, deletion, replacement, etc. with regard to the document displayed by the display means by the use of a keyboard and a pointing device, and thereby always reflecting the print state after conversion.

Still another object of the invention is to provide an image processing system in which the document and image edition such as character input, movement, copy, insertion, deletion, replacement, etc. with respect to document images on the display, and the command processes regarding format and type set-up, and the like can be also executed by any one of a keyboard and a Mouse.

BRIEF DESCRIPTION OF THE DRAWINGS

FIG. 1-2 is a block diagram showing an image editing apparatus;

FIG. 1-3 is a diagram showing a simple memory map in a program memory (PMEM).

FIG. 2 is an explanatory diagram showing a part of data which is stored in a disk device H8;

FIG. 3 is an explanatory diagram of format data which is stored in a format file 10 shown in FIG. 2;

FIGS. 6-1 to 6-4 are diagrams showing a flow of display in inputting a column style.

FIG. 15 is an explanatory diagram of a grid;

FIG. 16 is an explanatory diagram of the attribute edition;

FIGS. 17A and 17B are explanatory diagrams of cells;

FIG. 18 is an explanatory diagram of the input edition;

FIGS. 26A and 26B are diagrams showing control procedures for cutting and pasting;

FIG. 27 is a diagram showing the form of the cut data;

FIG. 28-1 is a diagram showing the state in that the sentence code data including no format command is stored in a memory;

FIG. 28-2 is a diagram showing an image display example of the information developed to the bit image data;

FIG. 28-3 is a diagram showing the state of designation of a scope on a display screen;

FIG. 28-4 is a diagram showing the data with respect to a type set-up process in a PMEM;

FIG. 28-5 is a diagram showing the state in that the sentence code data including format commands is stored in a memory;

FIG. 28-6 is a diagram showing the state in that an image was actually outputted on a display screen on the basis of format commands due to a type set-up process;

FIG. 29-2 is a diagram showing a memory map in a PMEM;

FIG. 29-3 is a flowchart for Nombre output;

FIG. 29-4 is a flowchart for catchword output;

FIG. 29-5 is an explanatory diagram of a two-sided output form;

FIG. 29-6 is a diagram showing an example of a flag train;

FIG. 29-7 is a flowchart for two-sided output;

FIGS. 35 and 36 are diagrams for explaining the details of a PMEM;

FIG. 37-1 is a diagram showing a display screen for explaining the present invention;

FIG. 37-2 is a flowchart for explaining the invention;

FIG. 37-3 is a diagram showing a display screen for explaining the invention;

FIG. 37-4 is a diagram showing the display screen for explaining the invention;

FIG. 37-5 is a flowchart for explaining the invention;

FIG. 37-6 is a diagram for explaining a variable magnification of a frame; and

FIG. 37-7 is a flowchart for explaining the invention.

DETAILED DESCRIPTION OF THE PREFERRED EMBODIMENTS

The present invention will be described in detail hereinbelow with reference to the drawings.

Figure 1:
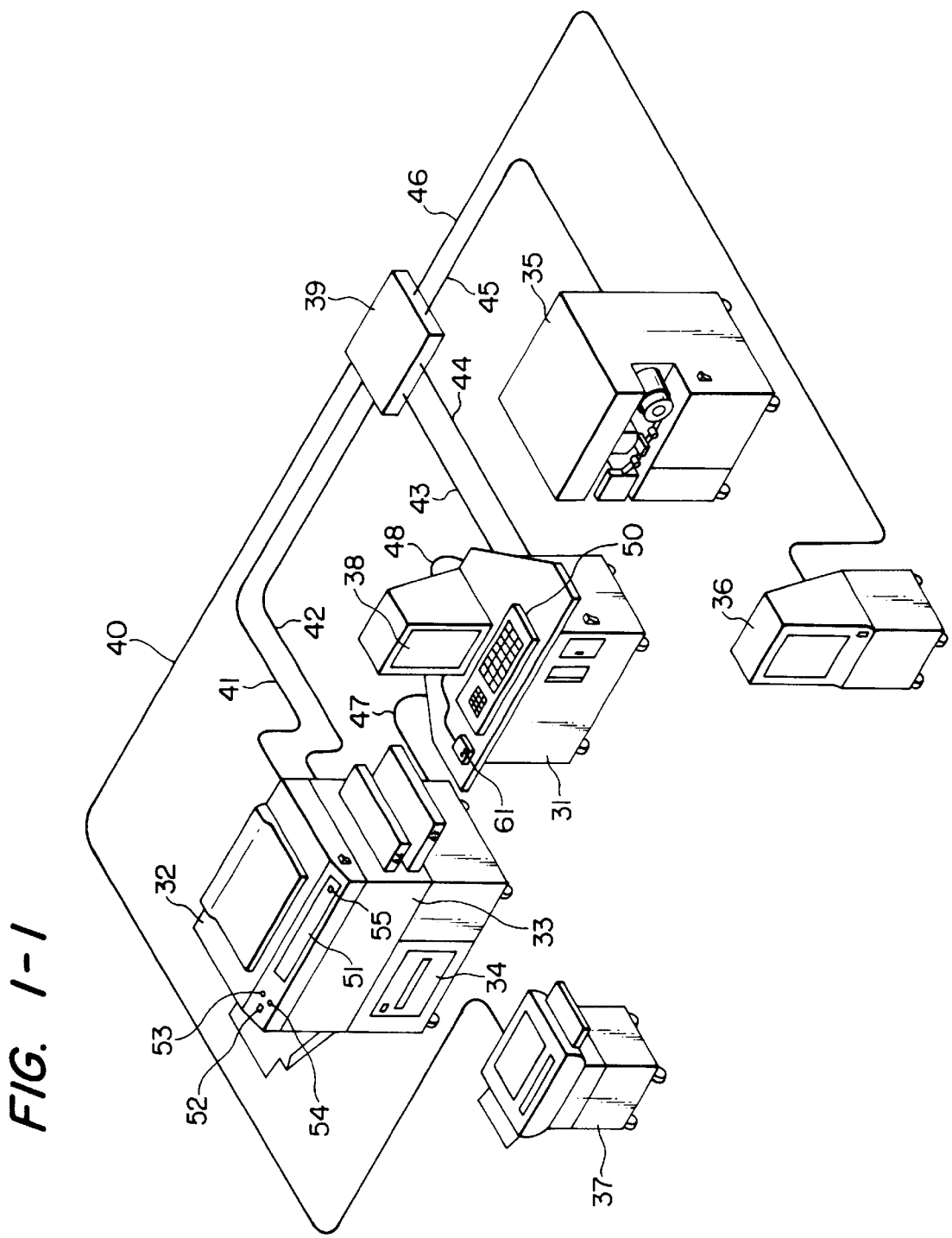
FIG. 1-1 is an external connection diagram of an image processing system to which the present invention is applied.

FIG. 1-1 is an external connection diagram of an image processing system to which the present invention is applied. The invention is not limited to this system but can be obviously applied to a sole equipment or a system a part of which was changed. A control section (called a work station) 31 having: a micro-computer to control a system; an internal memory consisting of a RAM, a ROM, and the like; and an external memory consisting of a floppy disk, a cartridge disk, or the like. An original reader 32 serves as an input section of a digital copying machine. This reader reads document information of an original placed on an original plate and converts it to an electrical signal by an image pickup device such as a CCD or the like. A high speed printer 33 serves as an output section of the digital copying machine. This printer is a laser beam printer or the like which records an image on a recording medium on the basis of the information converted to the electrical signal. An image file 34 has a storage medium such as a photo disk, a photo magnetic disk, or the like. A great amount of image information can be written into or read out from the image file 34. A microfilm file 35 is provided with a microfilm search section and a microfilm reader section to convert the searched image information in a microfilm to an electrical signal by an image pickup device. A soft display 36 of a high resolution has a photo sensitive belt which is constituted by forming a photo conductive layer on a transparent band-like conductive substrate. The soft display 36 irradiates a laser beam modulated in accordance with an input image signal onto the photo conductive layer through the substrate to form an electrostatic latent image corresponding to the light and shade of the image light on the photo conductive layer, and develops this latent image by a toner (developer) having conductivity and magnetism which was held on a toner carrier, thereby forming a display image. A printing device 37 is a laser beam printer or the like similar to the printer 33; however, it is a small-sized and low-speed printer as compared with the printer 33 and is installed as necessary. A CRT display device 38 displays the image information which was photoelectrically read by the digital copying machine and the input scanner (reader) of the microfilm file, or control information or the like of the system. The CRT 38 serves as a display section to perform document and image processes of the present invention. A change-over device 39 changes over the connection of the respective input/output apparatuses on the basis of signals from the control section 31. Those input/output apparatuses are electrically connected by cables 40 to 48. A keyboard 50 is provided for the control section 31. Operation instructions or the like of the system are inputted by operating the keyboard 50. A pointing device 61 processes and indicates image information on the CRT 38 by selecting a command image in a command menu by arbitrarily moving a cursor on the CRT 38 in the X and Y directions. The operation of the digital copying machine is instructed by an operation panel 51. This panel has keys to set a copy quantity, copy magnification, and the like, a copy key 55 to indicate the start of copy, a numeral value display, etc. A mode change-over switch 52 is used to determine which one of the copying machine and the control section takes the initiative in actuation of the digital copying machine. Display devices 53 and 54 consist of light emitting diodes (LED) to display the mode selection state of the mode change-over switch 52.

This system further has a communication controller and lines for network to connect external devices.

Figures 1, 2:
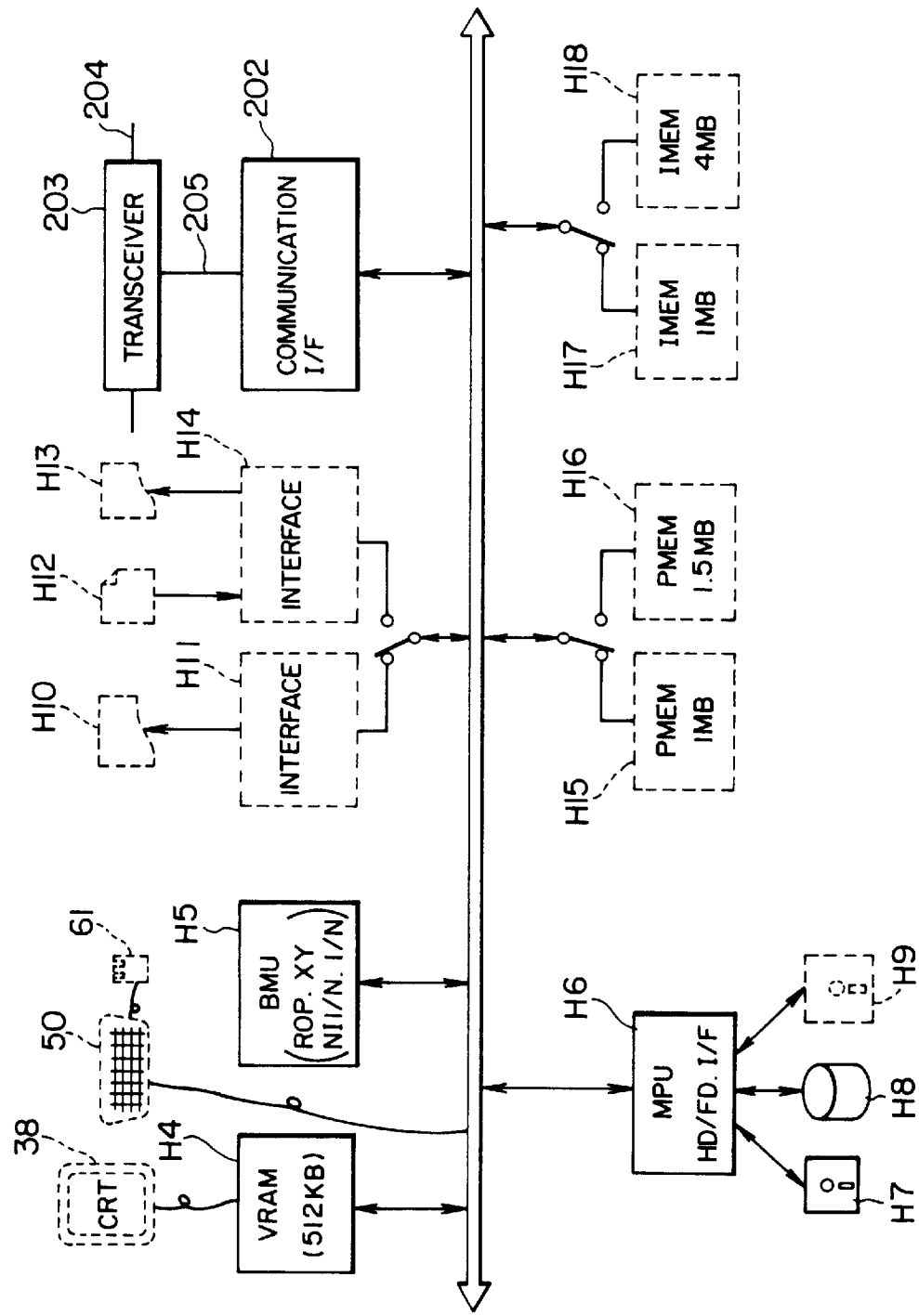

FIG. 1-2 is a block diagram of an image editing apparatus. In this invention, the image edition also includes the document edition. The same devices and components as those shown in FIG. 1-1 are designated by the same reference numerals. A VRAM H4 develops on a bit map the data to be displayed in the display section 38. For example, in the case of character data, the characters corresponding to its code are developed in the VRAM and they can be displayed by directly generating a cursor in the display area of the VRAM due to a control of a software. In this embodiment, the memory capacity of the VRAM H4 is 512 kbytes. A communication interface 202, a transceiver cable 205, a transceiver 203, and a network cable 204 are also provided. The foregoing system is connected to the external devices through a network.

(BMU)

H5 denotes a BMU (Bit Manipulation Unit) to transfer data on a work unit basis among the input/output apparatuses such as the video RAM H4, a main memory, devices (H7, H8, H9) such as disks or the like, printer, and the like without passing through an MPU. Further, the BMU H5 has a function capable of executing the following sixteen kinds of logic operations. Assuming that the side from which data is transferred is a (source side) and the side to which the data is transferred is B (destination side), for example, there are the logic operations such as $\overline{A}$ (inversion), $\overline{A\ B}, \overline{A} + B$, Logic 1 (an image area is completely formed as a black image), $\overline{A+B}, B, \overline{A+B}, A+\overline{B}, A\ B, A+B, \overline{B}, A+\overline{B}$, Logic 0, $A\ \overline{B}, A\ B$, A, etc.

The BMU further has a function of a DMAC (Direct Memory Access Controller) and is provided with a device mode with ACK in the case where the synchronization is necessary (for example, it is not the case of data transfer between memories).

Moreover, the BMU has functions such as rotation of figure, variable magnification, and the like. In the XY conversion, it is possible to perform five kinds of conversions (rotation by 90°, rotation by 180°, rotation by 270°, X symmetry, Y symmetry). There are four kinds of conversion sizes (16×16, 32×32, 48×48, 64×64).

The variable magnification function will then be described. In addition to a function to simply enlarge or reduce, it is possible to carry out the enlargement of fifteen steps of 2/1, 3/2, . . . , and 16/15 and the reduction of fifteen steps of 1/2, 2/3, . . . , 15/16. On one hand, a magnification can be independently designated in the vertical and horizontal directions. In the case of the reduction, a character (binary image) is reduced by simply thinning out and a photograph (dither image) is reduced by thinning out on a box unit basis of 4×4.

In FIG. 1-2, H7, H8, and H9 denote the disks to file data. For example, H8 is a hard disk 7HD, H7 is a floppy disk (FD) of five inches and has a memory capacity of 640 Kbytes, and H9 is a floppy disk of eight inches and has a memory capacity of 7 Mbytes.

[MPU]

H6 denotes an MPU (Microprocessor unit) which uses, for example, 68000 made by Motorola Semiconductor Co., Ltd. as a CPU. The MPU H6 also has an HD/FD—IF (interface) and controls the disks H7, H8, H9, and the accesses and the like of a PMEM and an IMEM which will be described hereinafter.

In FIG. 1-2, H10 and H13 are printers of different pixel densities, and H12 is a reader to read an original. H11 and H14 are interfaces which are provided in correspondence to the printer H10, and the printer H13 and reader H12, respectively.

[PMEM, IMEM]

Figures 1, 2, 3:
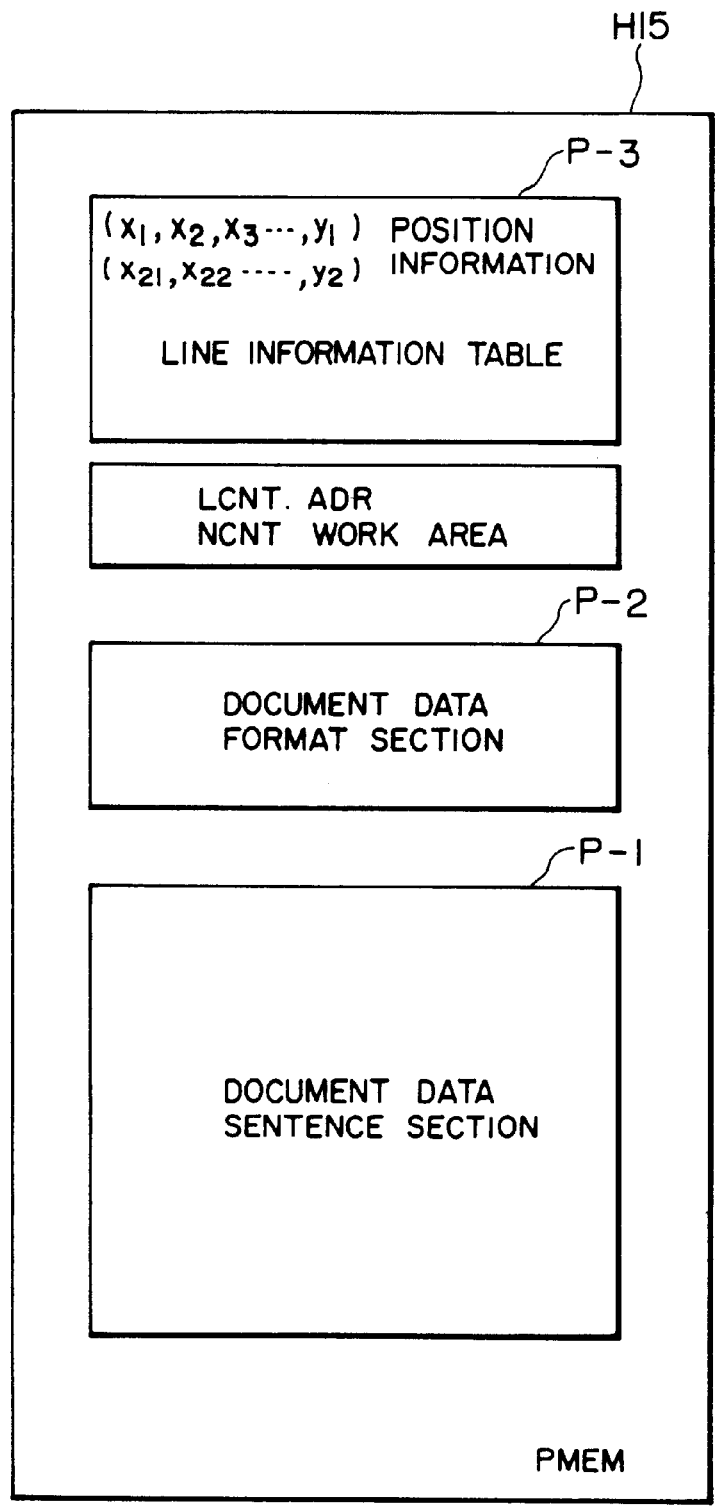
Figure 3:
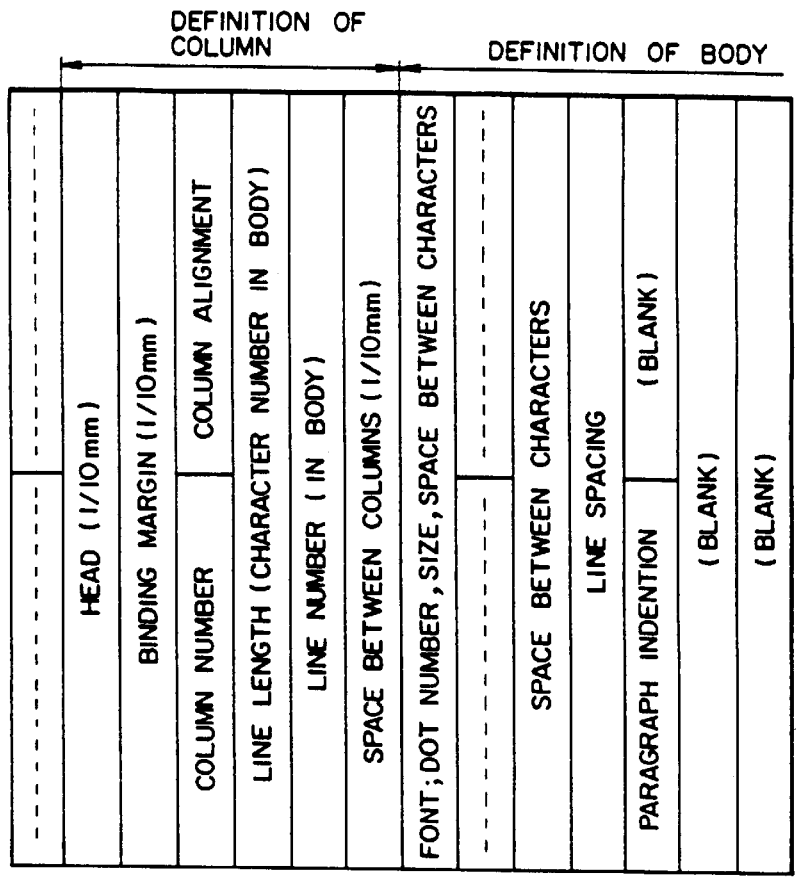
Figure 2:
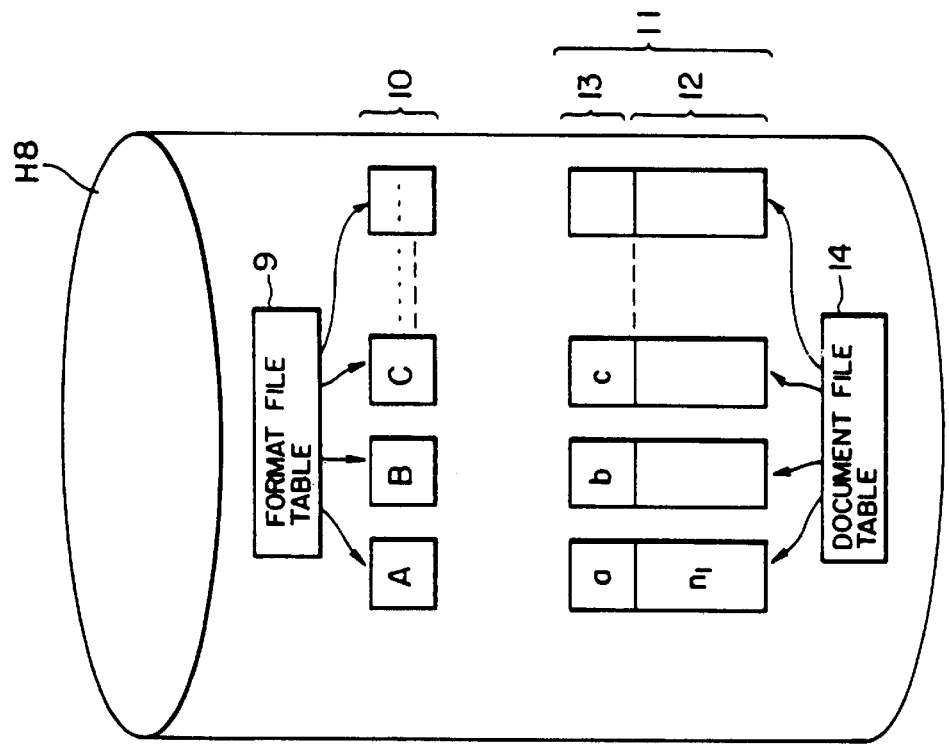

H15 and H16 are program memories (PMEM) having memory capacities of, e.g., 1 Mbytes or 1.5 Mbytes as optional capacities. The PMEM is called a main memory and appropriately selects a program for an editing process from the hard disk H8 and transfers to the PMEM and executes this program. The data inputted from the keyboard 50 is stored as code information into the main memory also serving as a text memory. The data stored in the main memory, the data stored on the disk, and the data read out from the reader can be developed as bit data in an image memory IMEM. Although the data stored in the PMEM can be also similarly processed, it can be subjected to the above-mentioned DMAC, XY conversion, variable magnification, etc. through the foregoing BMU. A simple memory map in the PMEM and H15 or H16 is shown in FIG. 1-3. P-1 denotes a document data sentence section in which sentence data is stored as code information. P-2 is a document data format section Nombre in which kinds of characters of, for example, body, headlines, catchwords, etc., the line pitch, and the character pitch are included as data. P-3 is a line information table which is used to perform the positioning in the memory and on the display. Data (x11, x12, x13, . . . , y) are stored in the table P-3, for example, on a line unit basis.

The line information table P-3, document data format section P-2, and document data sentence section P-1 together have a line count register LCNT, a character pointer ADR, and a character count register NCNT as line counter work areas.

The character codes to be displayed are sequentially stored in the section P-1 and the line-feed codes and paging codes mixedly exist among those character codes. The display positions or developing positions in the VRAM H4 of characters are respectively stored in the table P-3.

Therefore, the line-feed or paging can be discriminated by the section P-1 and table P-3.

Namely, when the section P-1 is developed in the VRAM H4 and developed on the CRT 38, characters are developed one by one by reference to the table P-3. If the line-feed code exists, the line is fed at this time. Even if no line-feed code appears, the line is fed after completion of the development of characters as many as the number of characters of one line in the line information table P-3 with respect to one line, then next characters are developed in the next line.

On one hand, information indicating how to develope information in the document such as images, figures, or the like which have no line is also stored in the document data format section P-2. P-3 may be included in P-2.

Description will then be made with respect to the function relative to the formats such as a print style, column style, and the like which are prepared and the access to the sentence in the document editing apparatus of the invention in the system constituted as described above. The following functions regarding the formats are presented.

(1) Registration of formats.

(2) Correction of a part of the registered formats.

(3) Setting of formats to documents.

(4) Correction of a part of the formats of the documents.

Prior to describing the above items (1) to (4), the format data will be first explained. FIG. 2 is an explanatory diagram showing a part of data which is stored in the disk device 48 shown in FIG. 1-1. A format file table 9 is used to determine which file is selected from format files 10. A sentence section 12 in which the document data is actually stored and a format section 13 in which the formats corresponding to the sentences are stored are provided in document files 11. A document file table 14 is used to determine which sentence or format is selected from the document files 11.

The format data to be stored into the format files 10 shown in FIG. 2 will then be described. This data is not needed to be stored into the files but may be stored into the IMEM or PMEM as shown in FIG. 1-3. In the format definition, the following three recording sections are used.

<<a>> Format definition header recording section.

<<b>> One body definition recording section.

<<c>> A plurality of peripheral definition recording sections.

Figure 4:
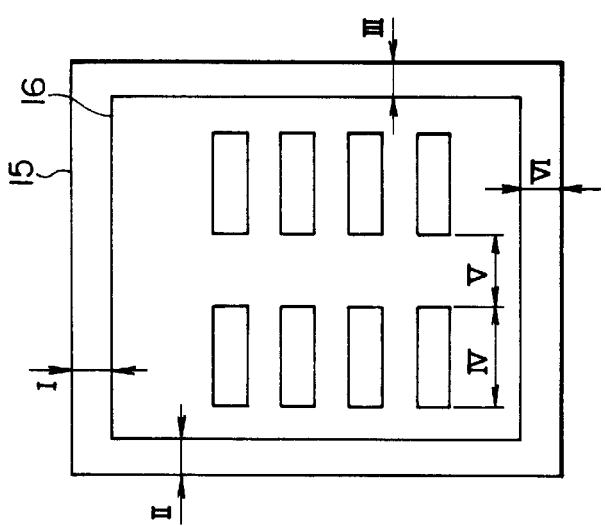
FIG. 4 is an explanatory diagram of terminology regarding a format.

<<a>> manages the number of format definitions and its detailed description is omitted. <<c>> defines the Nombre (page number), catchwords (headlines out of columns), and the like and its detailed description is omitted in this specification. <<b>> defines the body and has definitions of bodies and columns and is constituted as shown in, e.g., FIG. 3. FIG. 4 is an explanatory diagram of parameters (terminology) regarding a format. The positions of the print face which are displayed on the display section 38 such as a CRT or the like shown in FIG. 1-1 are shown in FIG. 4. These positions correspond to the positions in a paper where the documents or the like are inputted and edited. In FIG. 4, I denotes a "head" (blank portion at the top of the page); II is a "back margin" (binding portion); III is an "edge" (portion on the side opposite to the binding margin); and VI is a "tail" (blank portion at the bottom of the page). The position of a print face 16 in a paper 15 is determined by those portions I, II, III, and VI. The column number in FIG. 3 indicates the number of columns and is two in the case of FIG. 4. As will be understood from the diagram, the column alignment means that the bottom columns are aligned in the column work. The line length denotes the length of line of the column and is represented by IV. The line number indicates the number of lines in the column. The space between columns indicates a space (V) between the column since there are two columns in the case of FIG. 4. The above-mentioned data are all concerned with the column definition shown in FIG. 3. For the body definition, there are data such as fonts of characters, number of dots, sizes, space between characters, paragraph indention, color information, etc.

The functions relative to the foregoing formats will then be described in detail.

(1) Registration of Formats

Figure 5:
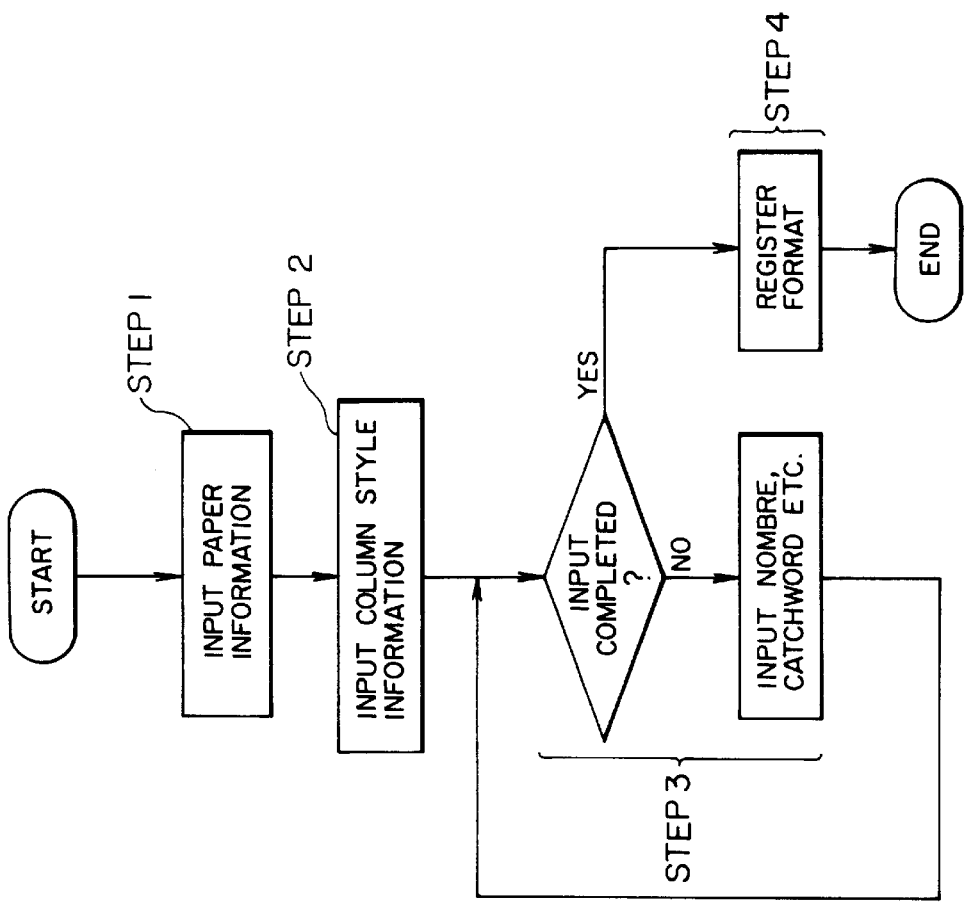
FIG. 5 is a flowchart for registration of a format.
Figures 1, 6:
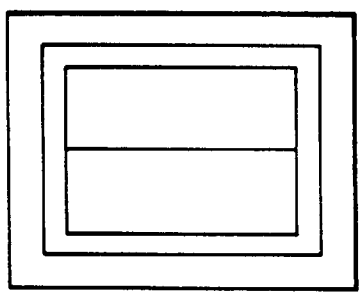
Figures 2, 6:
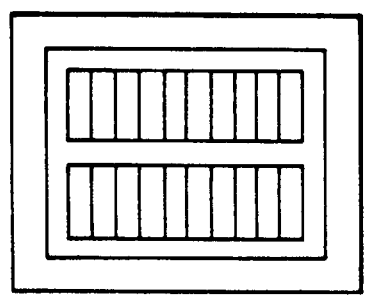
Figures 3, 6:
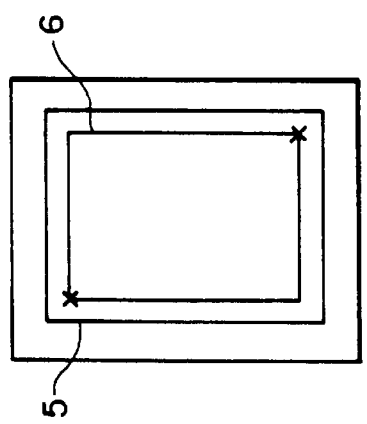
Figures 4, 6:
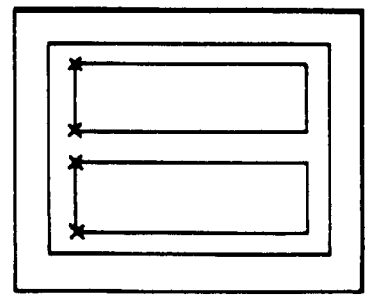

FIG. 5 shows a flowchart for registration. When a command to register a format is inputted, the system first enters the registration routine among various functions which are presented by the WS (Work Station) consisting of the display section 38 and keyboard 50. In step 1 in FIG. 5, information of a size of the paper, setting direction of the paper, vertical/horizontal writing, and the like is inputted from the keyboard 50 and stored into a predetermined area in the PMEM. In the next step 2, the column style as shown in FIG. 4 is inputted in accordance with a flow of display as shown in, e.g., FIG. 6. Namely, as shown in FIG. 6(1), the print face 6 in a paper 5 is decided by inputting two points of, for instance, marks x by the pointing device (P.D) 61. Then, the column number is inputted (two columns in the diagram) as shown in FIG. 6(2). A width of column and a space between columns are specified by indicating, e.g., x points by the keyboard or P.D as shown in FIG. 6(3). After completion of the definition of the column as mentioned above, the definition of the body such as fonts, dots, sizes, and the like is further executed as shown in FIG. 6(4) and these data are stored in the PMEM. Therefore, the estimated line number and lay-out can perceive intuitively by seeing FIG. 6(4). In the next step 3 in FIG. 5, Nombre (page number), catchwords (headlines out of columns), and headlines are further defined and stored in the PMEM. In those operations as well, those data can be intuitively inputted from the keyboard 50 by watching the image displayed on the CRT 38 of the WS, so that the formats can be very efficiently set. The formats set in this manner are registered in step 4 in FIG. 5 and stored into the files A, B, C, . . . of the format files 10 shown in FIG. 2. A plurality of formats can be registered by the foregoing means. Both image and numerical value data indicative of the formats which were set as mentioned above may be also displayed.

(2) Correction of a Part of the Registered Formats

Figure 7:
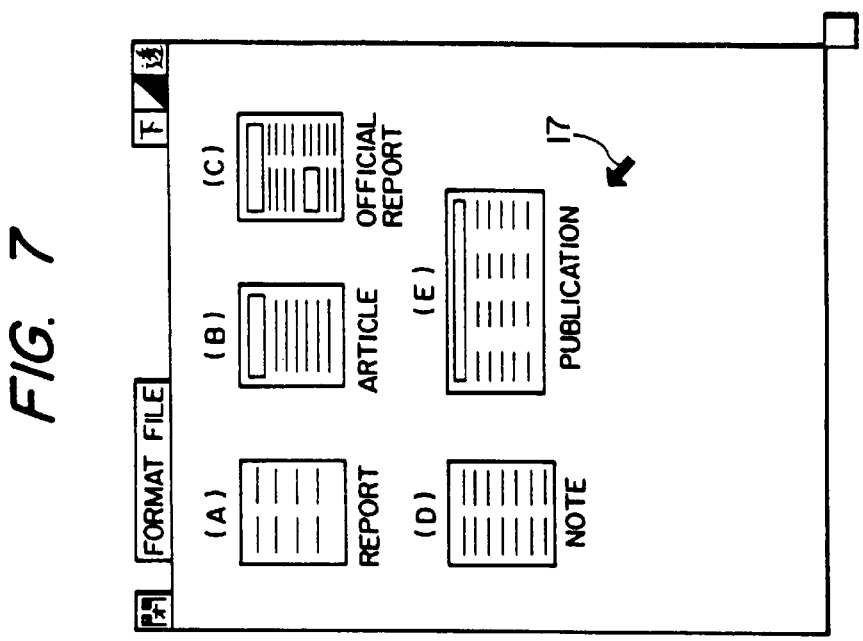
FIG. 7 is an explanatory diagram of menu display of a format.
Figure 8:
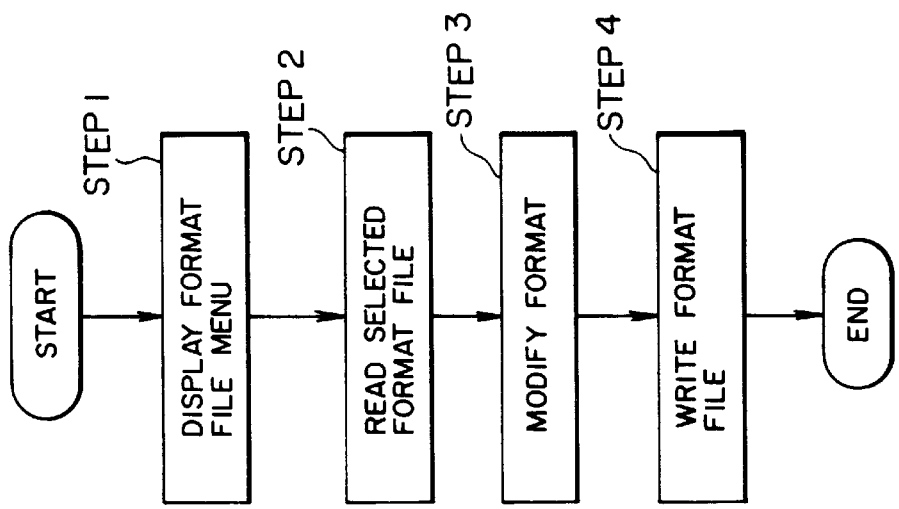
FIG. 8 is a flowchart for correction of a part of the registered format file.

The case where the formats registered by the procedure described in item (1) are accessed and corrected will be explained. FIG. 7 is a diagram showing the state in that the format menu to access the formats registered was displayed on a part of the display screen (hereinafter, this diagram is referred to as a window). FIG. 8 shows a flowchart for correction of a part of the format files registered. In step 1, the menu as shown in FIG. 7 is displayed by the WS. For example, (B) denotes an "article", A4 (size of the paper), 10-point (size of the character), and one stage (column number). In step 2, cursor (indicated by an arrow 17 in FIG. 7) is moved by the P.D 61. By pressing a key of the P.D at a position of a desired format, for example, a report of (A), the format stored in the format file A in FIG. 2 is selected from the format file table 9 and displayed on the CRT 38 in FIG. 1 as shown in FIG. 4. In the next step 3, with respect to the parameters such as the line length and the like of the column described in FIG. 4 with regard to the format A, the numerical values are inputted by the keys or P.D, or by intuitively moving the cursor, the numerical values and cursor position are inputted, and these data are stored into the PMEM, thereby modifying the image and correcting the format. The corrected format is rewritten into the format file shown in FIG. 2 or newly written and registered therein.

(3) Setting of Formats to Documents

Next, when a command to set the formats to the documents is inputted by the WS, the diagram shown in FIG. 7 is displayed similarly to the case of item (2). Even while the documents are being processed on the display screen at present, the window (i.e., the format menu diagram) is superimposed and displayed on that document image. Therefore, □ at the lower right position in FIG. 7 is indicated by the cursor 17 and the window can be variably magnified in accordance with the movement of the cursor so that the documents can be easily seen. On one hand, the whole window can be moved by indicating and moving the portion of "format file" of the title. Therefore, as well as the case where no sentence is displayed on the CRT, even in the case where the sentences are displayed on the CRT, the window shown in FIG. 7 is moved to or variably magnified in the blank area on the sentence screen and is displayed in this area, thereby enabling a desired format in the window to be easily selected in accordance with the sentence screen.

Figure 9:
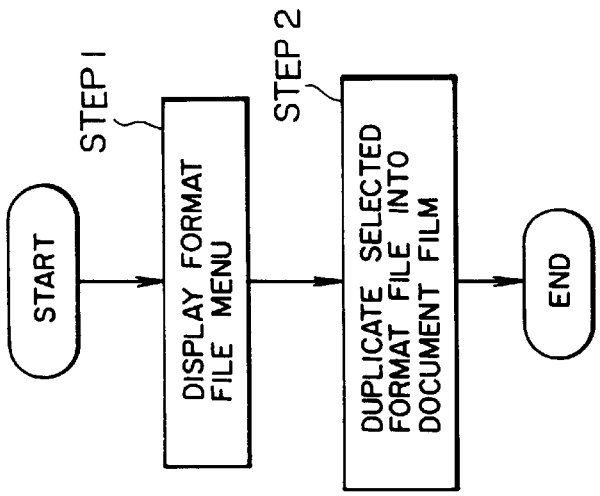
FIG. 9 is a flowchart for formating a document.

FIG. 9 shows a flowchart for setting the formats to the documents. It is now assumed that the document of data n1 in the document section 12 shown in FIG. 2 is displayed on the CRT. In step 1 in FIG. 9, the list of the format files shown in FIG. 7 is written at a predetermined location in the VRAM formed by the window and accessed at an arbitrary position on the screen by key inputs from the WS. A desired format, e.g., (A) is selected by the P.D or cursor 17. Then, in step 2, the format file A in FIG. 2 is selected and duplicated in the portion a corresponding to the data n1 in the format section 3 in the format files 11 in FIG. 2. Due to this, the formats of the documents which are at present being processed are deleted. The set-up types of the documents are outputted while formating the sentences in accordance with the new formats in the documents, so that the documents which are being processed are outputted as completely new formats due to the above-mentioned scan.

(4) Correction of a Part of the Formats of the Documents

Figure 10:
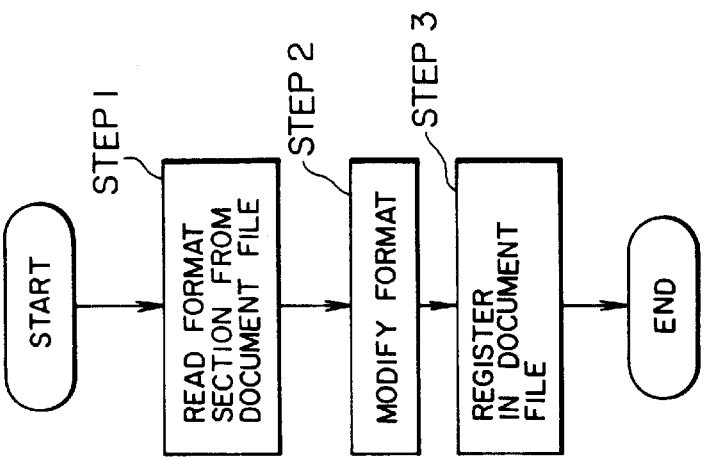
FIG. 10 is a flowchart for change of a part of a format of a document.

The case of correcting a part of the formats of the documents made by the procedure as in the item (3) "Setting of formats to documents" will then be described. First, the case of accessing the documents on the display screen will be explained. FIG. 10 shows a flowchart for correction of a part of the formats of the documents. In step 1, the documents files 11 consisting of the sentence section 12 and format section 13 shown in FIG. 2 are read out by the document file table 14. The documents are displayed on the display section on the basis of those formats.

In the next step 2 in FIG. 10, the parameters regarding the formats such as column number, column work, line length, space between columns, etc. mentioned above are corrected. The corrected parameters may be newly registered or registered again into the document files 11 in FIG. 2 in step 3 as necessary.

Figure 11A:
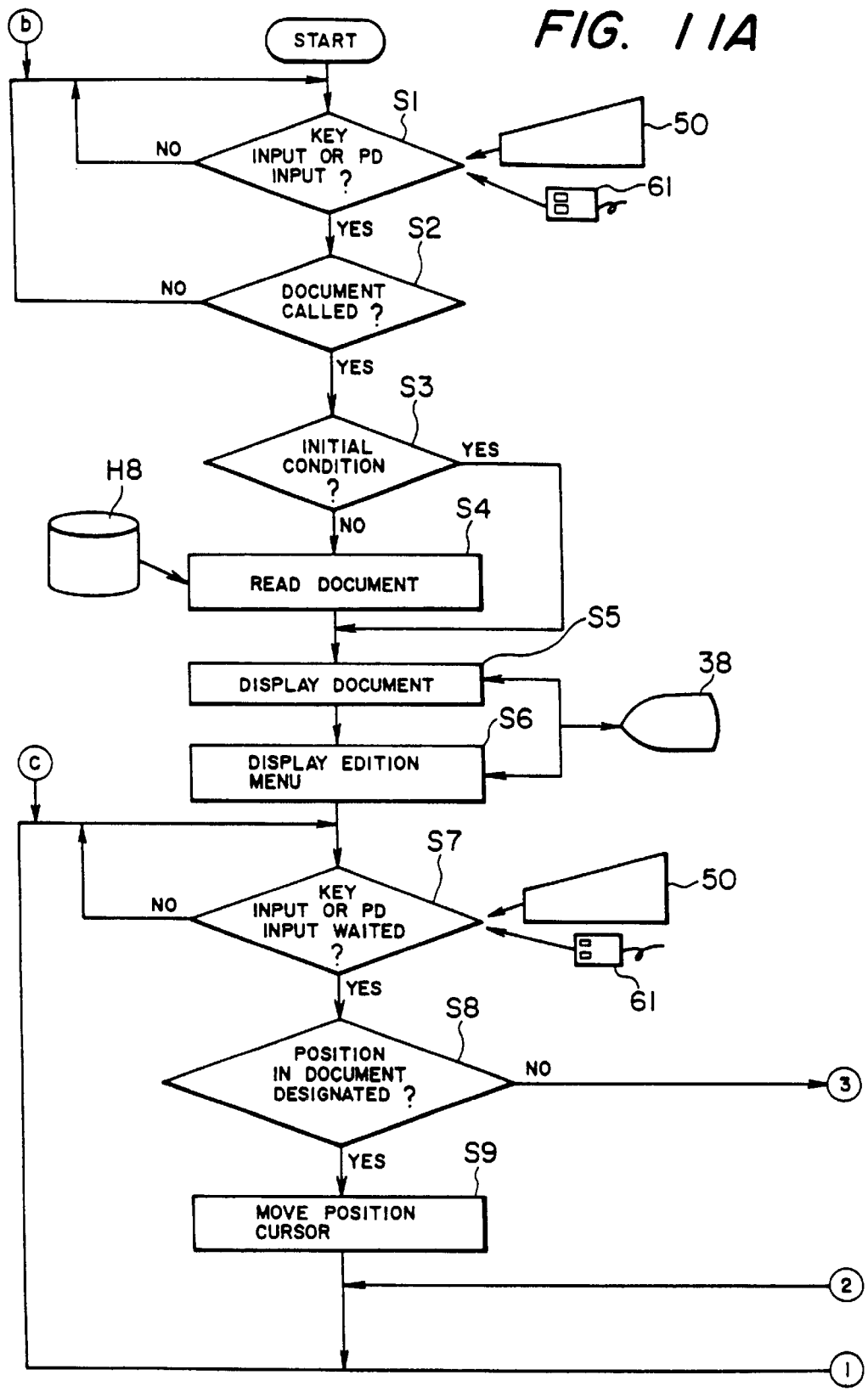
FIGS. 11A to 11C are control flowcharts including document process and type set-up process in an image processing system.
Figure 11B:
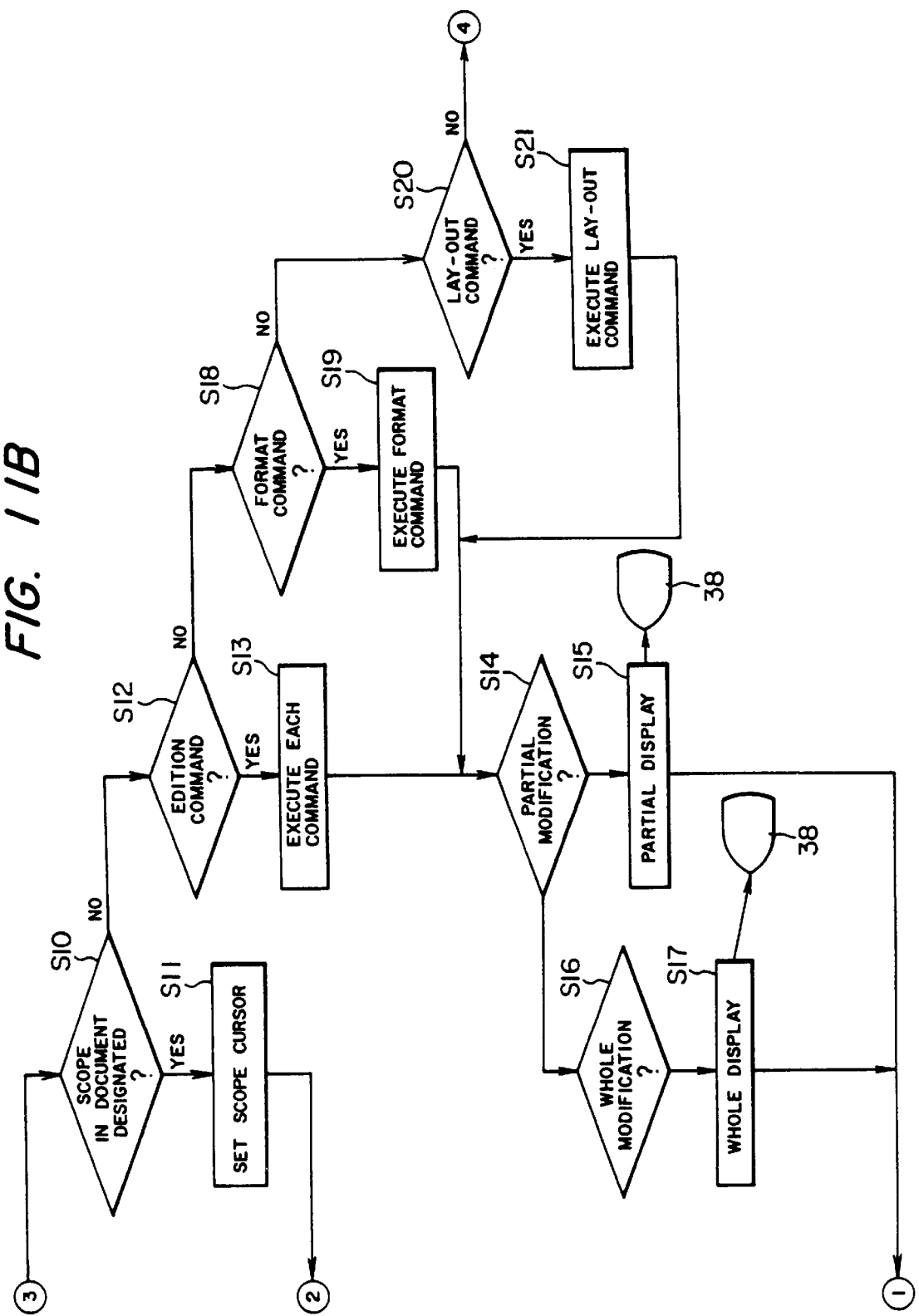
Figure 11C:
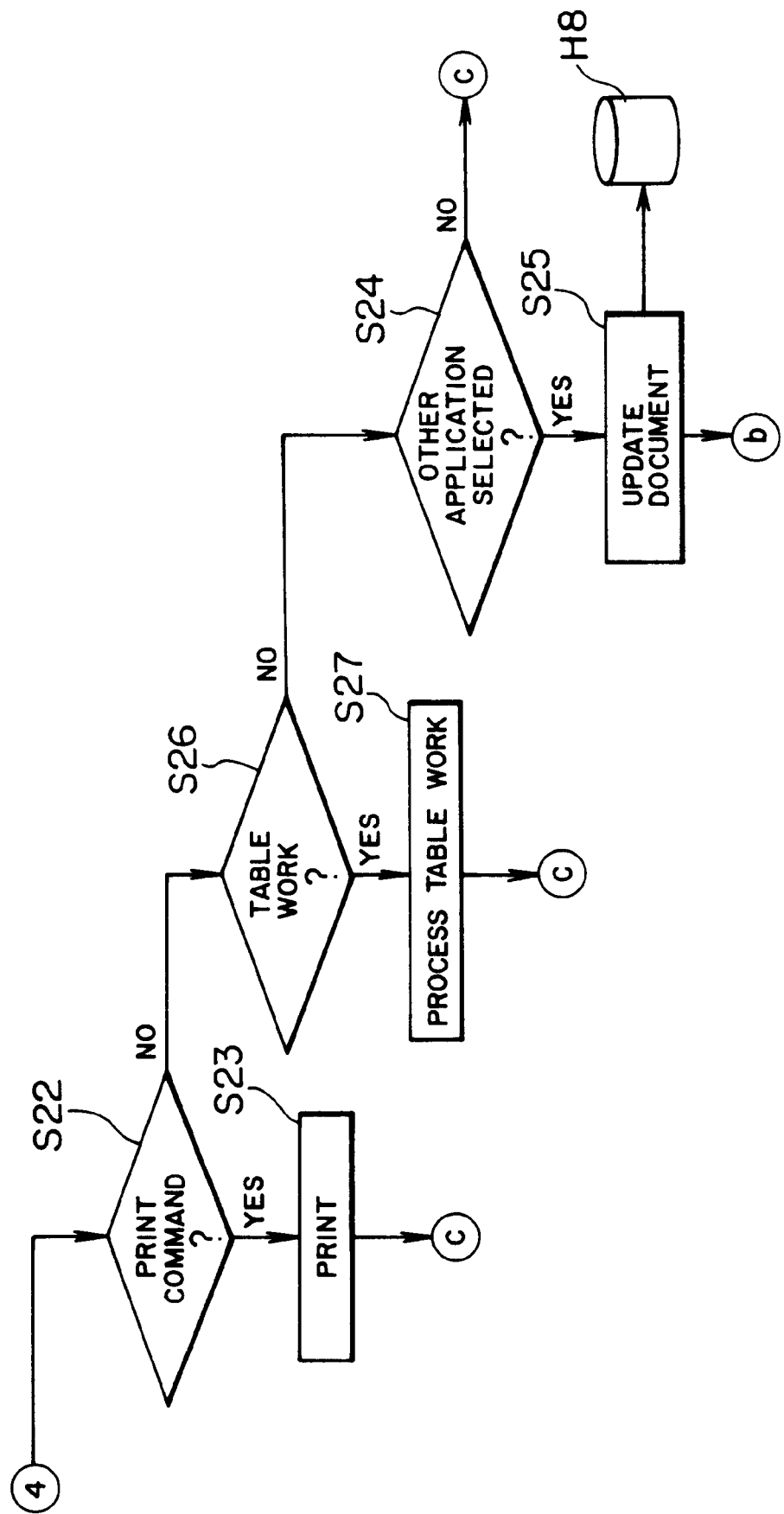

Detailed Description will now be made with respect to the case where the inputting and editing works are carried out by the use of the above-mentioned functions for the registration and correction of the formats in the files, the setting of formats to documents, the correction of a part of the formats of the documents, and the like. FIG. 11 is a control flowchart for, particularly, a document process and a type set-up in the image processing system having the foregoing constitution and functions. The term "document" used in this specification incorporates image data, and both the document and the image data are used as an equivalent meaning and denote the data in which they mixedly exist. For simplicity of explanation, the descriptions of a key controller and the like are omitted and it is assumed that these devices are all managed by the MPU.

Referring now to FIG. 11, in step S1, the MPU waits for the input from the keyboard 50 or P.D 61 or the like. When a key was inputted, a check is made to see if a document has been called or not (step S2). If NO, the processing routine is omitted in this specification because it has no relation with the invention. If YES, step S3 follows and a check is made to see if no document data is stored in the IMEM or PMEM and these memories are in the initial states of blank. If NO in step S3, the document data is read into the memory from the disk H8 or the like (step S4). If YES in step S3, the document exists in the memory; therefore, in steps S5 and S6, the document data and edition menu developed in the VRAM are displayed on the CRT 38 as shown in, e.g., FIG. 12. In the next step S7, the MPU waits for an input by a key or P.D. For the input described in step S1, for example, in a menu section 100 shown in FIG. 12, a reader, a cabinet, an original paper, or the like is designated by the cursor by the P.D or the like, thereby instructing the calling or the like of a document (101). The input in step S7 is similar to that in step S1 or an input such that the position in the document is determined by the line information table P-3 in FIG. 1-3 by moving the cursor onto the document 101 displayed on the CRT. In step S7, in the case where the movement of the cursor (CR in FIG. 12) is instructed, the cursor CR moves as a position cursor in step S9. However, when the key of "Designate Scope" in the menu section 100 is instructed by the P.D and arrow AR, the cursor CR is set as a scope cursor (steps S10 and S11).

When an edition command for line alignment or the like in the menu section 100 is inputted in the next step S12, each edition command is executed in step S13. When a format command is inputted in step S18, the format command is executed in step S19, so that the list of the format files,for example, is displayed as shown in FIG. 7. When a lay-out command is inputted in FIG. 12, the lay-out command is executed in steps S20 and S21. When an icon (picture) of the printer is instructed in FIG. 12, the processing routine advances to steps S22 and S23 and the specified document is printed and outputted by the printer in accordance with the format. In steps S24 and S25, for example, the document is updated as another application.

[Table Work]

A table work process will then be described. When the table work is designated in step S26 in a manner similar to the above, the table work process is executed in step S27. On one hand, in step S24, when another application, e.g., the menu in FIG. 12 or the mode to newly make a table or the mode to reserve the document which has already been made is designated by a key, the document is newly stored on the disk H8 or the document is called or updated in step S25, and thereafter the processing routine is returned to (b).

Steps S14 to S17 are steps for display control in the case of displaying the data in which only a part thereof was corrected or the data in which the whole portion thereof was corrected in dependence on the state of the corrected portion after completion of the execution of each command.

Figure 12:
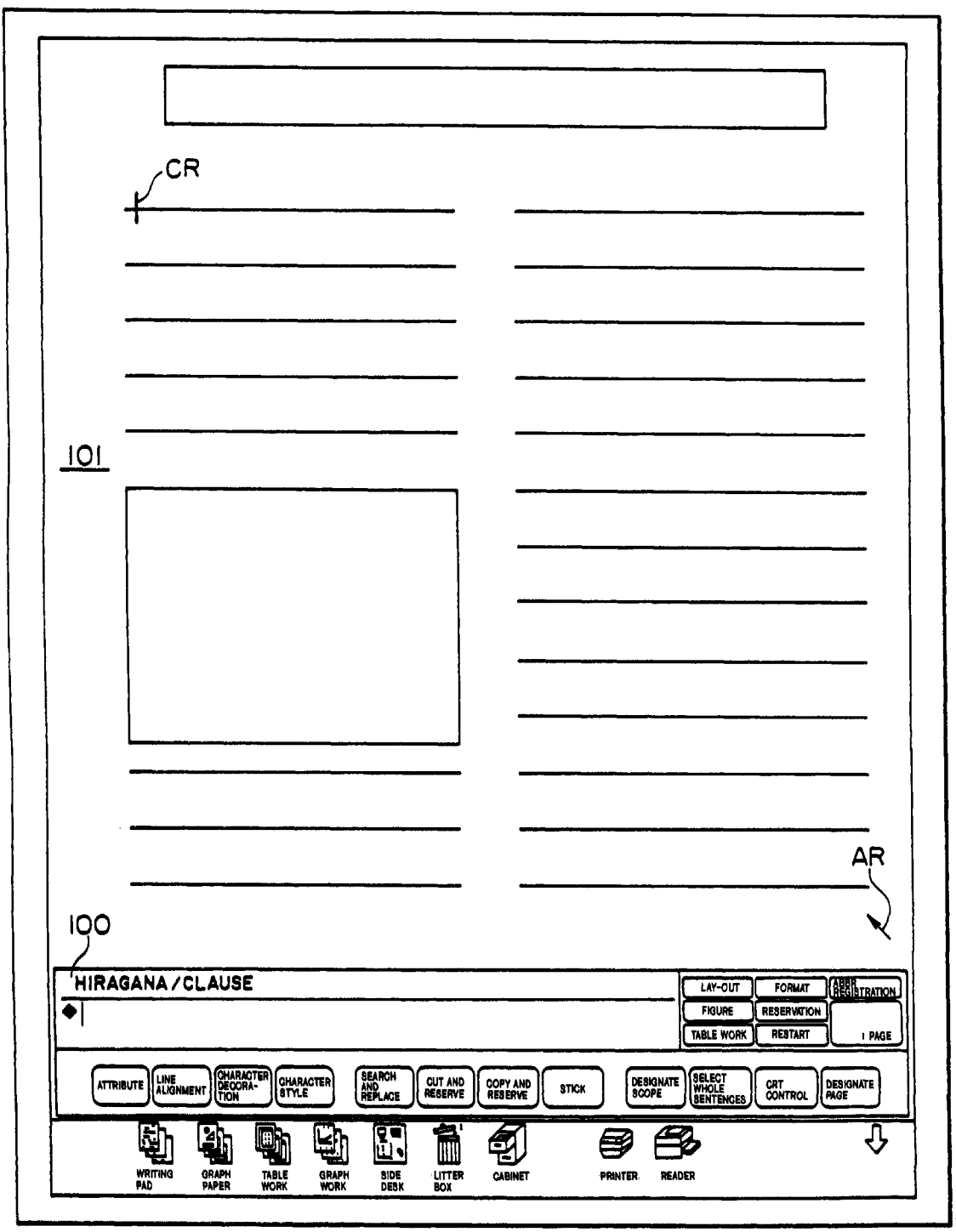
FIG. 12 is a diagram showing an example of display of document data and an editing menu.
Figure 13:
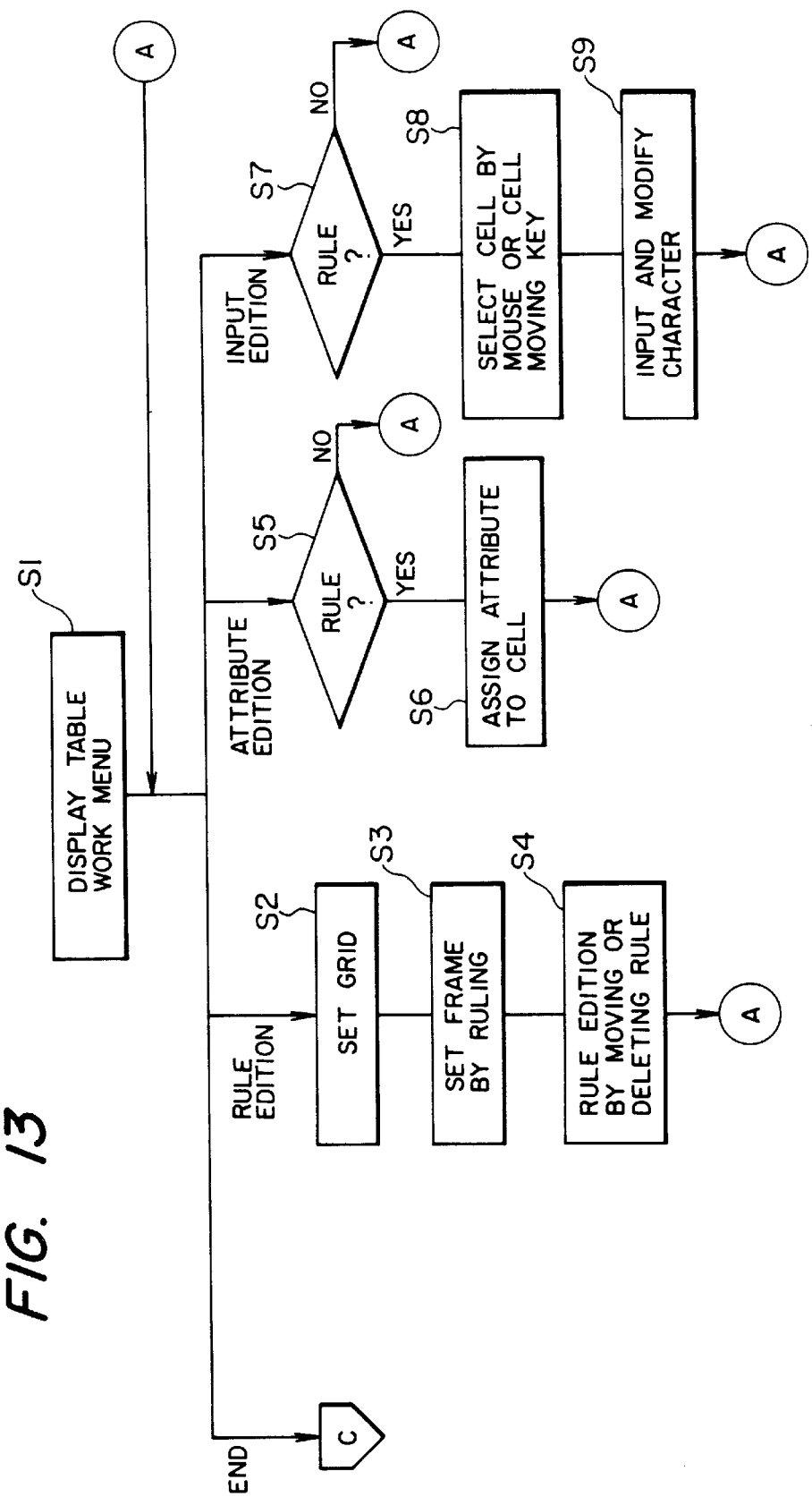
FIG. 13 is a flowchart for explaining the table work (small work)
Figure 14:
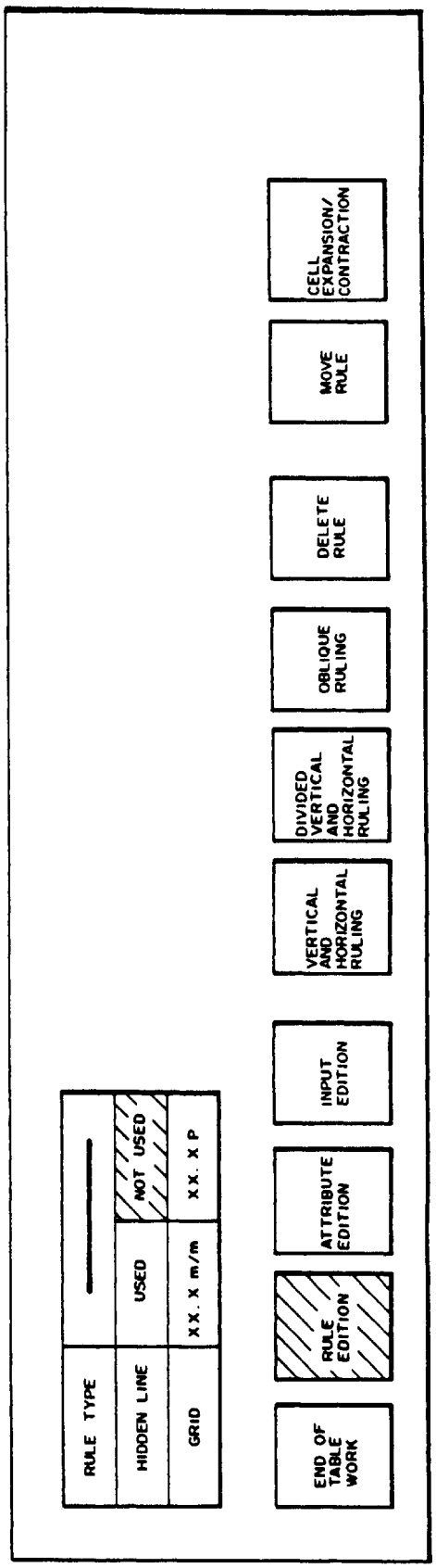
FIG. 14 is a diagram showing a menu in the rule edition.

The table work shown in step S27 in FIG. 11 will then be described in detail. FIG. 13 is a display control flowchart in the case of the table work. When the table work in the menu section 100 in FIG. 12 is instructed, the processing routine advances to step S27 in FIG. 11 and enters step S1 in FIG. 13. The menu in the table work mode shown in FIG. 14 is displayed in the menu section in FIG. 12. As shown in steps S2, S5, and S7 in FIG. 13, the table work is mainly divided into rule edition, attribute edition, and input edition. When the rule edition is instructed for the scope (each scope is called a cell) designated by the lay-out process in step S20 in FIG. 11, a grid is set in step S2 in FIG. 13. As shown in FIG. 15, the grid is a dotted pattern which is displayed in the frame and the grid size (pitch or the like) is set by the menu shown in FIG. 14. In the next step S3, a rule can be drawn by the P.D and cursor such that the respective dots of the grid are connected. Further, in step S4, the rule edition can be performed by instructing "delete rule", "move rule", and the like in the menu in FIG. 14.

The attribute edition will then be explained. When the attribute edition in the menu in FIG. 14 is instructed, a menu is displayed as shown in FIG. 16. When no rule exists in step S5 in FIG. 13, a plurality of cells do not exist,so that there is no need to edit the attribute in the table work mode and the processing routine is returned to (A). When there are rules and the cells exist in step S5, a margin and the like are inputted and set for each cell by the menu shown in FIG. 16. The hatched portions indicate the attributes designated. The actual cell is displayed as shown in FIG. 17. For example, the cell designated by the cursor (arrow) is subjected to a process such as inversion or the like as indicated by the hatched portion as shown in FIG. 17A. On the other hand, in the case of designating a plurality of cells, all cells which are completely included in the rectangle whose diagonal is drawn from the position where the button of the P.D is started to be pressed to the position where it is released are inverted (indicated by the hatched portion) as shown in FIG. 17D. The attributes such as character code, table direction, character style, alignment, margin, space between lines, decimal point, mesh, etc. as shown in FIG. 16 can be assigned to the cell designated.

The input edition will then be described. Since step S7 is the same as step S5, its description is omitted. In the input edition mode, the menu is displayed on the CRT as shown in FIG. 18. It can be considered that the inputting process for each cell is similar to the process of small work in type set-up. First, to move the cursor to the cell to be inputted, the arrow cursor is put onto the relevant cell and the button of the P.D is once pressed, or the cursor for movement of the cell on the menu on the CRT shown in FIG. 18 is instructed by the P.D, or the function key corresponding to the menu displayed on the CRT is pressed. Due to this operation, the cell cursor (hatched portion) indicated as shown in FIG. 17A is changed such that, for instance, the adjacent cell becomes the cell cursor (the hatched portion is moved) by the moving operation mentioned above. When data is inputted in the cell indicated, it is once displayed in the Katakana-Chinese character conversion window (not shown) and simultaneously with the end of the input, the data is displayed in the cell on the basis of the attributes designated. The rule data, attributes, and character data inputted in this manner are stored in the PMEM, file, or the like as forms shown in FIG. 19.

Figure 19:
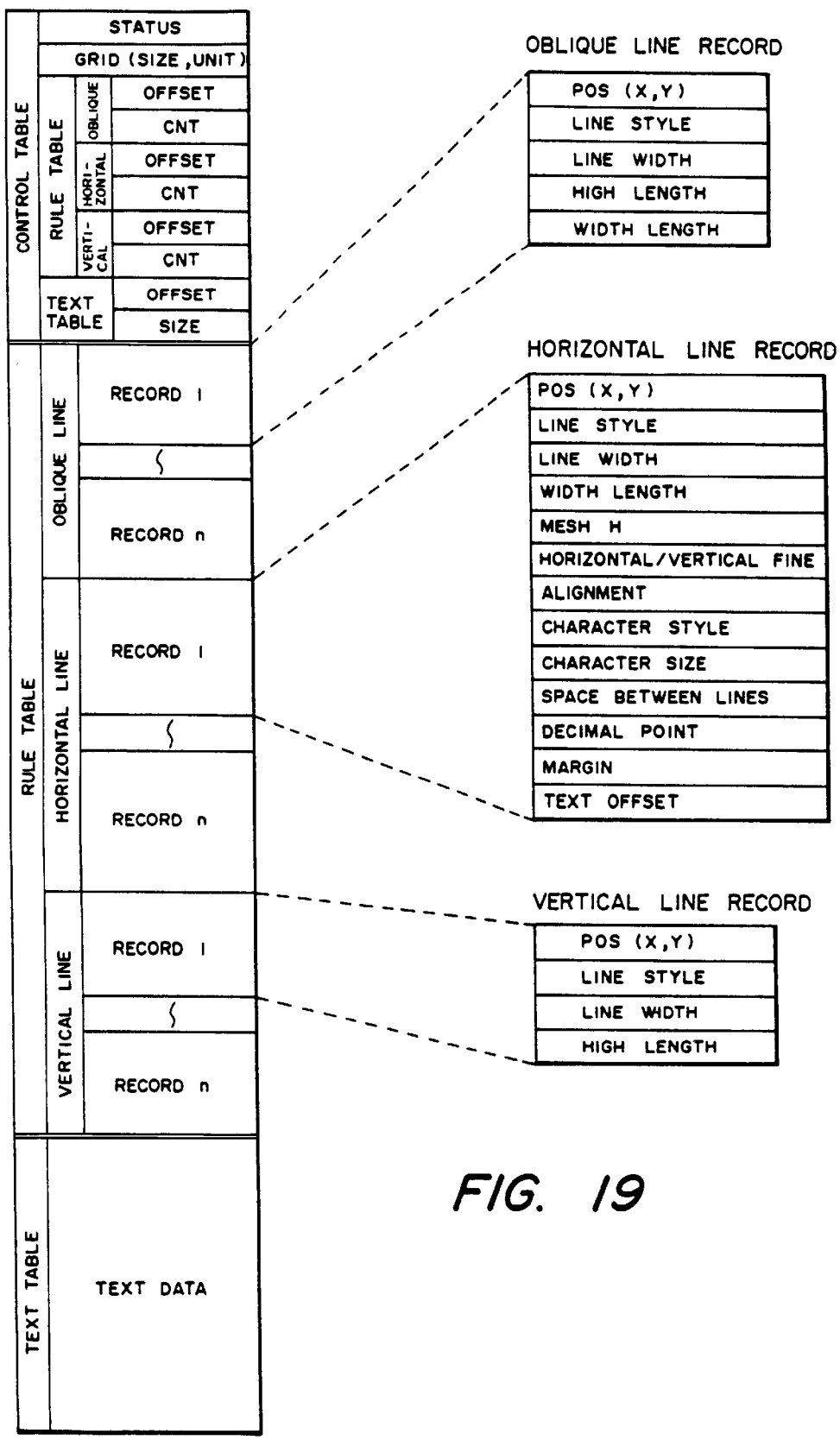
FIG. 19 is an explanatory diagram of a table work table.

Namely, FIG. 19 shows a table work lay-out and the storage tables includes a control table, a rule table, and a text table. A status is first stored in the control table. The control table has the conversion data of the data in the memory and on the disk file. As described in FIG. 15, the data such as a pitch between the dots of the grid designated and the like is stored in the "Grid" in the control table.

The offset and cut data regarding the oblique line, horizontal line, and vertical line are stored in the rule table in the control table. The offset data is data indicative of addresses the start points in the recording areas relative to the oblique, horizontal, and vertical lines in the rule table. The cut data is data representative of the number of records with respect to each of the oblique, horizontal, and vertical lines. As is obvious from the diagram, there are n records. Therefore, the area of the rule table can be grasped from the cut data since the memory size of each record is the same.

Next, as data in the text table in the control table, the offset data indicative of the start point of the storage area in the text table and the size data of the memory of the text data in which document information is stored are provided. The text table can be grasped by those offset and size data.

The rule table will then be described. POS (X, Y) is data indicative of the start position of each line. Line style indicates the kind of line such as, for instance, a dotted line, a dot-dash line, or the like. Line width denotes a line width and the same shall apply to other lines. As for the horizontal line data, the data of the attributes in the cell such as, e.g., mesh, right and left alignment, equal division, character style, character size, space between lines, etc. are also stored.

Text offset is data indicating at which location in the text table the text data corresponding to the cell is stored.

The above-mentioned data is used for a table work process (the same shall apply to a small work process).

As described above, according to the present invention, in an image processing system having an output device of a high resolution and which making a high grade document, various kinds of balanced formats are preliminarily defined, and a print type set-up rule such as a table work, a small work, and the like operates by the use of these formats, thereby making it possible to easily produce a beautiful document which is close to a printed matter and is easy to read. In addition, complicated table work processes can be also easily executed and a document can be beautifully finished. Also, such a document can be used as a block copy to print.

Further, in this editing work, the data which is equivalent to the print output is displayed on the CRT and by operating the keyboard and Mouse while always watching this display data as a final print output, a high grade document can be made for a short time.

Due to this, a high grade document, which has conventionally been expensive and needed a long time to produce as a printed matter, can be made in actual offices or the like that need such high grade documents for short time. In addition, a high grade document, which cannot be satisfactorily made by the level of the existing word processors, can be easily made by the system according to the invention.

[Line Counter]

Figure 20A:
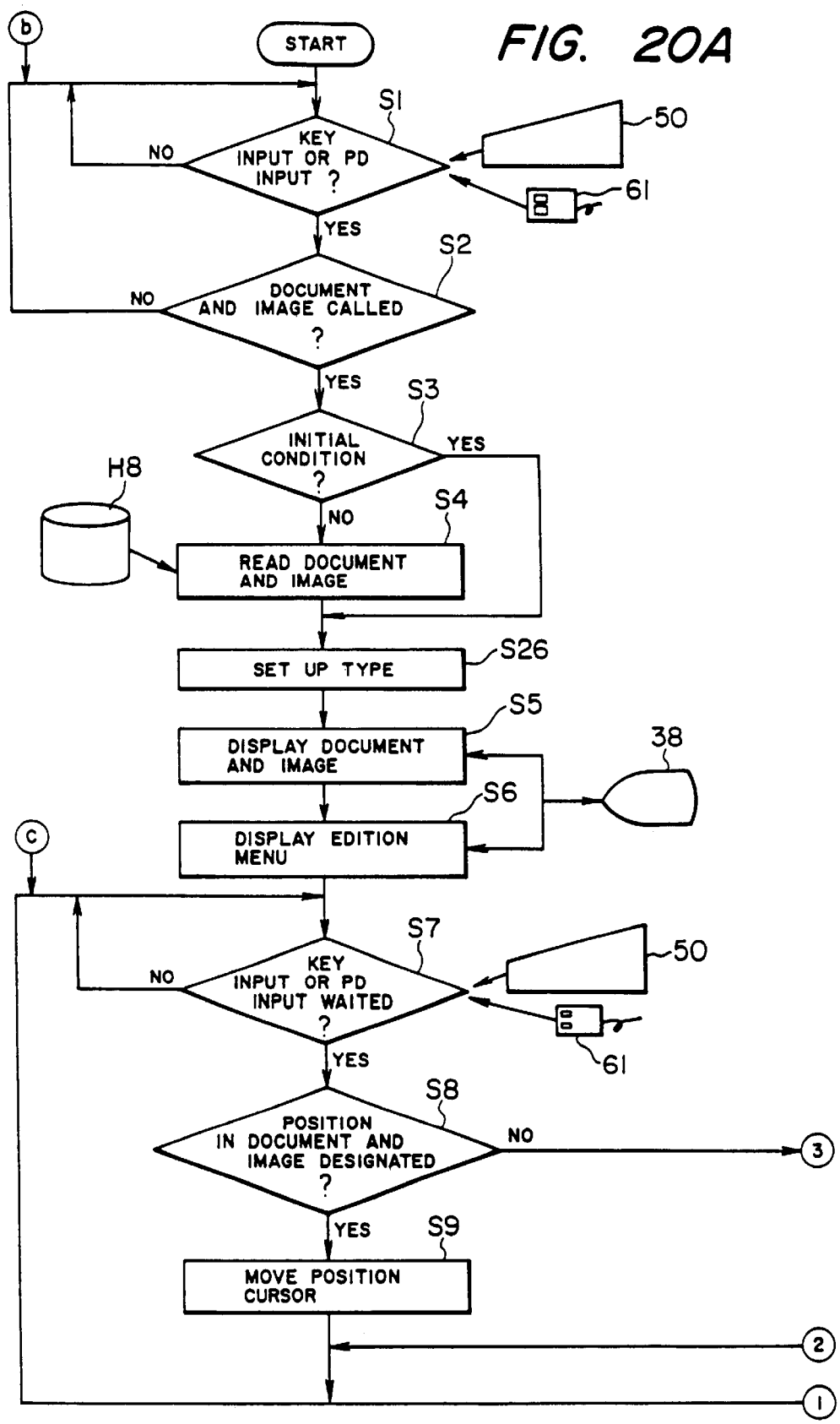
FIGS. 20A and 20B is a control flowcharts for a document process and a type set-up process.
Figure 20B:
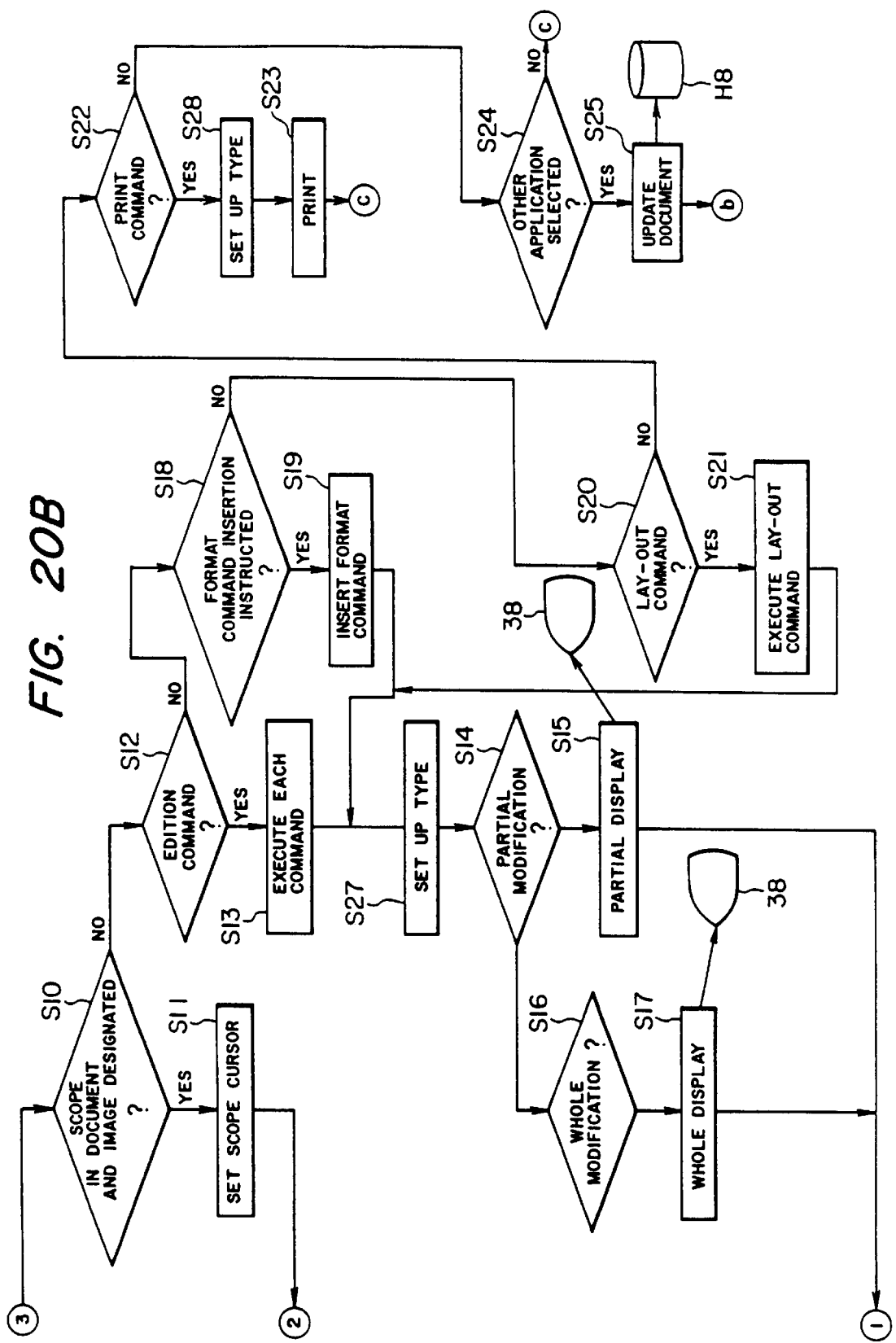
Figure 21B:
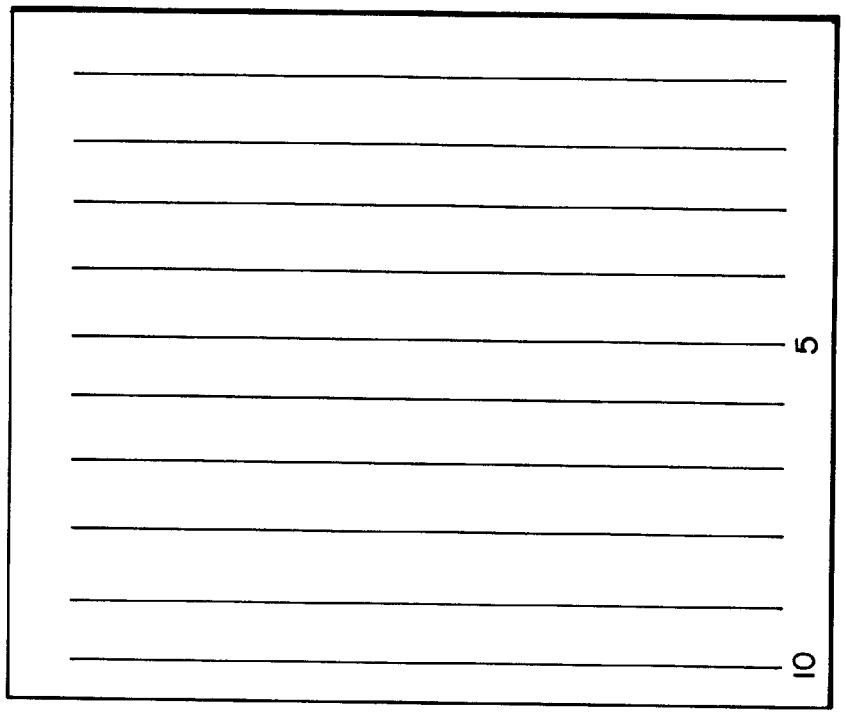
FIGS. 21A to 21D are diagrams showing examples of document display to which line numbers were added.
Figure 21A:
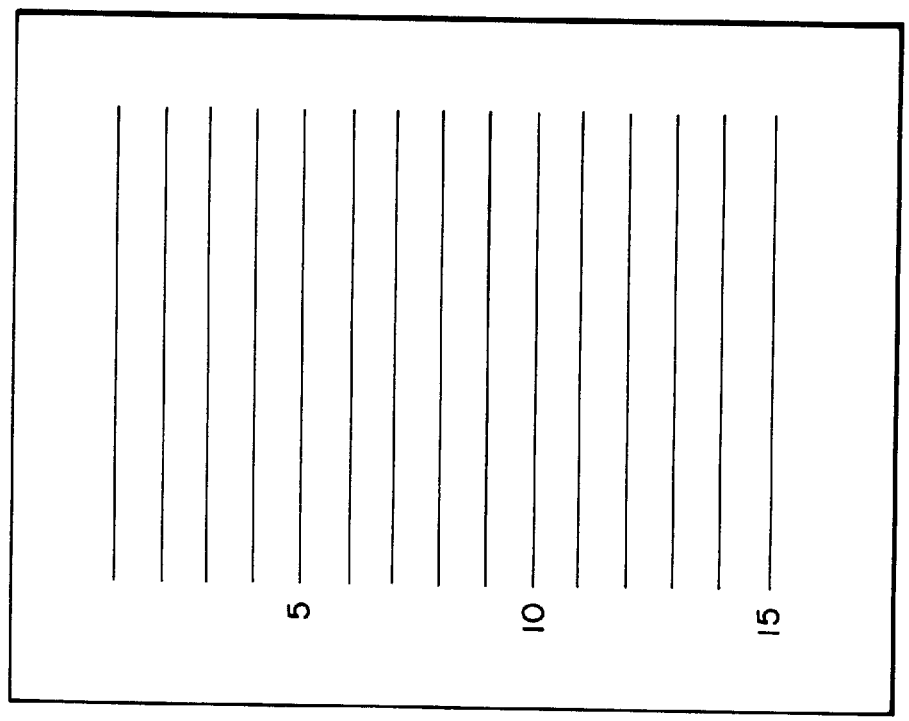
Figure 21D:
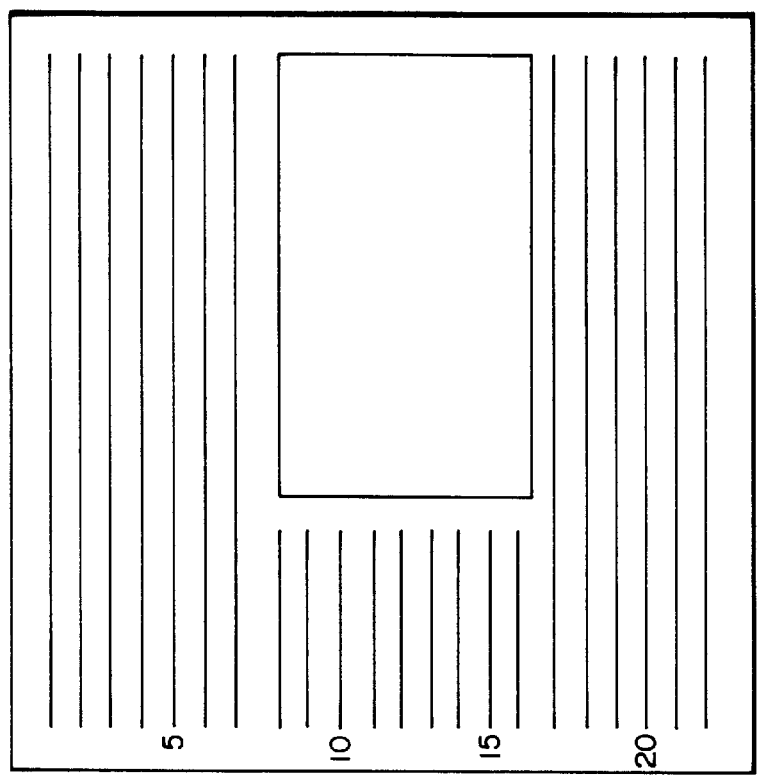
Figure 21C:
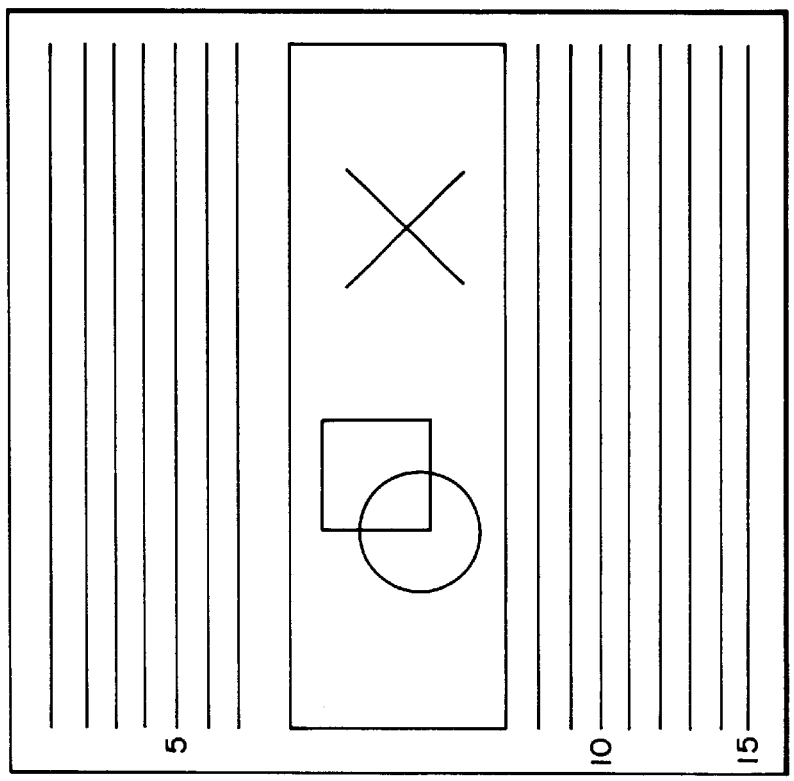

Although there are the overlapped portions, the line counter will then be described in detail with respect to the inputting and editing works by the use of the above-mentioned functions of registration and correction of formats in the files, setting of formats to the documents, correction of a part of the formats of the documents, etc. The type set-up process is a process such that when the document data including the image data is returned to the format data, it is developed into the memory to display it on the CRT or print and output it. For example, it is a process such that the data stored in the document data sentence section P-1 shown in FIG. 1-3 is converted into the image memory while referring to the document data format section P-2 and line information table P-3. Similar to FIG. 11, FIG. 20 is a control flowchart for, particularly, a document image process and a type set-up process in the image system having the constitution and functions as mentioned above. The term "document" includes image data. The descriptions of the key controller and the like are omitted for simplicity of explanation and all of these devices are managed by the MPU. In step S1, the MPU waits for the input from the keyboard 50 or P.D 61 or the like. When a key was inputted, a check is made to see if the calling of the document or image has been instructed or not (step S2). If NO, this case has no relation with the invention, so that its description is omitted in this specification. If YES, step S3 follows and check is made to see if no document data exists in the IMEM or PMEM and these memories are in the initial states of blank. If NO in step S3, the document data is called into the memory from the disk H8 or the like (step S4) and a type set-up process is executed in step S26, then step S5 follows. If YES in step S3, the documents exist in the memory; therefore, the processing routine is advanced to steps S26, S5, and S6 and the document data developed in the VRAM is subjected to a type set-up process and the edition menu is displayed on the CRT 38. In the next step S7, the MPU waits for the input by the key or P.D. For the input described in step S1, for example, in the menu section displayed on the CRT, a reader, a cabinet, an original paper, or the like is designated by the cursor by the P.D. or the like, thereby instructing the calling or the like of the document (101). The input step S7 is similar to that in step S1 or an input such that by moving the cursor onto the document 101 displayed on CRT, the position in the document is determined by the line information table P-3 in FIG. 1-3. In step S7, when the movement of the cursor CR is instructed, the cursor CR is moved as a position cursor in step S9. However, when the character train or the start point and end point of the area of the image data are instructed by the P.D or arrow AR, this area is designated. When the key of "Designate Scope" in the keyboard or menu section is instructed, the cursor CR is set as a scope cursor (steps S10 and S11).

In the next step S12, when an edition command such as line alignment or the like is inputted in the menu section 100, each edition command is executed in step S13. On one hand, when the insertion of a format command is instructed in step S18, the insertion of the format command is executed in step S19 and the code data such as, e.g., "Beginning of Headline" or the like is inserted in the document data. When a lay-out command is inputted, the lay-out command is executed in steps S20 and S21. When the print, e.g., an icon of the printer is instructed by the P.D, a print command in step S22 is inputted, a type set-up process in step S28 is executed, and a print process in step S23 is executed, so that the designated document is printed and outputted by the printer in accordance with the format. In steps S24 and S25, for instance, the document is updated as another application. In the case where, e.g., the mode to newly make a table is instructed, in step S25, the document is newly stored on the disk H8 or the document is called or updated, and thereafter, the processing routine is to ⓑ.

Steps S14 to S17 are steps for display control in the case of displaying the data in which only a part thereof was corrected or in the case of displaying the data in which the whole portion thereof was corrected in dependence on the state of the corrected portion after completion of the execution of each command.

In the above-described constitution, the line counter will then be explained.

FIGS. 21A to 21D show examples of display of the documents to which line counters were added. In these examples, the line counters are added for every five lines such as 5, 10, 15, . . . . This operation is performed in the type set-up process in steps S26, S27, and S28 in FIG. 20.

As described above, FIG. 1-3 shows the state of the document files in the PMEM H15. In addition to the line information table P-3, document data format section P-2, and document data sentence section P-1, the PMEM H15 has the line count register LCNT, character pointer ADR, and character count register NCNT as a line counter work area.

The character codes to be displayed are sequentially stored in the section P-1 and the line-feed codes and paging codes mixedly exist among those character codes. The display positions or development positions in the VRAM H4 of the respective characters are stored in the table P-3.

Therefore, the line feed or paging can be discriminated by the section P-1 and table P-3.

When the document data in the section P-1 is developed in the VRAM H4 and developed on the CRT 38, the characters are developed one by one with reference to the table P-3. If the line-feed code exists, the line is changed at that position. Even when no line-feed code appears, the line is changed after completion of the development of the characters as many as the number of characters of one line in the table P-3 in one line, and the next characters are developed in the next line.

In addition, information indicating how to develop the information in the document such as images, figures, or the like which do not have a line is also stored in the section P-2.

The control procedure of the line count will then be described hereinbelow with reference to a flowchart of FIG. 22.

Figure 22A:
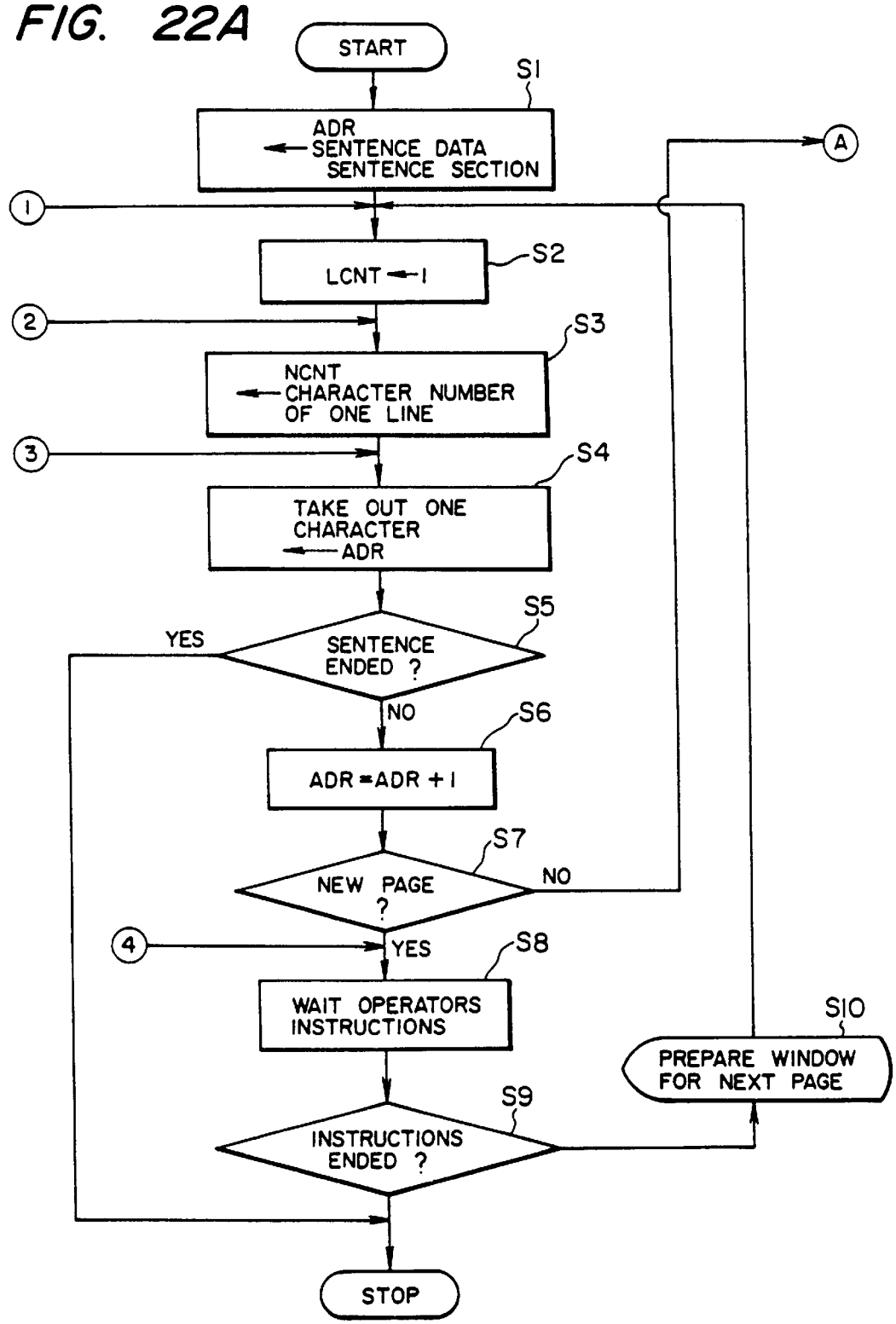
FIGS. 22A and 22B are control flowcharts for a line count.
Figure 22B:
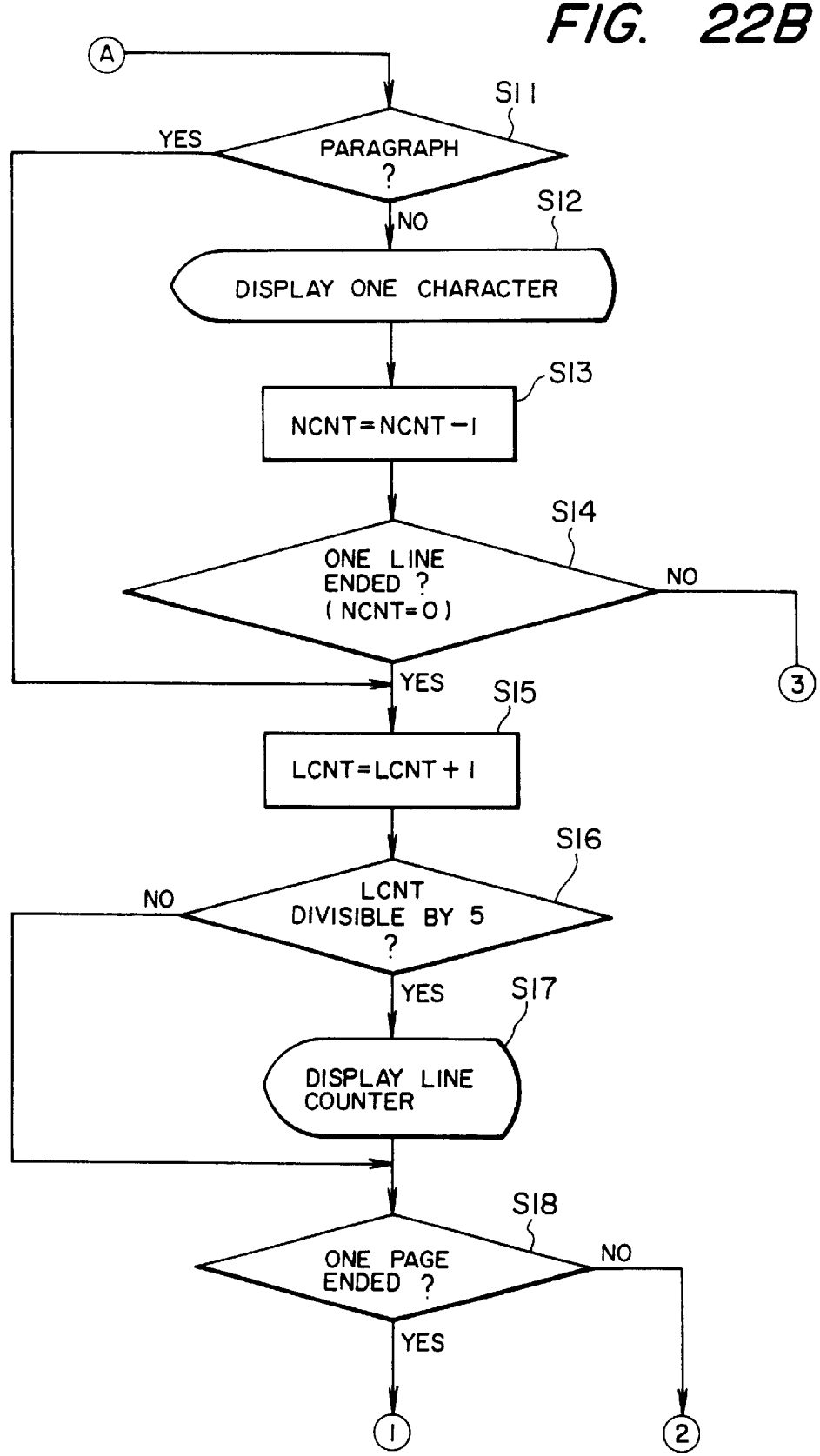

First, the processing routine is advanced to step S1 in FIG. 22 from the type set-up process in steps S26, S27 and S28 in FIG. 20, and the head address in which the document data is stored is loaded into the character pointer ADR. In the next step S2, an initial value "1" is loaded into the line count register LCNT. In step S3, the number of characters of one line is loaded into the character count register NCNT by reference to the table P-3 and section P-2. In step S4, the character specified by the character pointer ADR is readout. A check is then made in step S5 to see if the sentence has been finished or not. If finished, this control routine is completed. Unless finished, the character pointer ADR is increased by "1" in step S6. A check is made in step S7 to see if the character read out in step S4 is a paging code or not. If YES, the system waits for an instruction of the operator regarding whether the process should be finished or advanced to the new page in step S8. This instruction is discriminated in step S9. If it should be ended, the control is finished. If NO in step S9, the window for the next page is displayed in step S10 and the processing routine is returned to step S2.

If NO in step S7, a check is made in step S11 to see if the character read out in step S4 is a line-feed code indicative of a new paragraph or not. If YES, a value of the line count register LCNT is increased by "1" in step S15. If NO in step S11, the character read out in step S4 is displayed on the CRT 38 in step S12. In step S13, the character count register NCNT is decreased by "1". In step S14, a check is made to see if one line has been ended or not by discriminating whether the register NCNT is "0" or not. If NO, the processing routine is returned to step S4. If YES in step S14, the line count register LCNT is increased by "1" in step S15.

In the next step S16, a check is made to see if the value of the register LCNT is 5, 10, 15, . . . , or the like which can be perfectly divided by 5 or not. If NO, a check is made in step S18 to see if one page has been ended or not by checking the document data format section P-2. If YES in step S18, step S2 follows. If NO, the processing routine is returned to step S3. If the value of the register LCNT can be divided by 5 in step S16, the line counter is displayed at the neighboring position of the head of the next line in step S17. In this case, a numeral of the line counter is developed in the VARM H4 with reference to the table P-3 and displayed on the CRT 38 on the left or right side of the line head character train.

[Other Embodiments]

The line counter has values for every five lines in the foregoing embodiment; however, the present invention can be applied to other line counter for every ten lines or the like.

The invention can be obviously applied to the document written vertically or horizontally.

On one hand, although the line counter is displayed on the CRT in the embodiment, if the line counter is developed in the IMEM instead of the VRAM, it can be outputted by the printer (refer to FIGS. 21A to 21D).

As described above, according to the present invention, when a document is outputted, the line number can be added to the document for every predetermined lines and can output the document. In addition, the data in which the document data and image data mixedly exist can be outputted and the line counter can be accurately added to such mixed data and can output it.

[Cut an Paste]

In the constitution until FIG. 20, a cutting and sticking function will then be described.

Figure 23:
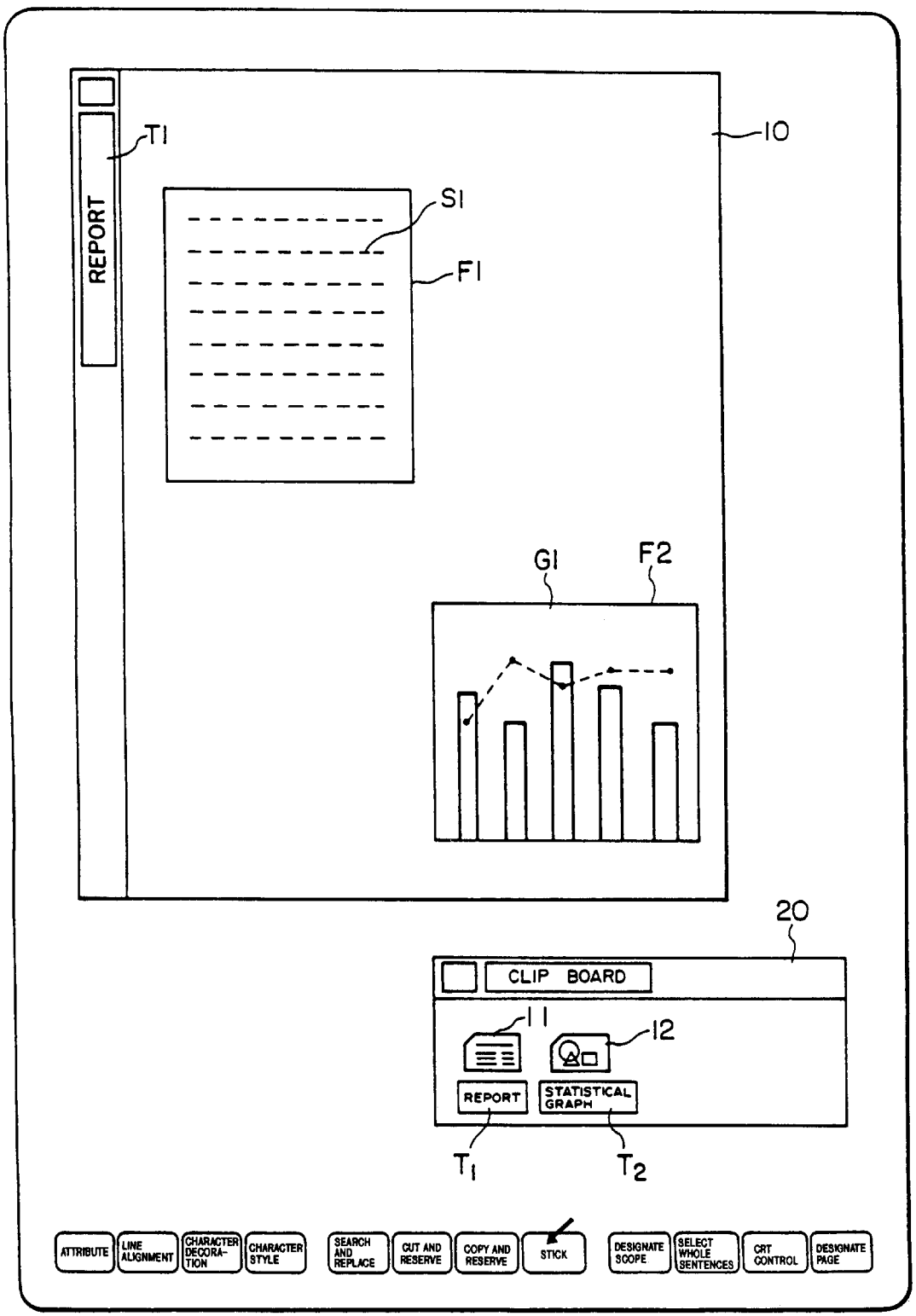
FIG. 23 is a diagram showing an example of display after execution of the cutting and pasting works.

FIG. 23 shows an example of display on the CRT 38 in the case where the cutting and sticking function was executed.

F1 denotes a frame to cut; S1 is a sentence data to be cut; I1 is an i-con (picture character) showing the sentence data which was cut; T1 an original file name from which the i-con I1 was cut; I2 an i-con showing the image data which was cut; T2 an original file name from which the i-con I2 was cut; F2 a frame in which the data indicated by the i-con I2 is inputted and G1 a display in which the data indicated by the i-con I2 was sticked.

In operation, after the scope of the frame F1 was designated in step S10 in FIG. 20, by indicating the i-con of "Cut and Reserve" by the pointing device 61, the i-con I1 and filed name T1 are displayed. After the i-con of "Stick" and the i-con I2 were indicated by the P.D 61, when the left upper top point of the frame F2 is indicated, the data which is cut when the i-con I2 is displayed is displayed in the frame F2.

Figure 24:
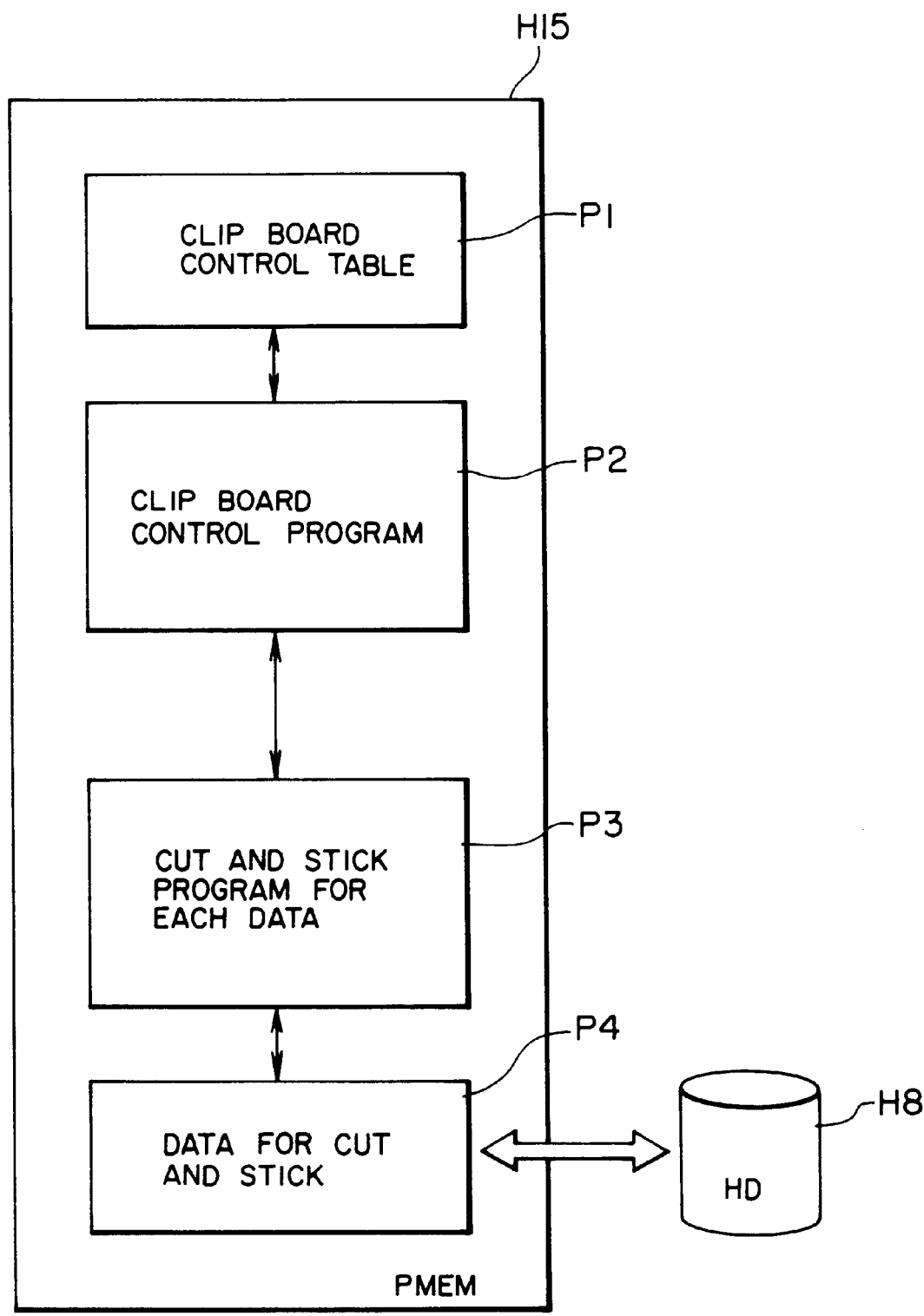
FIG. 24 is a diagram showing data storage areas for cutting and pasting.

The control in this case will then be described hereinbelow with reference to flowcharts of FIGS. 26A and 26B. Programs based on these flowcharts are stored in the PMEM H15. In connection with those programs, a clipboard control table, a clipboard control program, and a storage area of the data to cut and stick are provided in the PMEM H16 and they are shown in FIG. 24.

Figure 25:
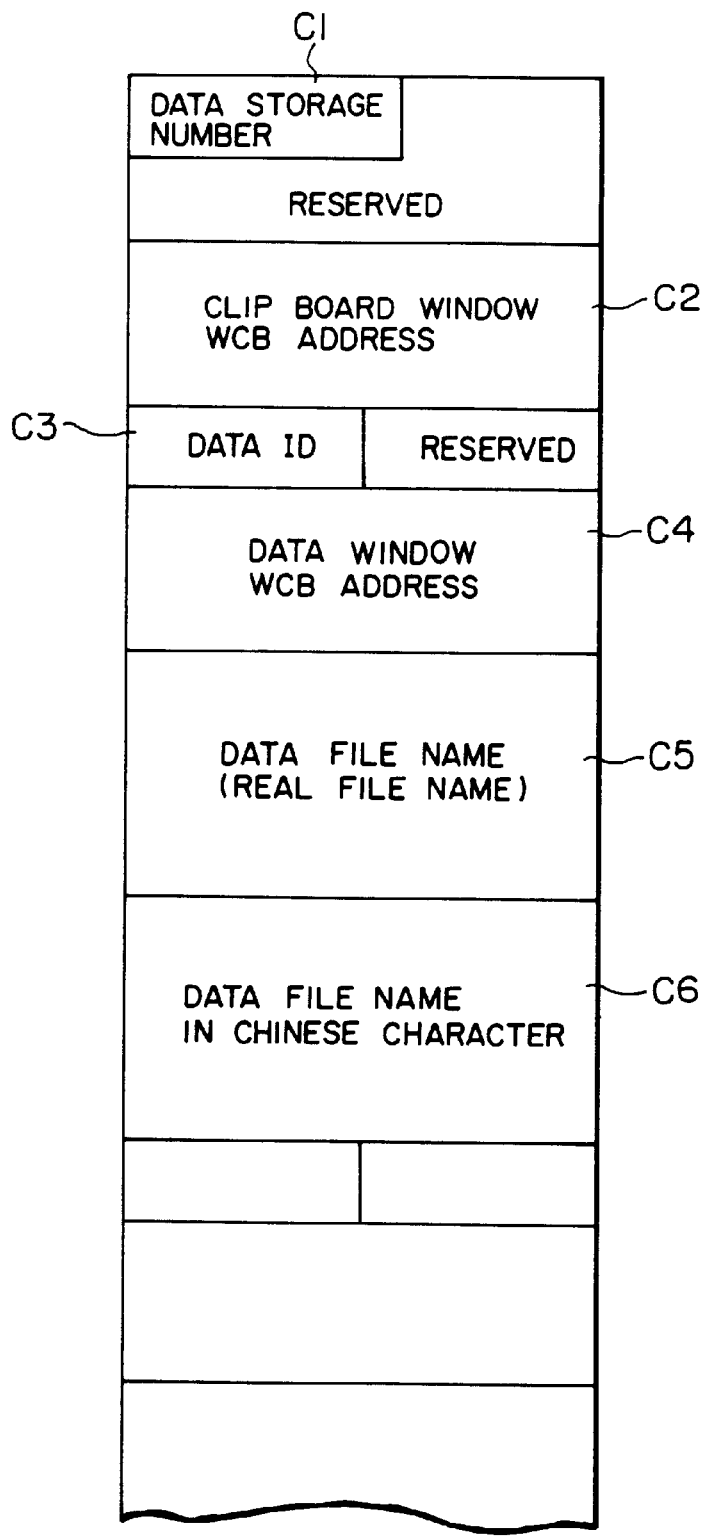
FIG. 25 is a diagram showing a clipboard control table.

FIG. 25 shows the details of the clipboard control table. C1 denotes a data storage number and the value indicative of the number of data stored in the clipboard control table is stored in this area. C2 is a clipboard window WCB address and the address in which the data relative to the clipboard is stored is stored in this area. C3 is an area in which the code indicative of the kind of data which was cut by the data ID is stored. For instance, code "1" denotes the sentence data, code "2" represents the figure data, and so on. C4 is a data window WCB address and the information regarding the data which was cut is stored in this area. C5 is a data filed name and the file name to be added to the data which was cut is stored in this area. C6 is a data filed name in Chinese character and the original file name of the data which was cut is stored in this area. The areas C3 to C6 are provided for one information which was cut and up to five information can be stored.

The control procedure to cut will be described with reference to the flowchart of FIG. 26A. First, after the scope was designated in step S10 in FIG. 20, by moving the cursor by the pointing device 61 and indicating "Cut and Reserve", the data in the scope designated in step S16-1 is stored on the disk H8 by a format as shown in FIG. 27, and the file name of that data and the name of the original filed from which the data was cut are added as file names in Chinese character. In step S16-2, the data ID C3 of the clipboard control table, the data window WCB address C4, data file name C5, and data file name in Chinese character C6 are stored and registered. In step S16-3, a check is made to see if the clipboard has been displayed on the CRT 38 or not by discriminating the data in the VARM H4 or PMEM H15. If NO, the cutting work is ended. If YES, the i-con is displayed on the clipboard in step S16-4. In step S16-4, the i-con is displayed by reference to the data ID C3 of the clipboard control table and data file name in Chinese character C6. Namely, when the i-con pattern corresponding to the data of the data ID C3, for example, the data indicative of the document data is included in the data ID C3, the i-con I1 shown in FIG. 23 is displayed, when the data indicative of the image data is included in the data ID C3, the i-con I2 shown in FIG. 23 is displayed. The above-mentioned data is displayed near the i-con with reference to the data file name in Chinese character C6.

The control procedure to stick will then be described with reference to the flowchart of FIG. 26B.

First, when the cursor is moved by the pointing device 61 and the i-con of "Stick" is indicated, a clipboard 20 is displayed as shown in FIG. 23 in step S17-1. In step S17-1, the i-con as many as only the number of data stored and the clipboard 20 are displayed on the CRT 38 by reference to the clipboard control table P1.

Namely, in accordance with the information in the address specified by the clipboard window WCB address C2, the clipboard 20 displays the i-con with reference to the data ID C3 of the clipboard control table and to the data file name C6 in a manner similar to step S16-4 in FIG. 26A.

When the i-con indicative of the data to be sticked is instructed by operating the pointing device 61 while watching the pattern of the i-con and the file name near this pattern in step S17-2, the data is read out from the disk H8 in accordance with the data window WCB address C4, data ID C3, and data file name C5 and is stored into the data area P4 to cut and stick in the PMEM H15.

In step S17-3, the stick position is indicated by the P.D 61. Then, in step S17-4, the data in the data area P4 to cut and stick is transferred to the position specified in step S17-3 and displayed on the CRT 38 with reference to the format so as to be included in the data of the file in the PMEM H16 which is at present being displayed.

As described above, according to the present invention, it is possible to recognize which data should be sticked or from which data the cut data was taken out upon cutting and sticking works, so that the works can be efficiently acrried out. In addition, it is possible to register even if no clip-board is displayed. Therefore, the cutting work can be easily performed and it is prevented that the operator becomes confused due to the display of the clipboard. Further, when the sticking work starts, the clipboard is displayed, so that the operation procedure is simplified.

[Type Set-up Process]

The type set-up process will be further described in detail hereinbelow in the system constitution and flow of the image (document) processes described in the above. The document data sentence section P-1 shown in FIG. 1-3 consists of the commands to insert the formats such as "Headline", "Nombre", "Catchword", "Definition of Body", etc. and the code data including the character train and the like into which those commands are inserted. In the type set-up process, the character code data in the section P-1 is converted to the actual bit image data with reference to the data regarding the "Headline" and the like in the document data format section P-2 (which will be described in conjunction with FIG. 28-4 hereinafter) in FIG. 1-3.

The type set-up process will then be further described hereinbelow with reference to the drawings. First, an example whereby the document data including no format command is displayed on the CRT and format commands are inserted into this data and thereby to reform the document will be explained.

Figures 3, 28:
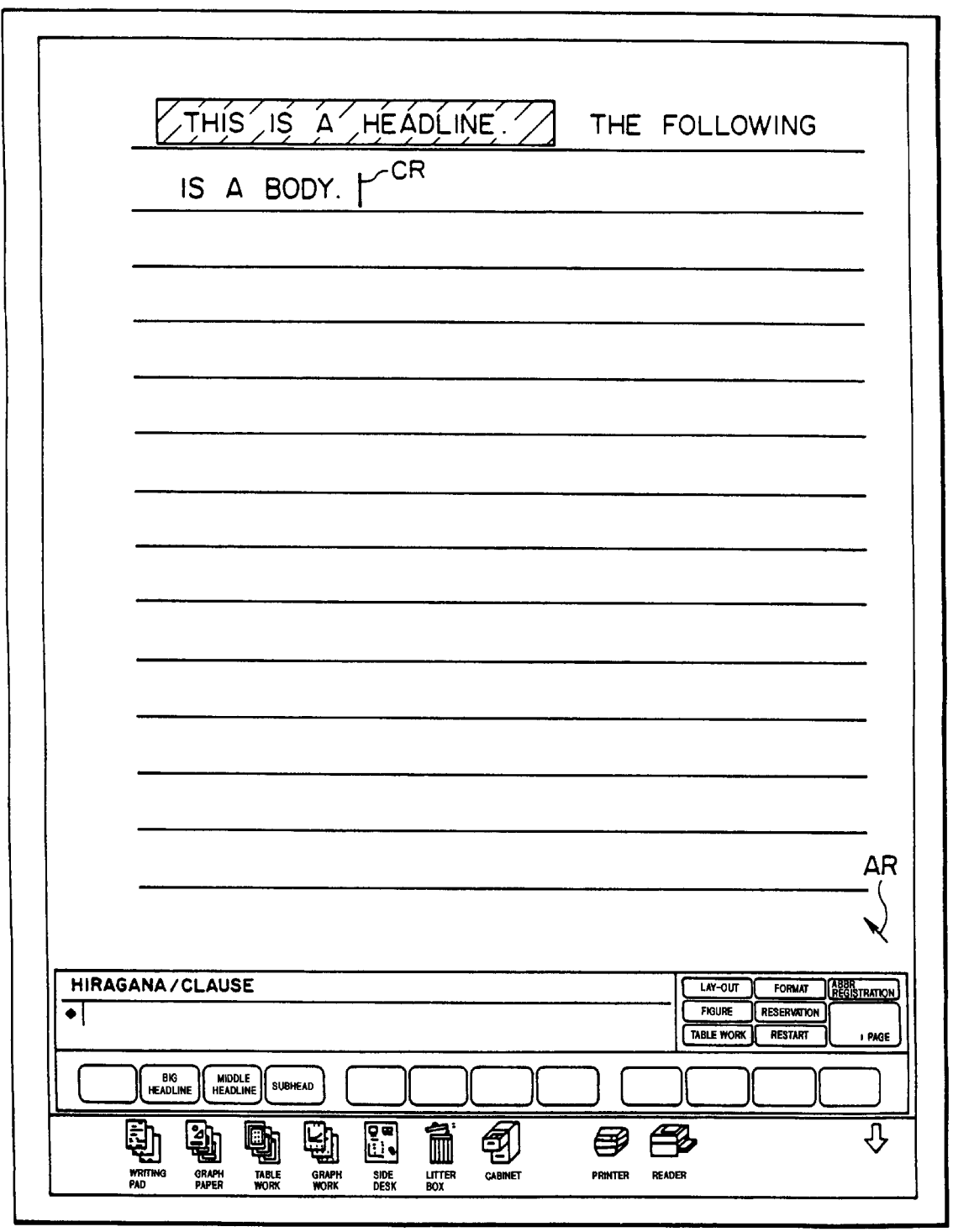
Figures 6, 28:

FIG. 28-1 shows the code data of the sentence including no format command. This code data is stored in the disk memory H8 or PMEMs H15 and H16 in FIG. 1-2. When this data is subjected to the type set-up process (step S26 in FIG. 20), the character train (sentence) is all regarded as the body. FIG. 28-4 is a diagram showing the details of the document data format section in FIG. 1-3. The character train regarded as a body mentioned above is converted to the bit image data by the information such as the kind of character, space between characters, line spacing, etc. which are defined in a body definition section P-I in FIG. 28-4 with reference to the section P-I and is displayed on the CRT as shown in FIG. 28-2 (step S5 in FIG. 20). In this case, since all of the character train is considered as a body, "Headline" or the like does not apparently exist. Next, when the scope cursor CR is operated and "This is a headline." is selected and instructed from this character train due to a process to designate the scope in the document (steps S10 and S11 in FIG. 20), as shown in FIG. 28-3, the portion specified is subjected to a white-black inverting process or hatched, so that the display screen representing that the scope was designated is derived.

Next, when the i-con (picture) indicative of the command of "Big Headline" displayed in the lower portion of the screen shown in FIG. 28-2 is instructed by the arrow AR, the character train is recognized such that it has the attribute of "Big Headline", so that the format commands of "Beginning of Big Headline" and "End of Big Headline" are inserted into the sentence data in the code data as shown in FIG. 28-5 due to the format command insertion executing process in step S19 in FIG. 20. In the type set-up process (step S27 in FIG. 20), on the basis of the data shown in FIG. 28-5, the character train of "Big Headline" is actually developed in the memory (e.g., IMEM) by the information such as kind of character, space between characters, line spacing, and the like which are defined indepenedtly of the body with reference to a headline section P-II in the definition of format shown in FIG. 28-4. FIG. 28-6 is a diagram showing an example of display of the screen in the case where the characters larger than "Definition of Body" were set as a kind of character of "Big Headline" in the above-mentioned steps. The type set-up process has been described in the above with respect to the example of "Headline". However, in the case where "Nombre" is instructed, the Nombre (page number) may be outputted by the print position, kind of character, and the like which were likewise set whenever the development of the image (document) data of one page into the memory is finished with reference to a group of information such as "Nombre" (P-IV), "Catchword" (P-III), and the like in the definition of format which are needed to be outputted for every page in a similar manner. On one hand, if the use of the character train of the big headline as a catchword is similarly instructed in the definition of "Catchword", the "Catchword" is likewise developed and outputted to the position specified.

[Nombre]

The "Nombre" process in the foregoing type set-up process will be further described in detail. The "Nombre" process is mainly divided into the following two kinds of processes.

Figures 1A, 29:
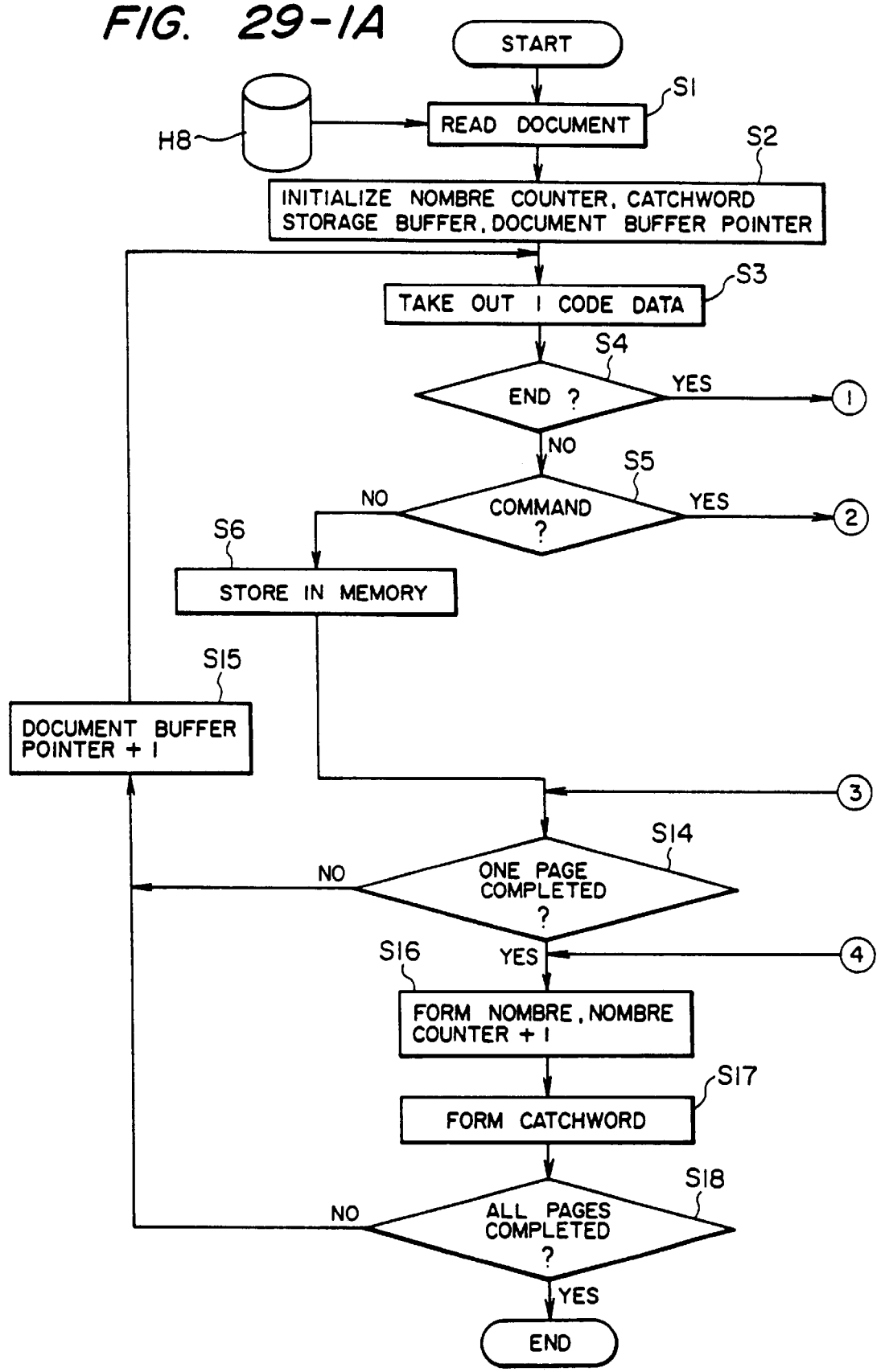
FIGS. 29-1A and 29-1B are flowcharts for a type set-up process including headlines, Nombre and catchwords.
Figures 1B, 29:
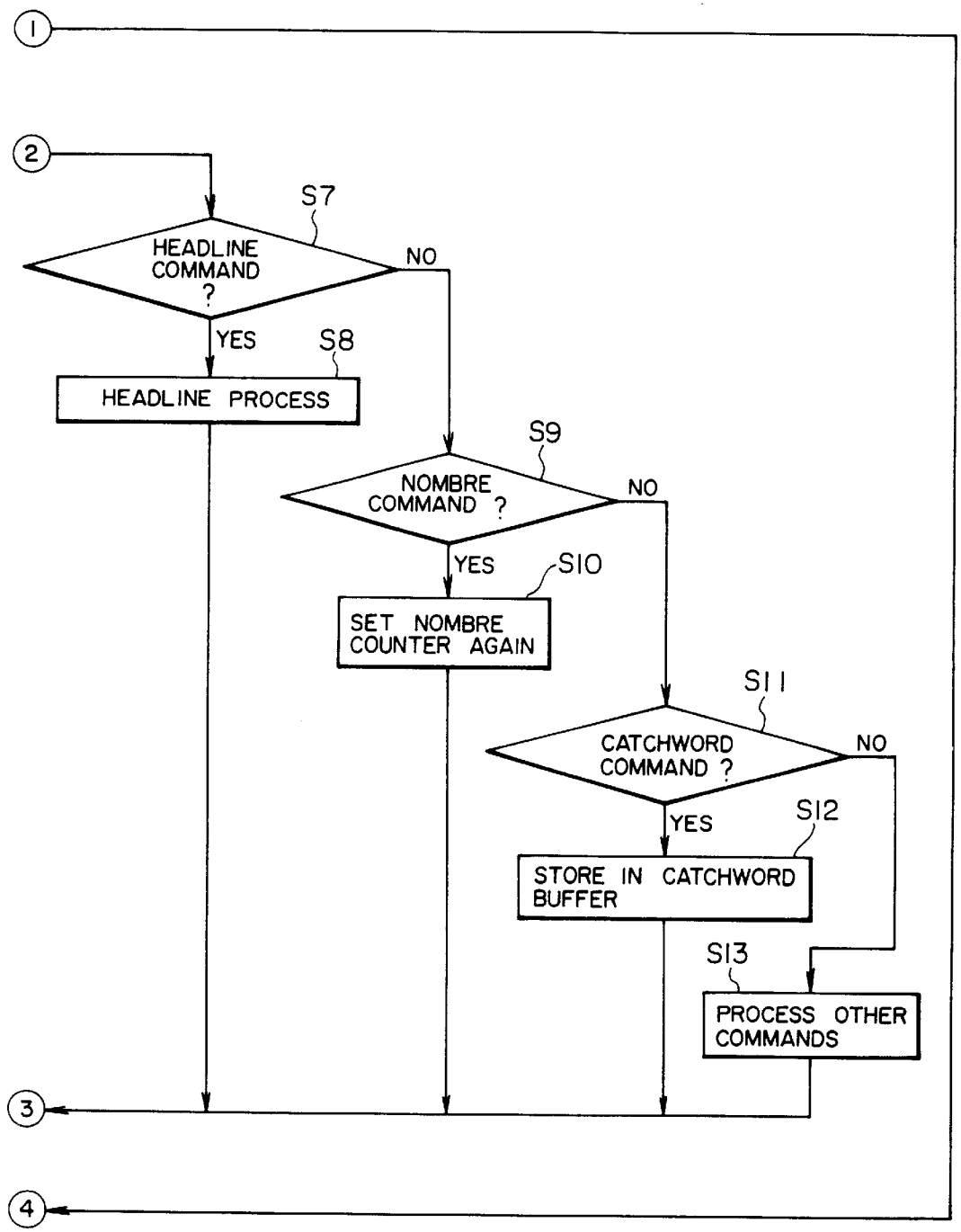
Figures 2, 29:
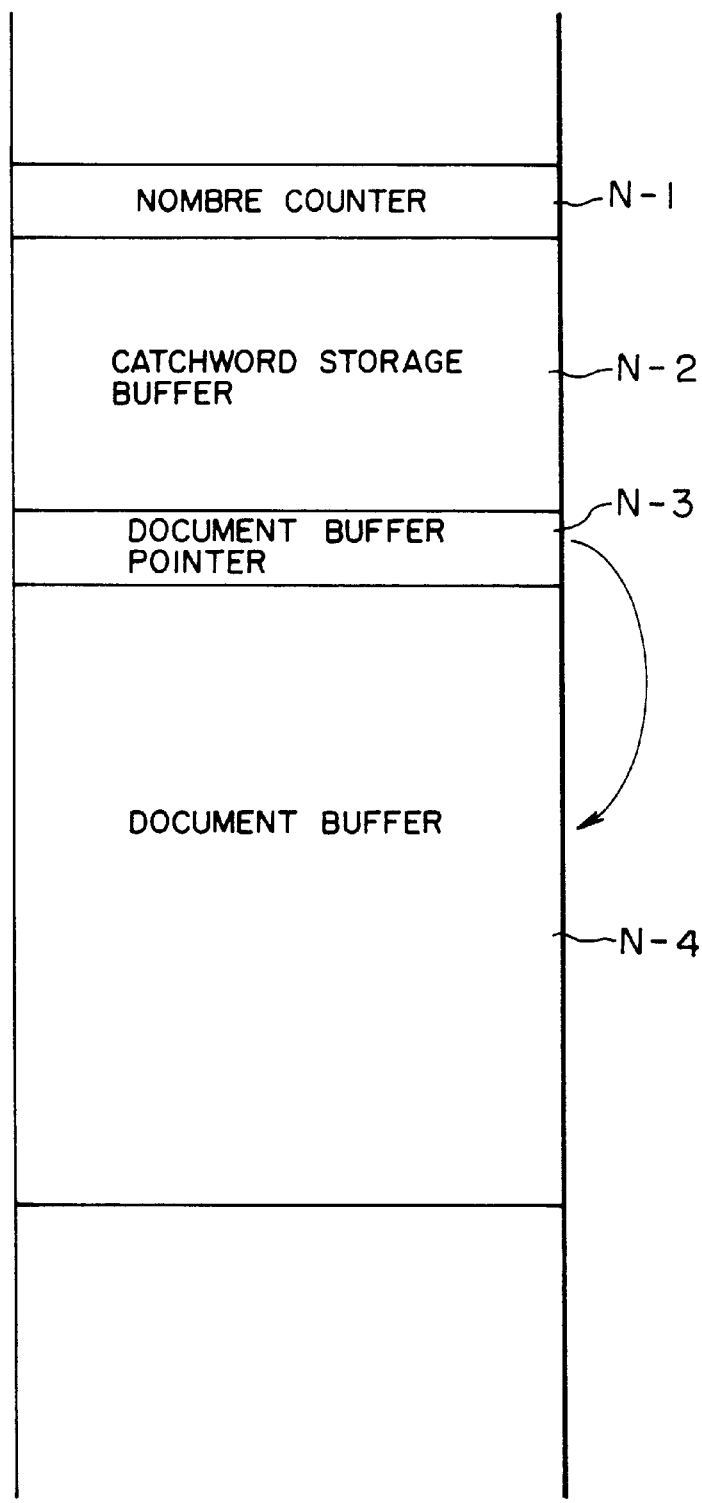
Figures 3, 29:
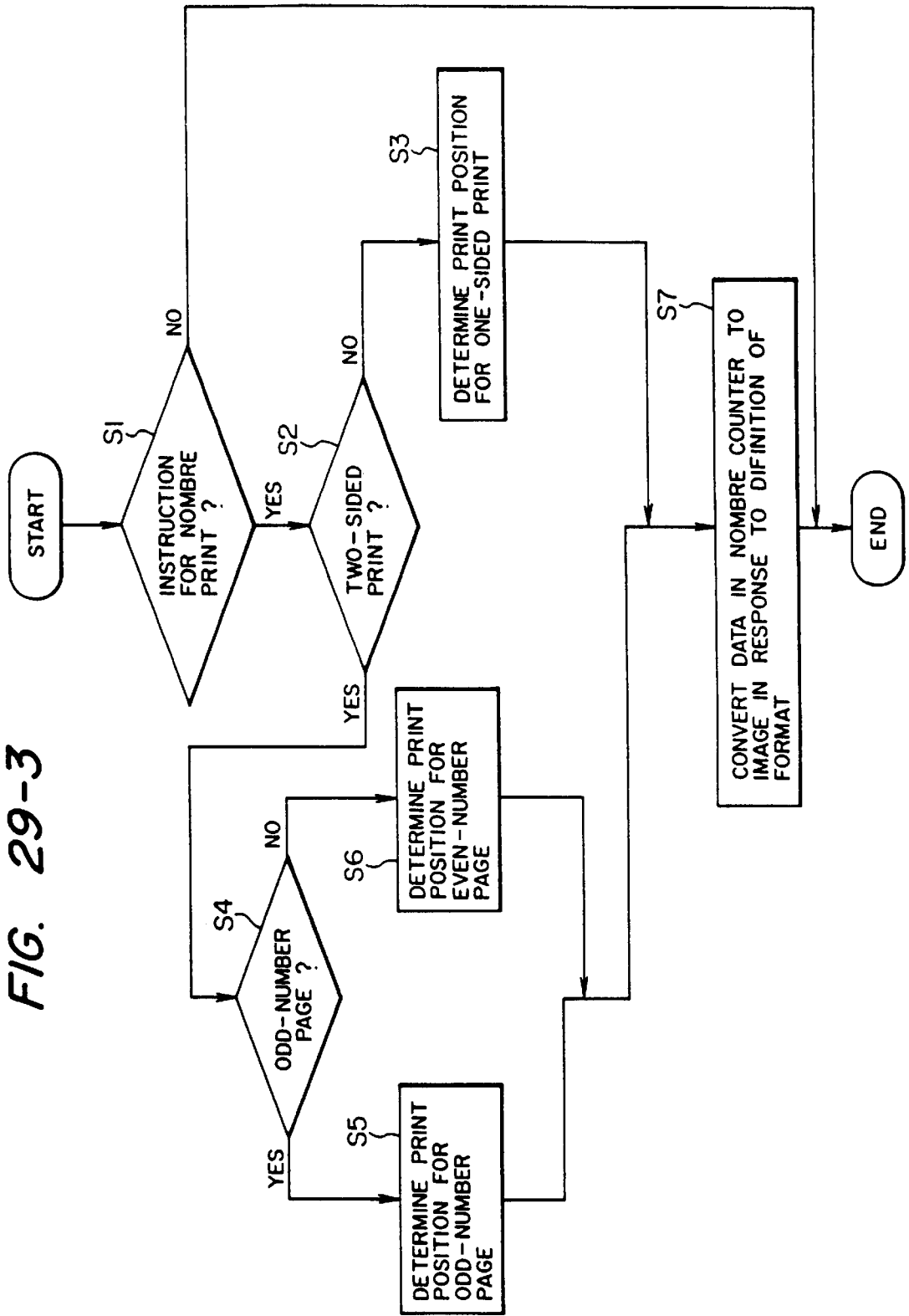
Figures 4, 29:
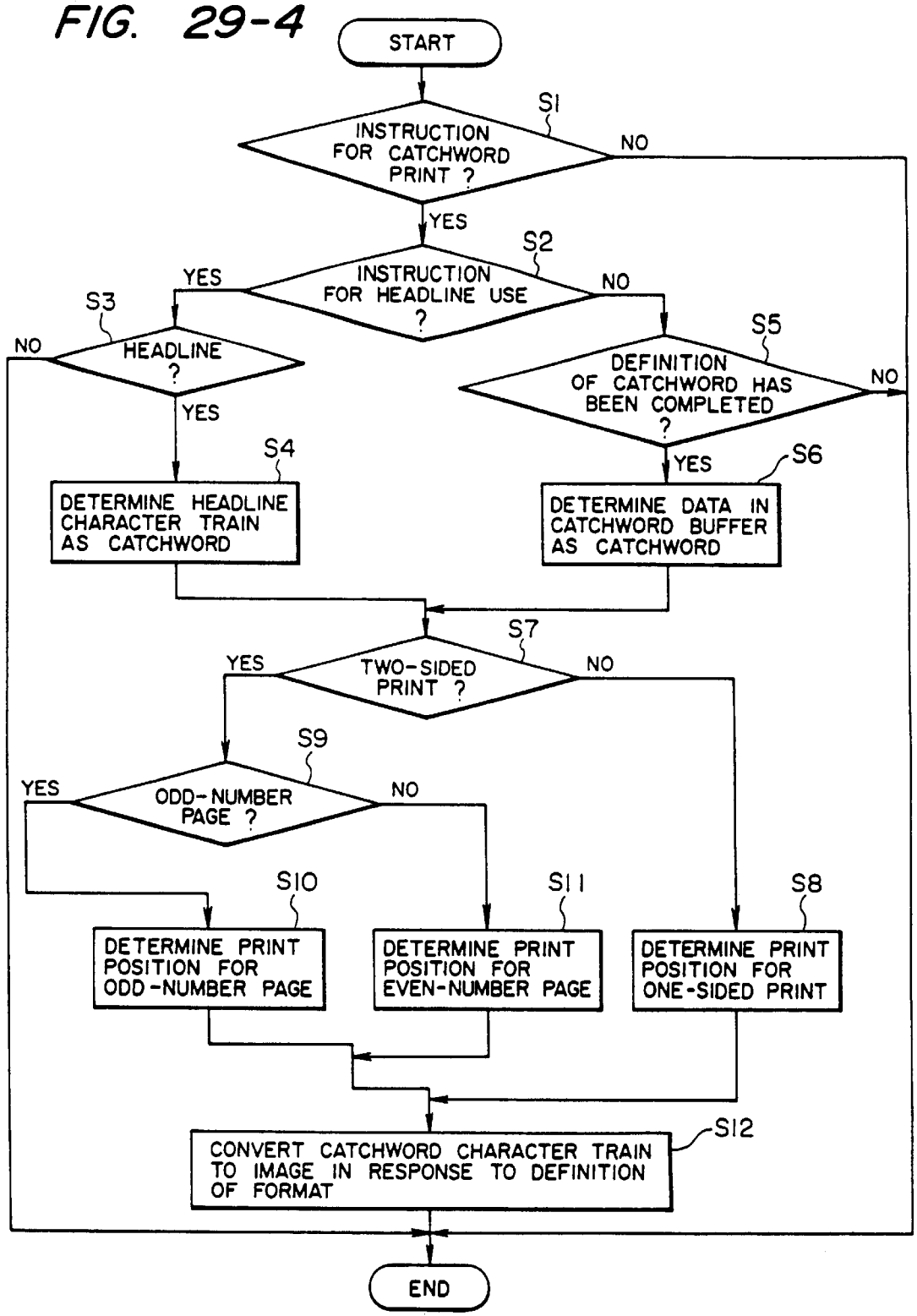
Figures 5, 29:
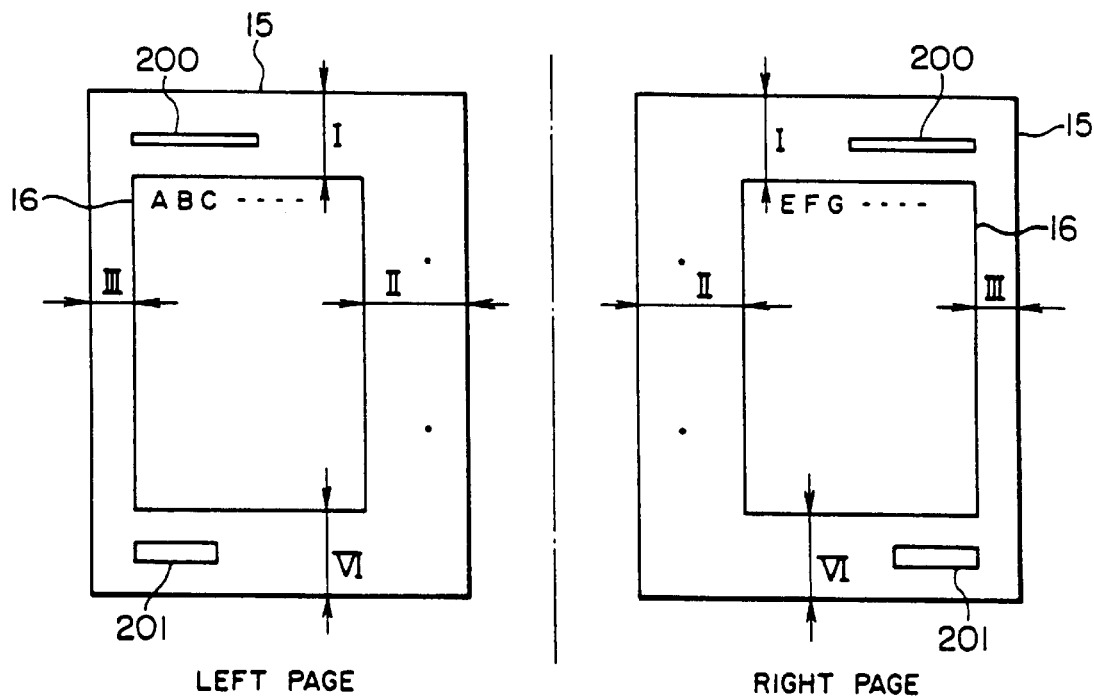
Figures 6, 29:
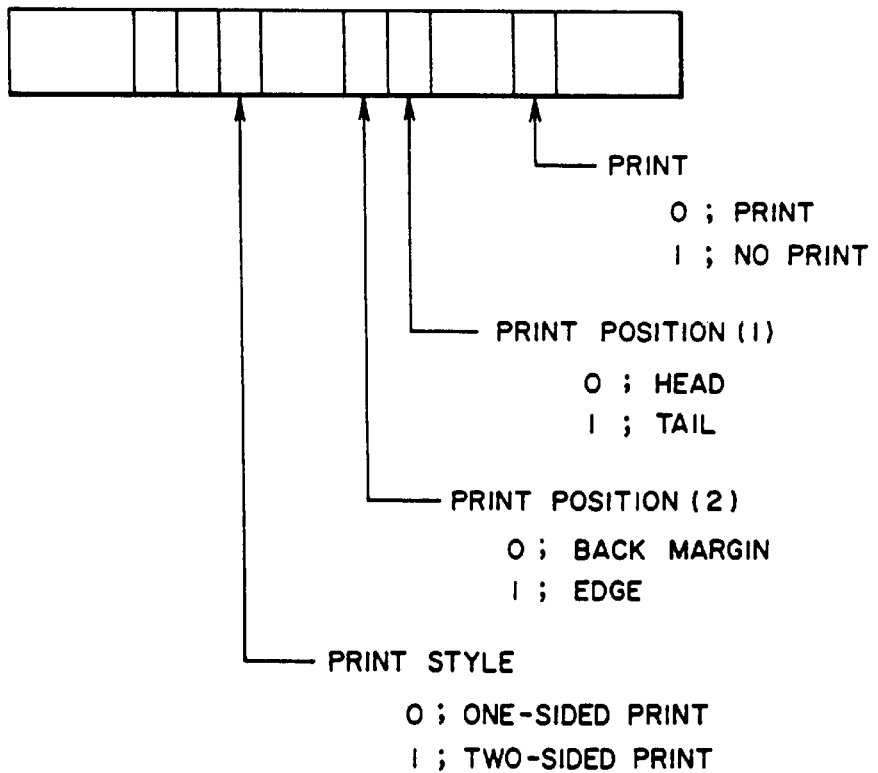
Figures 7, 29:
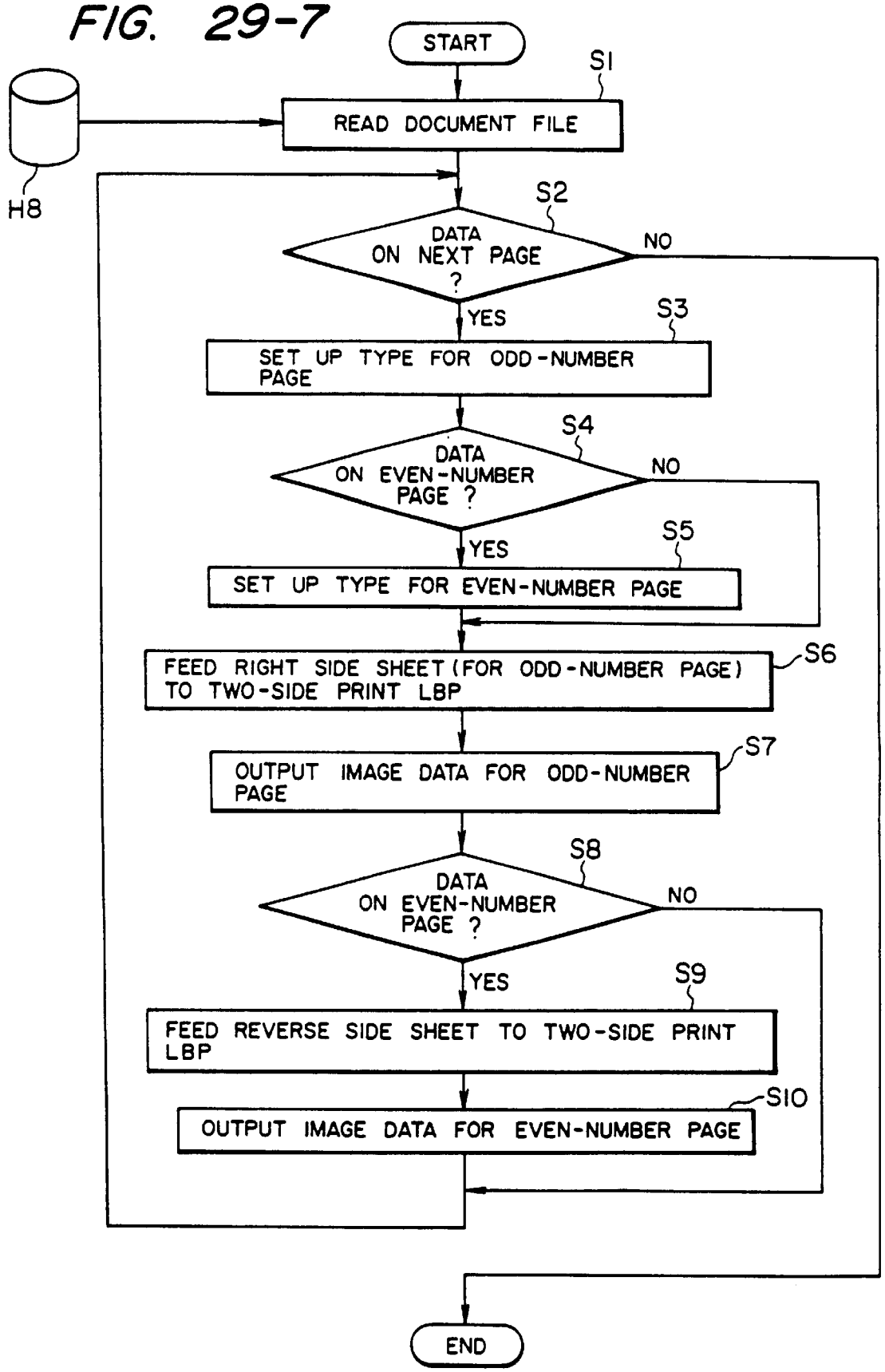

(1) When the character code data in the document data sentence setion P-1 is being converted to the image, if a "Set Nombre" command similar to the data shown in FIG. 28-5 in the character code data is detected, the value of "Nombre Counter" in the memory map in the PMEM shown in FIG. 29-2 is changed to the value indicated by the "Set Nombre" command (step S10 in FIG. 29-1).

(2) After the character code data in the document data sentence section P-1 as much as one page was developed, the Nombre is added to this page (step S16 in FIG. 29-1).

Since the process in the item (1) is similar to the above-mentioned headline process, its detailed description is omitted.

FIG. 29-1 is an explanatory diagram for the above-mentioned Nombre and catchword processes. In step S1, the image data (including the document data) is read out from the file H8 in a manner similar to step S4 in FIG. 20. In step S2, a Nombre counter N-1, a catchword storage buffer N-2, and a document buffer pointer N-3 in the memory map in the PMEM shown in FIG. 29-2 are initialized. In the next step S3, one code data is taken out since the document buffer pointer N-3 indicates the data in a document buffer N-4. In step S4, if the data is ended, step S16 follows. If NO, step S5 follows and a check is made to see if the data indicated by the pointer N-3 is a command or not. If NO in step S5, the data is the character train (including the image as well), so that it is developed as it is in the memory in step S6 and then step S14 follows. If the data is the command in step S5, a check is made in step S7 to see if it is the headline command as described in FIG. 28-5 or not. If YES, the headline process in step S8 is executed in a manner as described in FIG. 28-6, then step S14 follows.

If NO in step S7, a check is made to see if the command is a Nombre command (corresponding to the foregoing process (1)) or not in step S9. If YES, the Nombre counter N-1 shown in FIG. 29-2 is reset to the value indicated by the command in step S10 and then step S14 follows. If NO in step S9, a check is made to see if the command is a catchword command or not in step S11. If YES in step S11, the data indicated by the command in the catchword buffer is stored in the catchword storage buffer N-2 in step S12, then step S14 follows. If NO in step S11, other commands (for example, an itemization command) are executed in step S13, then steps S14 follows. A check is made in step S14 to see if the process of the data of one page has been finished or not. If NO, step S15 follows. If YES, the Nombre is made in step S16 to produce the data of one page including the catchword, Nombre, and the like; in addition, the Nombre counter is increased by "1" to increase the page for every page. Further, the catchword is made in step S17 on the basis of the data stored in the catchword buffer. A check is then made in step S18 to see if all pages have been completed or not. If YES, the processing routine is ended. If NO, the document buffer pointer is increased by "1" in step S15 and the next one code data is taken out in step S3. If the code indicative of the end is detected in step S4, the take-out of the code is ended and step S16 follows.

The case of the foregoing process (2) in the Nombre process will then be further described in detail with reference to FIG. 29-3. This process is also executed with reference to the definition of format similarly to other type set-up processes in a manner similar to the above. First, in step S1 in FIG. 29-3, with reference to a Nombre definition section P-IV of the definition of format in FIG. 28-4, a check is made to see if the Nombre output (print) into the flag train in the section P-IV has been instructed or not. If NO, the processing routine is ended. If YES in step S1, a check is made in step S2 to see if the printing mode is the two-sided print or not. The term "print" is not limited to the case where data is outputted onto a paper but it obviously includes the case where the output styles of both faces are displayed on the CRT. If NO in step S2, the Nombre print position for the one-sided print is determined in step S3 and step S7 follows. If YES in step S2, step S4 follows. The flag train in the Nombre definition section P-IV will then be described. FIG. 29-5 is an explanatory diagram of an output style of a page. FIG. 29-6 is a diagram showing an example of the flag train. Although FIG. 29-5 is similar to FIG. 4, it is attached to described the two-sided output and the positions of the back margins II and edges III are opposite with respect to the right and left sides. A reference numeral 200 denotes a catchword print position and 201 is a Nombre print position. It is obvious that these positions may be set at any positions on the upper, lower, right, and left sides. In addition, image information may be apparently included in the catchword and Nombre. As shown in FIG. 29-6, there are at least four kinds of flags: the first flag indicates "Print" (0) or "No Print" (1); the second flag denotes the print position (1) of "Head" (1) or "Tail" (1); the third flag shows the print position (2) of the "Back Margin" (0) side or "Edge" (1) side; and the fourth flag represents the print style of "One-sided Print" (0) or "Two-sided Print" (1). By reference to those flags, if YES in step S2 in FIG. 29-3, namely, if the print style of the flag train shown in FIG. 29-6 is "1", a check is made in step S4 to see if the page is the odd-number page or not with reference to the Nombre counter N-1 shown in FIG. 29-2. If YES in step S4, step S5 follows and the print position for the odd-number page is determined by reference to the flag in FIG. 29-6 and the data in the Nombre definition section P-IV in FIG. 28-4. In the case of the odd-number page as well, the print position is likewise decided in step S6. Actually, for instance, the data exists on the edge side in the flag train and the position of the edge of the Nombre character train is decided by the position ¹⁄₁₀ mm of the Nombre definition section. After the print position was determined in this manner, in step S7, the numerical value in the Nombre counter (FIG. 29-2) is converted to the image in response to the character style and character point number which have been defined in the Nombre definition section P-IV in the definition of format in FIG. 28-4. Due to the above-mentioned processes, even in the two-sided print mode as well, the "Nombre" can be printed at the symmetrical positions on the right and left sides of the double spread pages. By modifying the format definition in accordance with the procedure shown in FIG. 10, the Nombre of an arbitrary character style and size can be developed at an arbitrary position of an output medium. On the other hand, "symbol" shown in the definition of Nombre in FIG. 28-4 denotes marks such as "(1)", "~1~", or the like written on the sides of the page number.

[Catchword]

A catchword process in the type set-up process will then be described in detail.

The catchword process can be mainly divided into two kinds of processes.

(1) When the character code data in the document data sentence section in FIG. 1-3 is being converted into the image, if a "Beginning of Definition of Catchword" command and an "End of Definition of Catchword command are detected in the character code data, the character train code data sandwiched by those two commands is stored into the catchword storage buffer N-2 shown in FIG. 29-2 (steps S11 and S12 in FIG. 29-1).

(2) After the character code data of one page in the document data sentence section P-1 was develped, the "catchword" is formed and added to this page (step S17 in FIG. 29-1).

The case of the process (2) will be mainly explained hereinafter.

FIG. 29-4 is a flowchart for the catchword process. This process is also executed with reference to the definition of format in a manner similar to the above. First in step S1, a check is made to see if the catchword print (output) into the flag train (e.g., FIG. 29-5) has been instructed or not by reference to a catchword definition section P-III of the definition of format shown in FIG. 28-4. If YES, a check is made in step S2 to see if the use of the headline sentence of that flag has been instructed or not in FIG. 29-4. In other words, if there is the headline, it is automatically used as a catchword. In the next step S3, a check is made to see if a headline exists or not. If NO, the processing routine is ended.

If a headline exists is step S3, it is used as a catchword in step S4.

If NO in step S2, a check is then made in step S5 to see if the definition of catchword P-III has been completed or not. If YES, the content in the catchword storage buffer N-2 shown in FIG. 29-2 is used as a catchword in step S6.

The content of the catchword is determined in this way. The position of the catchword will then be described in conjunction with the two-sided print in step S7 and subsequent steps. In step S7, the print style of the flag shown in FIG. 29-6 is checked. Namely, the flag is "1" in the case of the two-sided print and is "0" in the case of the one-sided print. If NO in step S7, the print position for the one-sided print is determined in step S8. If YES in step S7, a check is made in step S9 to see if the page is the odd-number page or not by reference to the Nombre counter N-1 in FIG. 29-2. If YES in step S9, the print position for the odd-number page is decided in step S10. If NO in step S9, the print position for the even-number page is determined in step S11. In the example of FIG. 29-5, by instructing the edge or back margin in the flag train shown in FIG. 29-6 at the position of ⅟₁₀ mm in the catchword definition section P-III in FIG. 28-4, the position of the edge of the catchword character train stored in the catchword storage buffer N-2 shown in FIG. 29-2 is decided by the distance from either the edge or back margin. In the next step S12, the content in the catchword storage buffer is converted to the image in response to the character style and character point number defined in the catchword definition section P-III in the definition of format in FIG. 28-4. Due to the above-mentioned processes, the "Catchword" of an arbitrary character style and size can be developed at an arbitrary position of an output medium even in the two-sided printing mode by correcting in accordance with the procedures shown shown at the symmetrical position on the right and left sides of double spread pages (step 12).

On one hand, a plurality of catchwords can be stored in the catchword storage buffer N-2 shown in FIG. 29-2. Different catchwords can be developed in the odd-number and even-number pages by designating the flag train. In addition, either the odd-number or even-number page can be formed as a blank in a similar logic.

[Two-sided Print]

The two-sided print will be further described in detail hereinbelow. As will be understood from the above descriptions of the Nombre and catchword processes, according to the image processing system of the invention, when the type set-up process is executed, the Nombre positions and catchword positions can be symmetrically arranged or the like with respect to the binding margins in the cases of the front and back faces of a recording medium in the two-sided print mode, binding margins upon binding, and double spread pages upon binding. In addition, with regard to the body as well, in the definition of format, the development position is set by a distance from the back margin; therefore, the Nombre and catchword positions can be similarly symmetrically arranged with respect to the binding margin upon binding. Consequently, if data is outputted to a two-sided printer such that the binding margins of the front and back faces coincide, it is possible to obtain the print output which is beautifully finished upon binding. FIG. 29-7 shows a flowchart for such a two-sided print. In step S1 in FIG. 29-7, the document (including image) file is read out from the disk H8 in a similar manner as step S4 in FIG. 20 and step S1 in FIG. 29-1 mentioned above.

In the next step S2, the data in the document buffer N-4 is indicated one by one by the document buffer pointer N-3 in the PMEM in FIG. 29-2 and the beginning of the page is detected. If data exists in the PMEM in the first page, the result of the discrimination in step S2 becomes YES. Assuming that the first page is the odd-number page, the type set-up process of the odd-number page is first executed with respect to the first page in step S3 as shown in FIGS. 29-3 and 29-4. A check is then made in step S4 to see if the second page, namely, the even-number page exists or not by the pointer. If NO, that is, if the printing mode is not the two-sided printing mode, steps S6 and S7 follows and the paper for the odd-number page of a printer (laser beam printer or the like) for two-sided print is fed and the data is outputted. Further, it is NO in step S8 similarly to step S2, so that step S2 follows. If the data of the even-number page exists in step S4, the type set-up process of the even-number page is executed in step S5. The image data for the odd-number page is outputted in steps S6 and S7 in a manner similar to the above. Next, when it is YES in step S8 similarly to step S4, the image data for the even-number page is outputted in steps S9 and S10.

Figure 30:
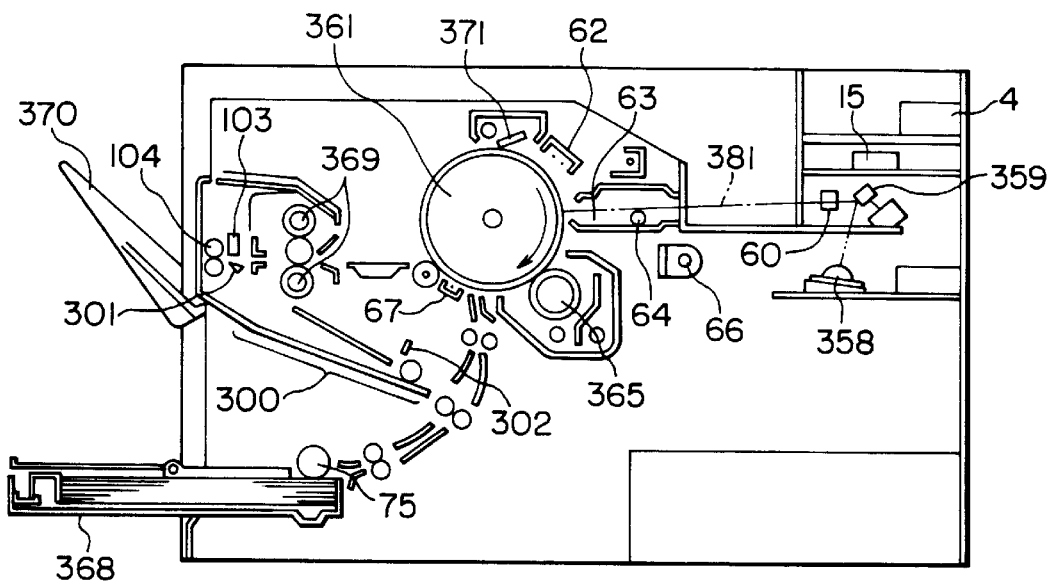
FIG. 30 is a diagram showing an example of a two-sided printer.

FIG. 30 is a cross sectional view of a laser beam printer for the two-sided print. A photosensitive drum 361 is charged by a charging device 62 and is rotating. Data is read out from the memory in response to a print command signal and a beam 381 of a laser generator 358 is modulated through the buffer on the basis of this data. The modulated beam is deflected by a polygon mirror 359 and scans the drum 361 due to the rotation of the drum and the deflection of the beam, thereby forming an electrostatic latent image on the surface of the drum.

The latent image on the drum surface is developed by a developing device 365 and transferred onto a sheet fed from a cassette 368 of the A3 or A4 size. After the sheet was fixed by rollers 369, it is delivered onto a tray 370. The drum 361 is cleaned by a cleaner 371 and used again.

In the two-sided copy mode, the data for the front surface is first outputted from the memory in response to a command of the printer. The latent image is formed on the basis of this data and transferred onto the front surface of a sheet. After the image was fixed, a nail 301 is lifted up to reversely rotate delivery rollers 302, thereby feeding the fixed sheet to an intermediate tray 300 and allowing it to stand by therein without delivering the sheet. Next, the image data for the back surface is read out from the memory under the condition such that a sensor 302 has sensed the presence of the sheet. When the beam scan and image formation are started, the sheet is taken out from the intermediate tray 300 at a predetermined timing and the image is transferred onto the back surface of the sheet. At this time, the nail 301 is depressed to deliver the sheet. Thus, the images are completely printed on both surfaces of the sheet.

As described above, according to the present invention, in a method whereby document and image information is edited and displayed and data is outputted for print or transmission, it is possible to provide an image processing system in which in order to edit and display both images to be printed on the front and back surfaces in connection with each other, the data corresponding to each image can be dependently processed.

In addition, bodies, catchwords, Nombres, etc. can be automatically arranged in consideration of symmetry with respect to the binding margins of both of the right and left pages.

[Headline]

Figure 31:
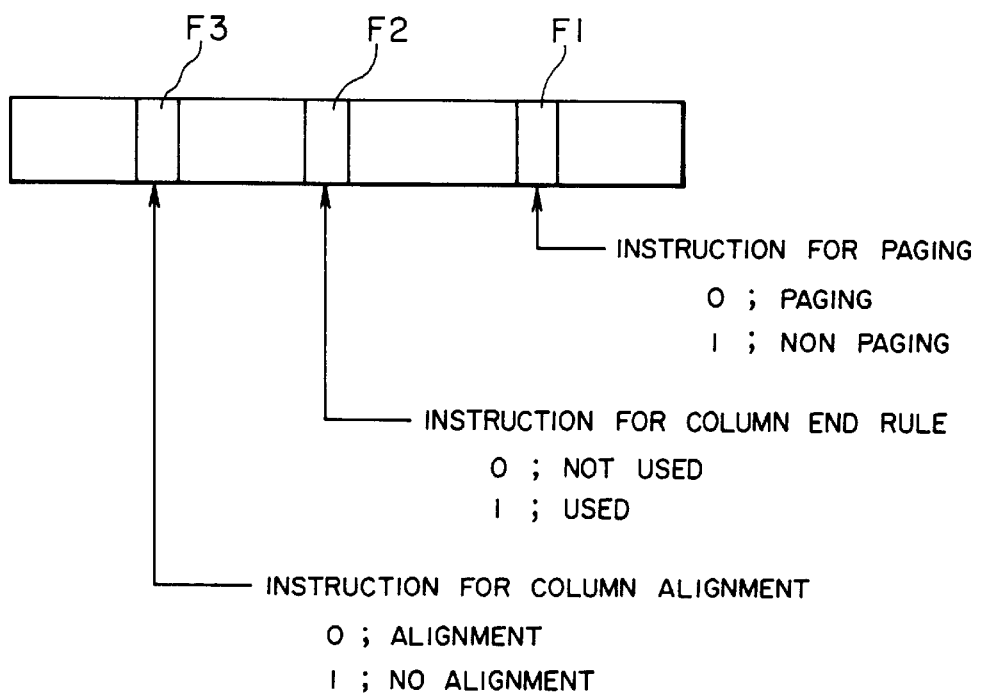
FIG. 31 is an explanatory diagram of a flag train of headline definition.
Figure 32:
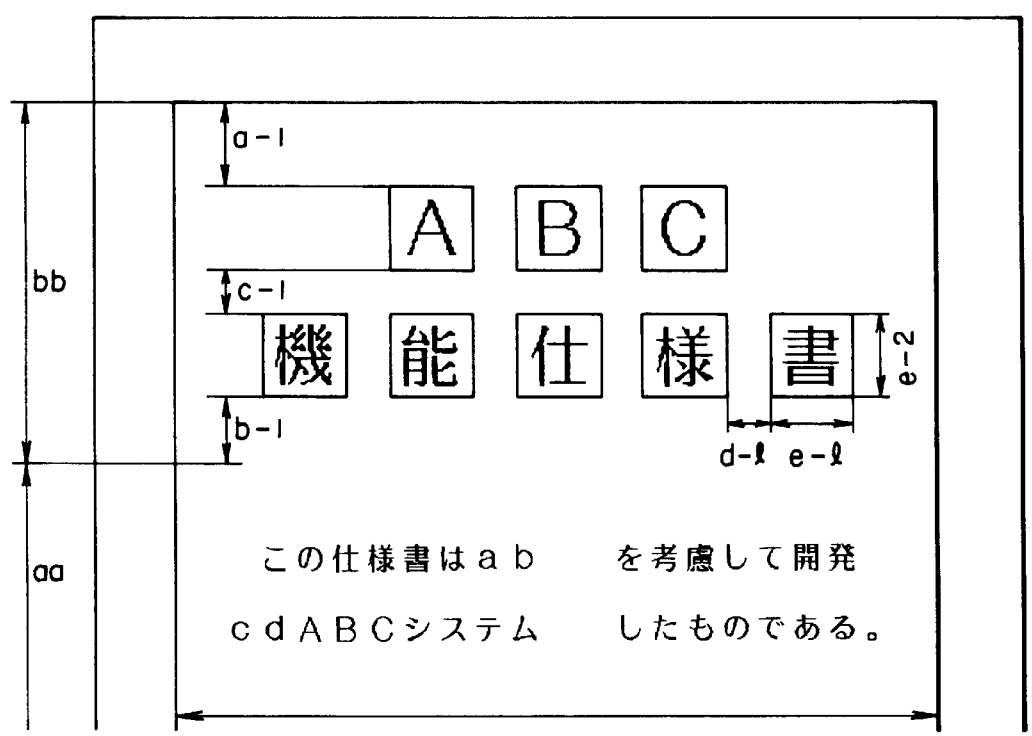
FIG. 32 is a diagram showing the relation among the headlines and the definition items.
Figure 33:
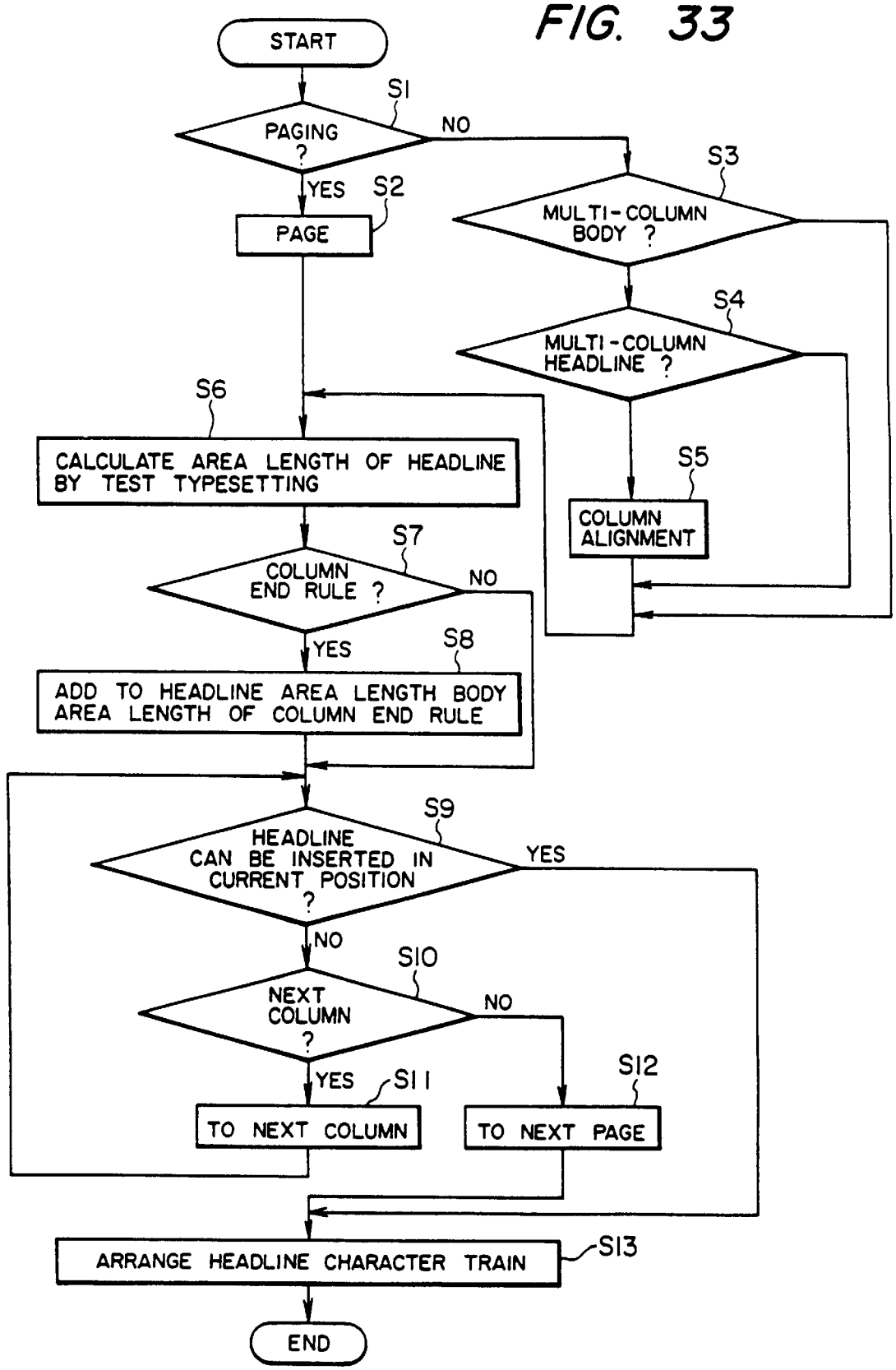
FIG. 33 is a flowchart showing a headline process.

A headline process in the foregoing type set-up process will then be described in detail. First, since the headline process is a function of the foregoing type set-up process, the procedure until the headline process is executed will be explained with reference to FIG. 29-1. The document data read out from the data file H8 in step S1 in FIG. 29-1 is examined by the sentence data pointer on a character unit basis or a plurality-of-character unit basis. A check is made in step S5 to see if the data is the sentence code data or format command. When it is the format command, a check is further made to see what process the command instructs. In the case of the headline command, the headline process is executed in step S8. In this case, the definition of headline must be registered into the document data format section P-2 shown in FIG. 1-3 in accordance with the procedures of the registration, correction, and the like of the formats in items (1), (2), (3) and (4) mentioned before. An example of the definition of headline is shown in FIG. 28-4. In this diagram, the column omission number of the headline characters and the like are defined in the case where the character style, character point number (indicative of the size), space between characters, space between lines, and body are defined as a multi-column body when the headline character train is developed. FIG. 31 shows the details of the flag train in this definition. In FIG. 31, flags F1, F2 and F3 are defined. For example, the flag F1 indicates whether the paging is performed or not in order to always develop the headline character train to the beginning of the page of a recording medium. The flag F2 indicates whether a column end rule process is executed or not. The flag F3 indicates whether a column alignment process is performed or not. FIG. 32 shows an example of the relations among the headline and the items of definition which are developed due to those headline definitions. It will be obviously understood that for the items of the headline definitions, it is possible to delete the unnecessary items or newly add the necessary items in dependence on the characteristic of the image processing system. A flow of the headline process will then be described with reference to FIG. 33. First, in step S1, the "Instruction for Paging" flag F1 in the flag train of the headline definition shown in FIG. 31 is checked. When the paging is instructed, if the present development position is not located at the beginning of the page, a paging process is performed in step S2 to move the development position to the beginning of the next page. When the paging is not instructed, in the case of the multi-column body, the "Column Omission Number" in the headline definition in FIG. 28-4 is likewise checked in step S3. When the column number is two or more and the "Instruction for Column Alignment" flag F3 in the flag train in FIG. 31 indicates "Alignment", a column alignment process of the data immediately before the headline format command is executed in step S4.

Figure 34A:
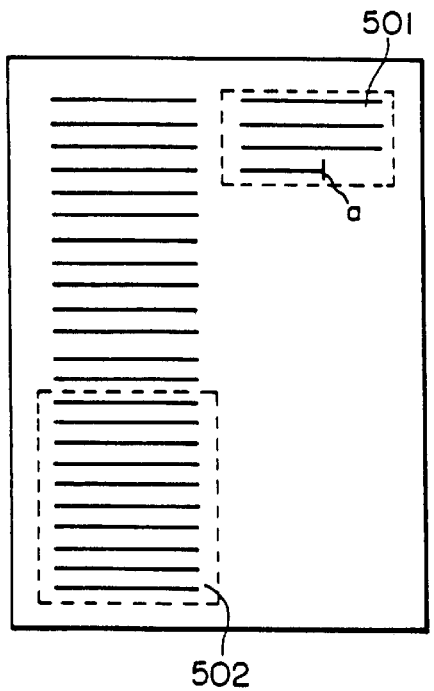
FIGS. 34A and 34B are diagrams showing an example of execution of column alignment.
Figure 34B:
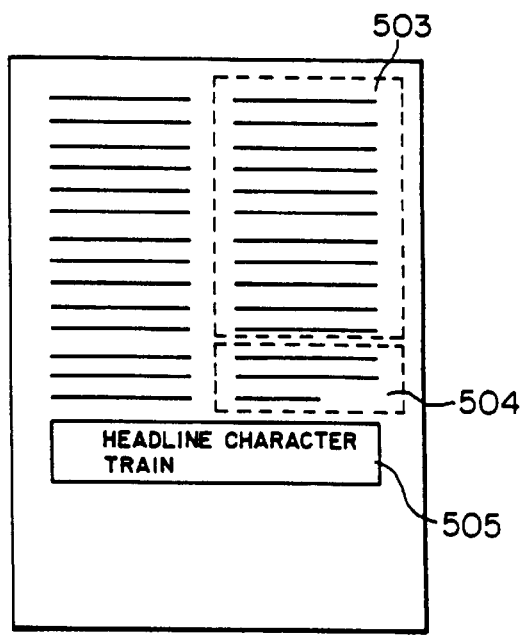
Figure 35:
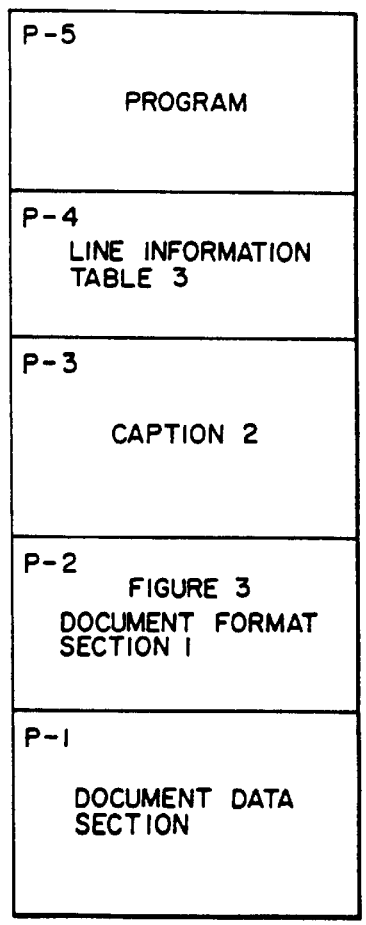

FIG. 34 shows an example of the column alignment process. FIG. 34A shows that the headline format command of two column omission was detected at a point a when the two-column body is being developed. Due to the column alignment process, a section 502 in the first column in FIG. 34A is moved to a right upper section 503 in FIG. 34B and a right upper section 501 in FIG. 34A is moved to a right lower section 504 in FIG. 34B Thus, the bottom edges of the first and second columns of the body are aligned and the headline character train of two column omission indicated at 505 is developed under the first and second columns. Next, a size of the headline area is calculated by the test typesetting in step S6 in FIG. 33. In the example of FIG. 32, the length of headline area is the sum of "Front Space", "Height of Headline Character Train" (depending on the character size, space between lines, space between characters, and length of character train in FIG. 28-4), and "Back Space". In the next step S7, the "Instruction for Column end Rule" flag F2 in the flag train in FIG. 31 in the headline definition is checked. When a column end rule process is instructed, the length necessary to develop the body of the line number of the column end rule of the headline definition in FIG. 28-4 is added to the length of headline area. A check is made in step S9 to see if the headline of the calculated area length can be inserted in the present position or not. If NO, the column or page is changed until the position where the headline can be inserted. In the final step S13, the headline character train is arranged at the position determined in accordance with the character point number (indicative of the size), space between characters, and space between lines specified in the headline definition section in FIG. 28-4. Thereafter, the above-described processes are repeated whenever the "Beginning of Headline" command is detected. However, different from the conventional word processors or type set-up apparatuses, if the headline definition has once been registered in the document data format section P-2 in FIG. 1-3, and if the headline portion and instructions of headline and character train have been inserted in the document data sentence section P-3 in FIG. 1-3 due to a headline format command inserting process by way of the above-described method, the headlines of the same style can be automatically arranged throughout the documents without needing to reset the items in the headline definition. In addition, although an example of one kind of headline has been described in this embodiment, it is possible to form the documents with various kinds of headlines by finely preparing a plurality of format definitions and format commands such as "Big Headline", "Middle Headline", "Subhead", "Level-1 Headline", "Level-2 Headline", etc. In FIG. 32, reference character "aa" denotes a body portion of the sentence; "bb" is a headline portion; "a-1" is a front space; "b-1" a back space; "c-1" a space between lines; "d-1" a space between characters; "e-1" a character width; and "e-2" a height of character.

As described in detail in the above, according to the present invention, it is possible to provide an image processing system in which a headline can be easily set and changed, output information accompanied therewith can be extremely easily corrected, and an image process can be executed at an extremely high speed.

[Caption]

A caption as a function of the type set-up process will then be described. "Caption" denotes an explanatory characters which are written under photographs, pictures, and the like in documents. This caption also indicates the area itself as shown at a reference numeral 107 under the frame in FIG. 37-4, which will be mentioned hereinafter. Similarly to FIG. 1-3, FIG. 35 shows a simple memory map in the PMEM H15 or H16. P-3 indicates a document data second formal section. The control information to handle the input information and the addition information to be added thereto is stored in this second format section P-3. Namely, information as shown in FIG. 36 is stored. A line information table P-4 is used to position data in the memory and on the CRT. For example, (X11, X12, X13, ..., y) data is stored on a line unit basis in the table P-4. Various kinds of flags, for example, frame spacing, body block, and the like are stored in an area P-5. A control program section P-6 is constituted by a ROM to store a fixed program or a RAM to store a program which is loaded from a disk. In this embodiment, the control program section P-6 stores procedures such as shown in, e.g., FIGS. 5, 8, 9, 10, 11, 20, 37-2, 37-5, and 37-7.

In the system constituted as described above, explanation will then be made with respect to the functions regarding formats such as a print style, column set-up style, and the like which are prepared in the document editing apparatus in the image processing system of the invention and with respect to the access to the sentence.

FIG. 20 will be again simply described for explanation of the caption.

The processes in step S12 and subsequent steps will be first described. When the input command in the menu section 100 is the edition command in step S12, each edition command is executed in step S13 and the display processes in steps S14 to S17 are executed and the system waits for a key input. If the input command is the format command, step S18 follows and the format command is executed in step S19. Then, the display processes in steps S14, S15, S16 and S17 are executed and the system again waits for a key input.

If the input command is the lay-out command, step S20 follows and the lay-out command is executed in step S21 and the list of lay-out file is displayed as shown in e.g., FIG. 7.

In FIG. 12, when the icon of the printer is instructed, the processing routine is advanced to steps S22 and S23 and the specified document is printed and outputted by the printer in accordance with the format. In steps S24 and S25, for example, the document is updated as another application and the system waits for a key input.

When the input command is the format command, step S18 follows and the format command is executed in step S19. Then, the type set-up process including the caption process is executed in step S27.

The process in step S20 in FIG. 20 will then be described hereinbelow. Namely, the case where a lay-out command 102 was inputted in step S20 from the command menu shown in the lower portion in FIG. 37-1 will be explained in detail.

Figures 1, 37:
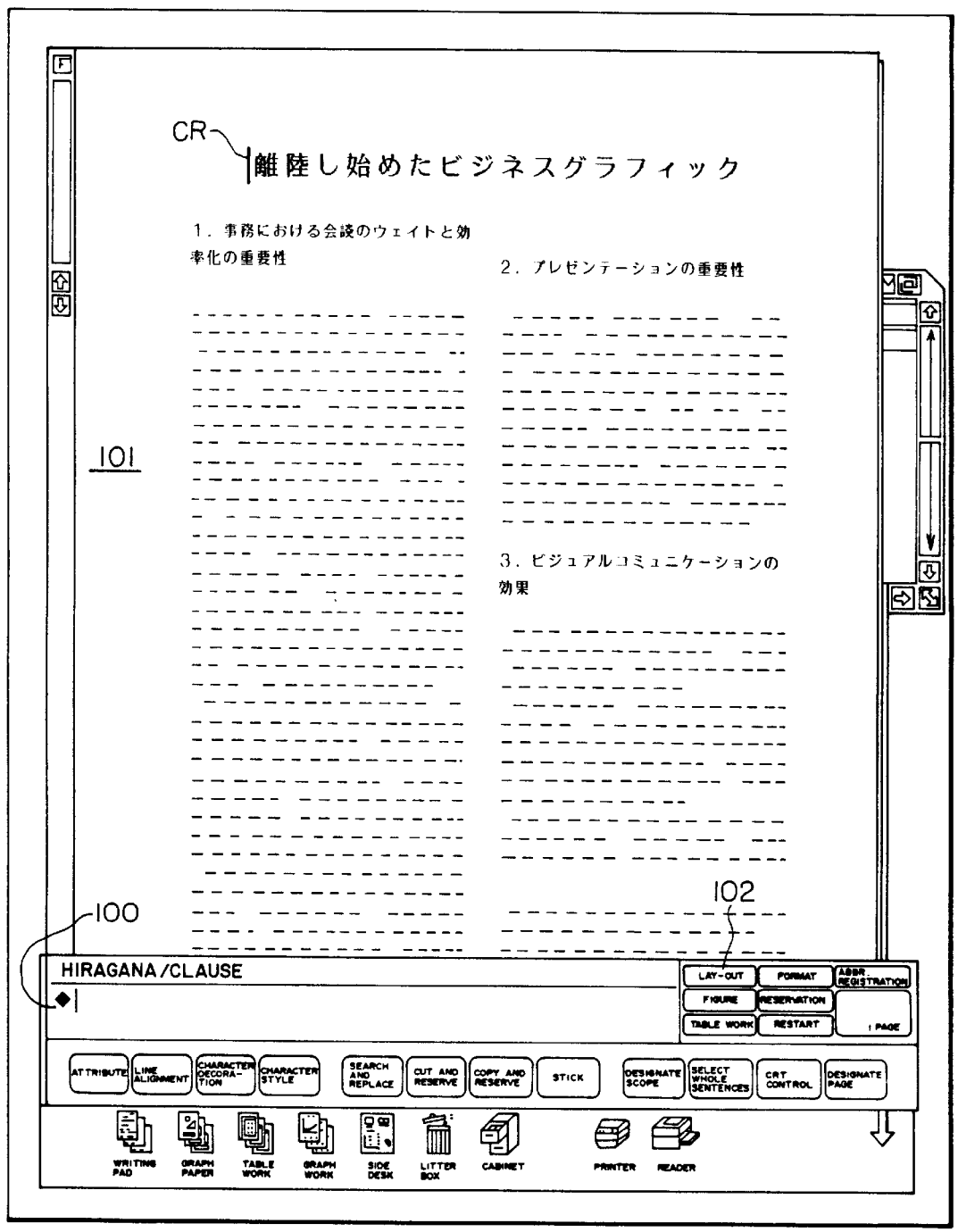
Figures 2, 37:
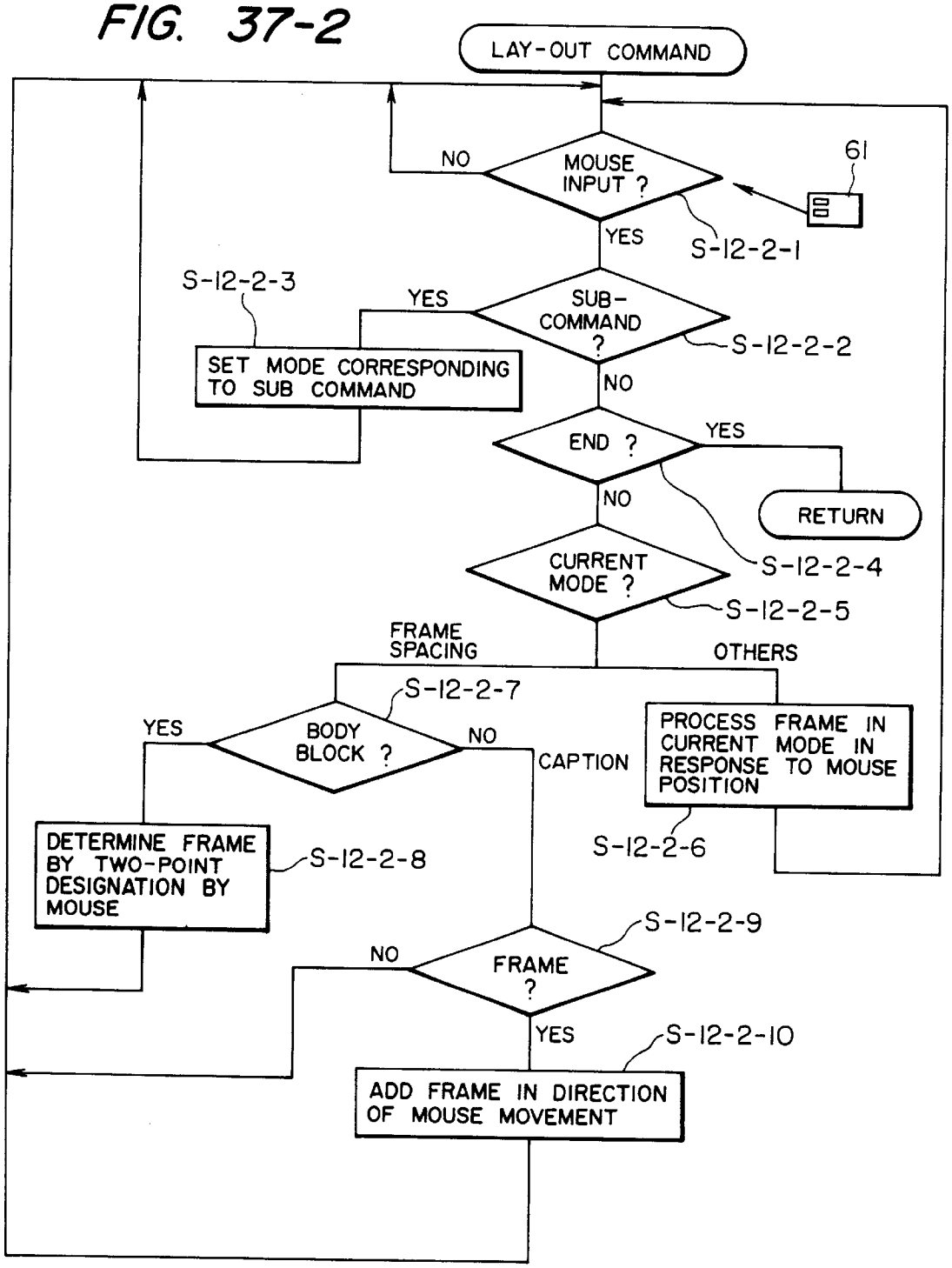
Figures 3, 37:
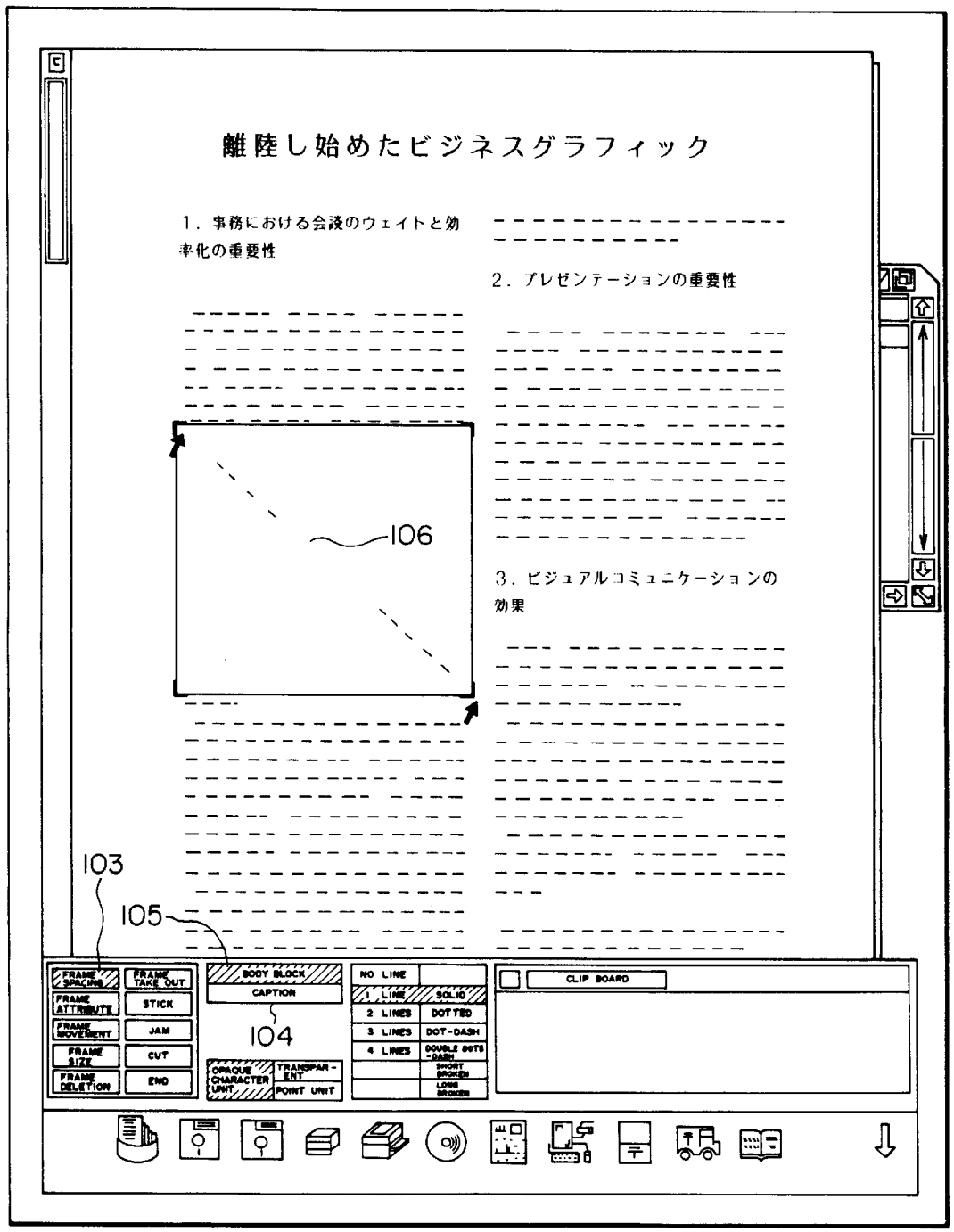
Figures 4, 37:
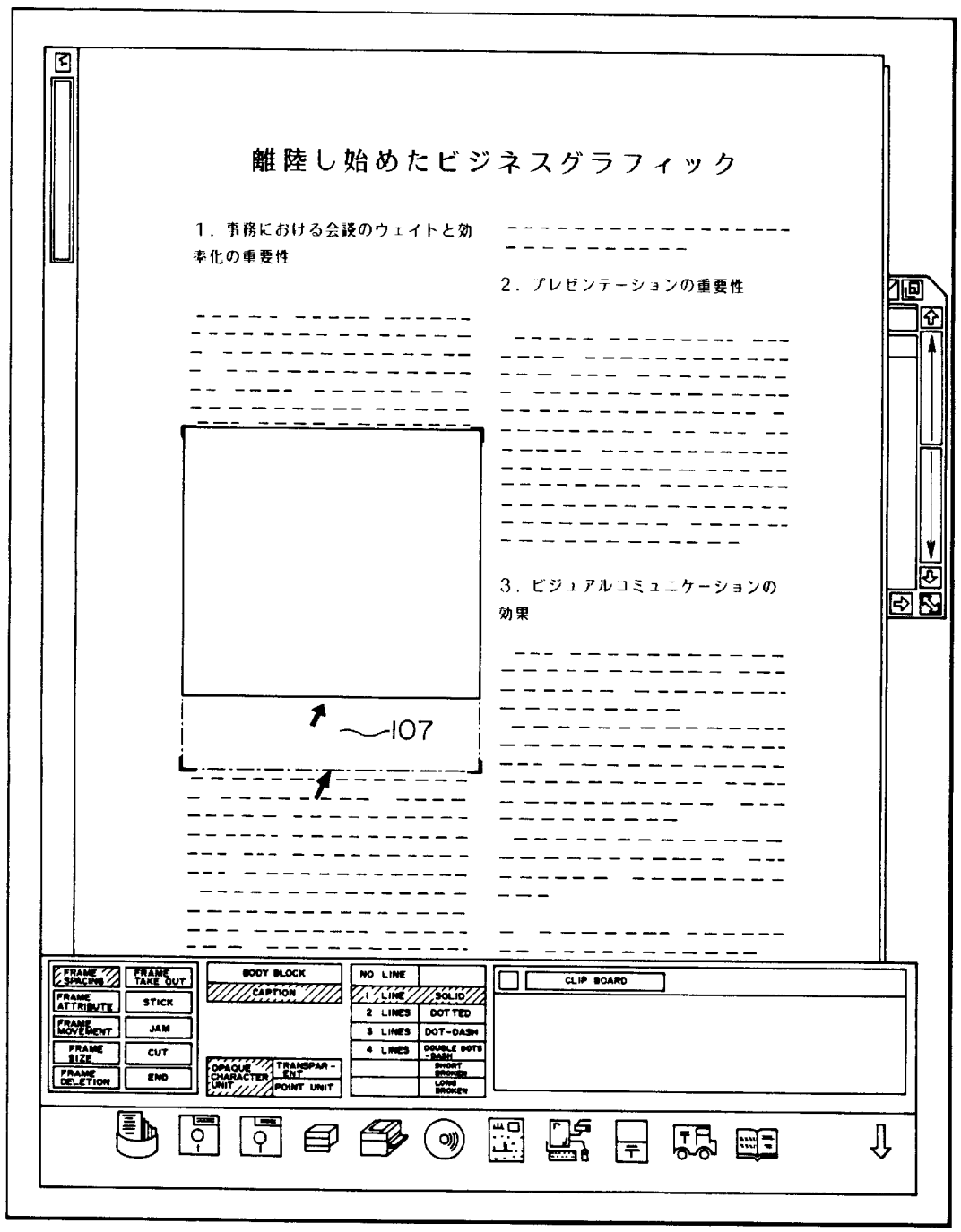
Figures 7, 37:
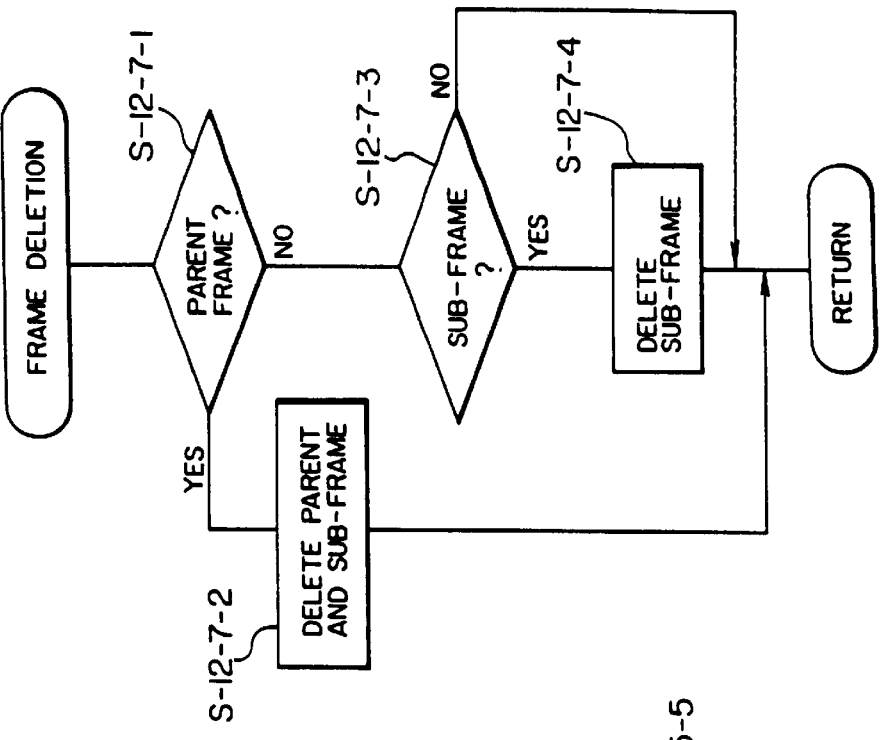
Figures 5, 37:
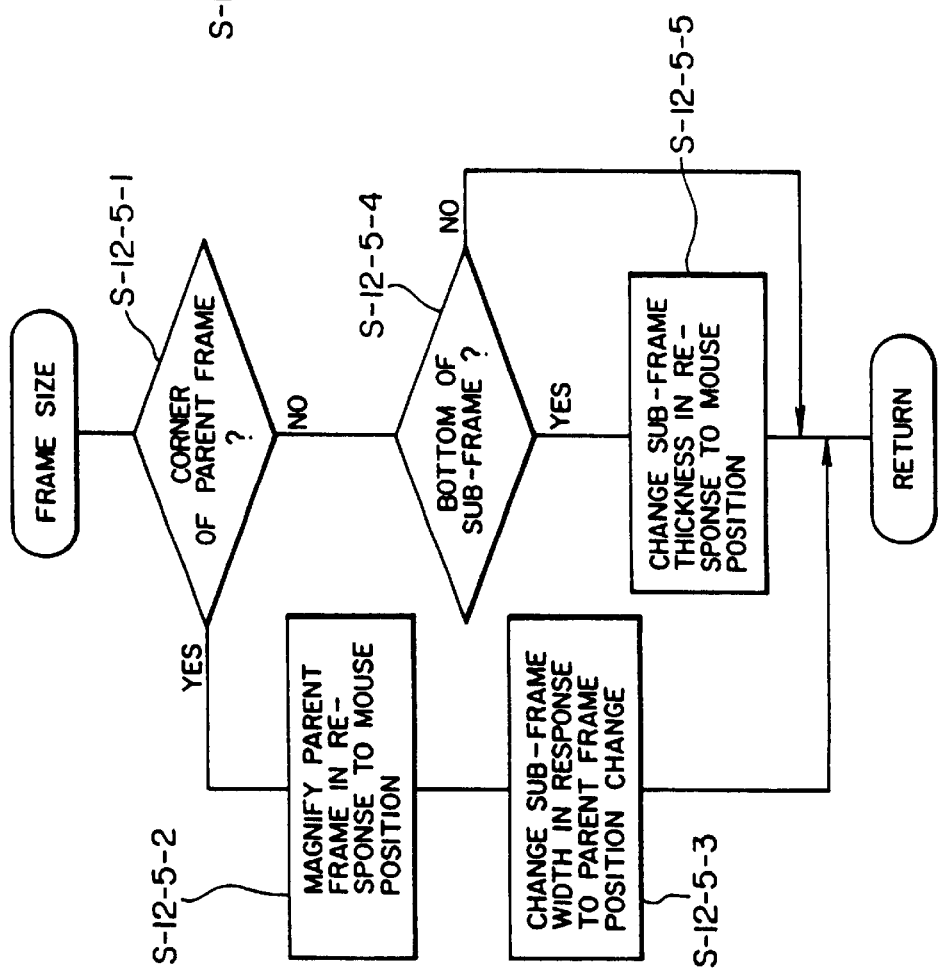
Figure 37:
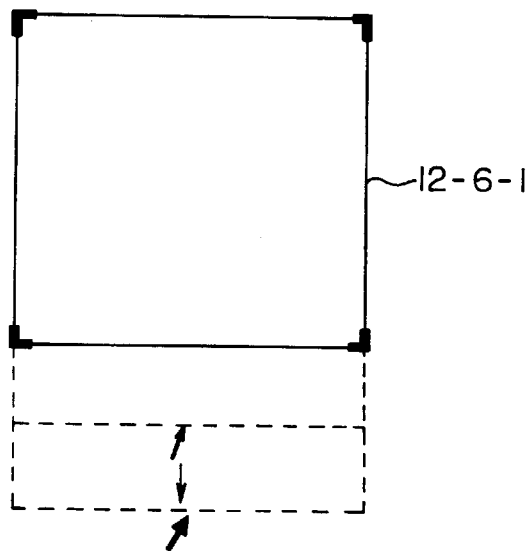
Figure 6:
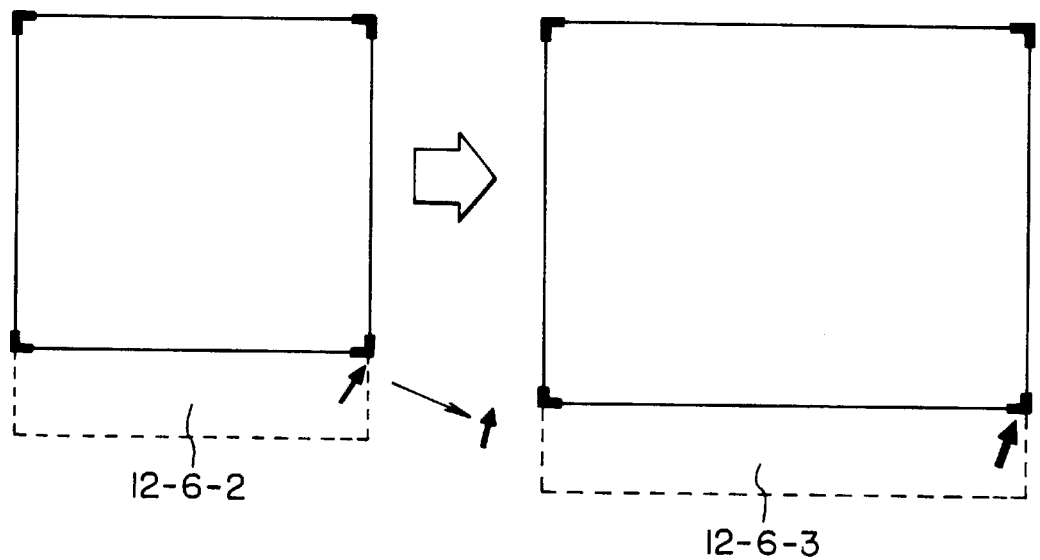

When the lay-out command 102 is instructed, a command menu is displayed on the CRT 38 as shown in FIG. 37-3, so that the process of the lay-out command can be executed.

Referring now to a flowchart for the lay-out command process in FIG. 37-2, a check is made in step S-12-2-1 to see if there is a Mouse input or not. If there is an input by the Mouse 61, a check is made in step S-12-2-2 to see if it is a sub-command or not. If YES, the mode of the sub-command is set in step S-12-2-3. If NO, a check is made to see if the end is instructed or not in step S-12-2-4. If YES, the processing routine is returned to the original state of FIG. 37-1. If NO, it is regarded that the position is being designated by the Mouse 61, so that the process according to the current mode specified is executed. In the case of command modes other than a frame spacing command 103, the cursor is moved on the basis of the position information of the Mouse, and the processes such as movement of the frame, change of the frame size, deletion of the frame, and the like are executed in step S-12-2-6.

In the case of the frame spacing 103, namely, when the frame spacing flag is set, a body block flag and a caption flag are checked in step S-12-2-7 to see if the current frame spacing mode is a body block 105 or a caption 104. If it is the body block 105, one frame is determined by two points indicated by a cursor 106 in step S-12-2-8.

In the case of the caption 104, a check is made to see if the corresponding frame exists at the position indicated by the Mouse or not in step S-12-2-9. If there is the corresponding frame (hereinafter, referred to as a parent frame), a frame is added in the moving direction of the Mouse in step S-12-2-10 as shown in 107 in FIG. 37-4. (The added frame is called a sub-frame.)

The information regarding the parent frame and sub-frame formed in this manner is stored into the second format section P-3. Namely, coordinate data x and y, a width, and a height of the parent frame, and a width of the sub-frame are stored as shown in FIG. 36.

The parent frame and sub-frame are formed as described above. A process for changing the size of the existing frame in step S-12-2-6 in FIG. 37-2 will then be described in detail with reference to FIGS. 37-5 and 37-6. A check is made in step S-12-5-1 to see if the frame specified by the Mouse 61 is the parent frame or sub-frame by the position of the cursor. A check is made to see if the cursor exists within the parent frame by checking the data stored in the second format section P-3 shown in FIG. 36. If it does, the corner of the parent frame is indicated by the cursor of the Mouse as shown at S-12-6-2 in FIG. 37-6, thereafter the position at the right lower end of the parent frame to be changed next is indicated. The parent frame is magnified in response to the position of the cursor moved by the Mouse in step S-12-5-2 in FIG. 37-5 and a predetermined data in FIG. 36 is rewritten. Then, in step S-12-5-3, the data of the sub-frame is rewritten to change the width of sub-frame in response to the width of parent frame.

If NO in step S-12-5-1, a check is made in step S-12-5-4 to see if the cursor is at the bottom of the sub-frame or not. If YES in step S-12-5-4, a thickness of sub-frame is changed in step S-12-5-5 as shown in S-12-6-1 in FIG. 37-6 and the data of the sub-frame is rewritten in accordance with the position of the cursor by the Mouse.

The procedure to delete the existing frame will then be described with reference to FIG. 37-7.

In step S-12-7-1, a check is made to see if the cursor which is controlled by the Mouse exists within the parent frame or not in a manner as mentioned above. If YES, the data representing that the parent frame is unnecessary is written into the second format section P-3 and the process to delete the parent frame and sub-frame is executed.

If the cursor exists within the sub-frame in step S-12-7-3, the data indicating that the sub-frame is unnecessary is written into the second format section P-3 and the sub-frame is deleted in step S-12-7-4.

In execution of the lay-out command for the frame spacing, change of frame size, deletion of the frame, or the like, the text is not displayed again. The text is redisplayed in steps S14 to S17 in FIG. 20.

The frame formed by the lay-out command is displayed as a window in accordance with the specified size at the specified position. The information of the frame is made as a format of the frame in the format files 10 and the format in the frame is determined.

What is claimed is:

1. A character processing apparatus comprising:

character data memory means for storing character data;

display means for displaying a format list comprised of a plurality of format icons, each format icon defining a common format of an entire document and being graphically indicative of a feature of a different one of a plurality of format types for documents;

designation means for permitting designation of one of the format icons in the format list displayed by said display means while at least some of the character data stored in said character data memory means is displayed by said display means;

format editing means for changing the common format defined by one of the format icons;

display control means for controlling said display means to display the character data based on a document format type which corresponds to the format icon designated by said designation means; and control means for associating together the document format type which corresponds to the designated format icon with the character data displayed by said display means upon designation of the one format icon, wherein the control means changes the format of the documents associated with the format icon that is changed by the editing step.

2. An apparatus according to claim 1, wherein said apparatus is comprised of a plurality of data processing devices.

3. An apparatus according to claim 1, wherein the format data includes data for developing images and figures in the document.

4. An apparatus according to claim 1, wherein the format data includes data for defining a body of the document and data for defining peripherals to form the document.

5. An apparatus according to claim 1, wherein the format data includes data which represents positions of backmargin, head, edge and tail.

6. An apparatus according to claim 1, wherein said apparatus executes its operation by a provided program.

7. An apparatus according to claim 1, wherein said character data memory means is constructed by a RAM.

8. An apparatus according to claim 1, wherein the plurality of format data is stored in a hard disc.

9. An apparatus according to claim 1, wherein said character data memory means also stores data for forming new paragraphs and for forming new pages.

10. An apparatus according to claim 1, wherein said designation means is constructed by a keyboard.

11. An apparatus according to claim 1, wherein said control means executes its associating operation by replacing the format data corresponding to the character data with the designated format data.

12. An apparatus according to claim 1, wherein said memory means comprises a hard disk.

13. A method of character processing in a character processing apparatus, which includes a memory for storing character data in a character data memory, the method comprising the steps of:

displaying a format list comprised of a plurality of format icons, each format icon defining a common format of an entire document and being graphically indicative of a feature of a different one of a plurality of format types for documents;

designating one of the format icons in the displayed format list while at least some of the stored character data is displayed;

editing the common format defined by one of the format icons;

controlling the display of character data so that the character data is displayed based on a document format type which corresponds to the format icon designated in said designating step; and combining the stored character data with one of the plurality of document format types which corresponds to the designated format icon with the character data displayed by said display step upon designation of the one format icon, wherein the combining step changes the format of the documents associated with the format icon that is changed by the editing step.

14. A method according to claim 13, wherein the step of storing format data includes the step of storing data for developing images and figures in the document.

15. A method according to claim 13, wherein the step of storing format data includes the step of defining document body data and defining peripheral data for forming the document.

16. A method according to claim 13, wherein the step of storing format data includes the step of storing data representing positions of backmargin, head, edge and tail.

17. A method according to claim 13, wherein the step of storing format data includes the step of storing data representing a paper size, direction of a paper, and vertical/horizontal writing.

18. A method according to claim 13, further comprising the step of executing a provided program.

19. A method according to claim 13, wherein the character data is stored in a RAM.

20. A method according to claim 13, wherein said character processing is performed by a plurality of devices.

21. A method according to claim 13, wherein the plurality of format data are stored in a hard disc.

22. A method according to claim 13, wherein the step of storing character data includes the step of storing data for forming new paragraphs and for forming new pages.

23. A method according to claim 13, wherein said designating step receives input from a keyboard.

24. A method according to claim 13, further comprising the step of executing an associating operation by replacing the format data which corresponds to the character data with the designated format data.

25. A document processing apparatus comprising:

input means for inputting format information indicated by document format type using a displayed layout image;

memory means for storing the format information input by said input means;

control means for controlling a display device to display a format list comprised of a plurality of format icons, each format icon defining a common format of an entire document and being graphically indicative of a feature of a different one of a plurality of format types for documents, on the basis of the format information stored in said memory means; and format editing means for changing the common format defined by one of the format icons, wherein the control means changes the format of the documents associated with the format icon that is changed by the format editing means.

26. An apparatus according to claim 25, said memory means stores a plurality of pieces of the format information.

27. An apparatus according to claim 25, wherein said control means controls the display device to also display the name information indicative of the displayed format information.

28. An apparatus according to claim 25, wherein said control means controls the display device to also display numeral information indicative of the displayed format information.

29. A document processing apparatus comprising:

input means for inputting format information indicative of a document format type;

memory means for storing the format information input by said input means;

control means for controlling a display device to display a format list of a plurality of format icons, each format icon defining a common format of an entire document and being graphically indicative of a feature of a different one of a plurality of format types for documents, on the basis of a plurality of format types for documents, on the basis of the format information stored in said memory means, wherein said control means (1) controls a display device to display a layout image corresponding to a format icon selected from the plurality of displayed format icons and (2) changes the document format type by changing the displayed layout image and wherein the control means further controls the memory means to store the format information indicative of the document format type changed by said control means;

format editing means for changing the common format defined by one of the format icons; and changing means for changing the selected format icon in response to the change of the layout image, wherein the changing means changes the format of the documents associated with the format icon that is charged by the format editing means.

30. An apparatus according to claim 29, wherein said input means comprises a pointing device.

31. An apparatus according to claim 29, wherein the format information indicates an area in which document information is input.

32. An apparatus according to claim 29, wherein the format information comprises column setting information.

33. A document processing apparatus comprising:

first memory means for storing a plurality of format information indicative of a plurality of document format types;

second memory means for storing document information;

display means for displaying the document information stored in said second memory means in a designated one of the plurality of stored format information, wherein said display means displays a format list comprised of a plurality of format icons, each format icon defining a common format of an entire document and being graphically indicative of a feature of a different one of a plurality of format types for documents, such that the format list overlaps onto the displayed document information;

format editing means for changing the common format defined by one of the format icons; and control means for controlling, in a case where one of the plurality of format icons is designated while the document information is being displayed, said display means to display the document information in one of the plurality of document format types corresponding to the designated format icon, wherein the control means further controls the first memory means to store the document information displayed by said display means in correspondence to the format information indicative of the one document format type corresponding to the designated format icon, and wherein the control means changes the format of the documents associated with the format icon that is changed by the format editing means.

34. A document processing apparatus which can set a specific area, at a desired position of document information to be output, which moves in accordance with an editing process of the document information, said apparatus comprising:

setting means for setting an output position of an area accompanying the specific area in a relative position to a position of the specific area;

instruction means for providing an instruction for performing an editing process; and editing means for editing said accompanying area in response to said instruction means providing an instruction for performing the editing process in the accompanying area and for editing said specific area and said accompanying area in response to said instruction means providing an instruction for performing the editing process in the specific area, wherein an instruction to edit the specific area will instruct the editing means to edit both the specific area and the accompanying area and an instruction to edit the accompanying area will solely edit the accompanying area.

35. An apparatus according to claim 34, wherein said instruction means provides an instruction for deleting the document information.

36. An apparatus according to claim 34, wherein said instruction means provides an instruction for enlarging the document information.

37. A document processing apparatus which can set a specific area, at a desired position of document information to be displayed on a screen, which moves in accordance with an editing process of the document information, said apparatus comprising:

setting means for setting a display position of an area accompanying the specific area in a relative position to a position of the specific area;

instruction means for providing an instruction for performing an editing process; and editing means for editing said accompanying area in response to said instruction means providing an instruction for performing the editing process in the accompanying area and for editing said specific area and said accompanying area in a response to said instruction means providing an instruction for performing the editing process in the specific area, wherein an instruction to edit the specific area will instruct the editing means to edit both the specific area and the accompanying area and an instruction to edit the accompanying area will solely edit the accompanying area.

38. An apparatus according to claim 37, further comprising means for instructing deletion of an area, wherein when said instruction means instructs deletion of the specific area, the specific area and the area accompanying the specific area are deleted.

39. An apparatus according to claim 37, wherein said instruction means provides an instruction for deleting the document information.

40. An apparatus according to claim 37, wherein said instruction means provides an instruction for enlarging the document information.

41. A document processing method, the method comprising the steps of:

inputting format information indicated by document format type using a displayed layout image;

storing the format information input in said input step;

editing the common format defined by one of the format icons; and controlling a display device to display a format list comprised of a plurality of format icons, each format icon defining a common format of an entire document and being graphically indicative of a feature of a different one of a plurality of format types for documents, on the basis of the stored format information, wherein the combining step changes the format of the documents associated with the format icon that is changed by the format editing means.

42. A document processing method, the method comprising the steps of:

inputting format information indicative of a document format type;

storing the format information input in said input step;

controlling a display device to display a format list of a plurality of format icons, each format icon defining a common format of an entire document and being graphically indicative of a feature of a different one of a plurality of format types for documents, on the basis of the stored format information, wherein, in said control step, (1) a display device is controlled to display a layout image corresponding to a format icon selected from the plurality of displayed format icons and (2) document format type is changed by changing the displayed layout image;

editing the common format defined by one of the format icons; and changing the selected format icon in response to the change of the layout image, wherein, in the control step, the format information indicative of the document format type changed in said control step is stored in a memory; and wherein the changing step changes the format of the documents associated with the format icon that is changed by the editing step.

43. A document processing method, the method comprising the steps of:

a first step of storing a plurality of format information indicative of a plurality of document format types;

a second step of storing document information;

displaying the document information stored in said second step in a designated one of the plurality of stored format information, wherein, in said display step, a format list comprised of a plurality of format icons is displayed, each format icon defining a common format of an entire document and being graphically indicative of a feature of a different one of a plurality of format types for documents, such that the format list overlaps onto the displayed document information;

editing the common format defined by one of the format icons; and controlling, in a case where one of the plurality of format icons is designated while the document information is being displayed, said display step to display the document information in one of the plurality of document format types corresponding to the designated format icon, wherein, in the control step, the first step of storing is controlled to store the document information displayed in said display step in correspondence to the format information indicative of the one document format type corresponding to the designated format icon, and wherein the combining step changes the format of the documents associated with the format icon that is changed by the format editing means.

44. A document processing method which can set a specific area, at a desired position of document information to be output, which moves in accordance with an editing process of the document information, said method comprising the steps of:

setting an output position of an area accompanying the specific area in a relative position to a position of the specific area;

designating an editing process; and an editing step for editing said accompanying area in response to said designating step providing a designation for performing an editing process in the accompanying area and for editing said specific area and said in response to said designation step providing a designation for performing an editing process in the specific area, wherein a designation to edit the specific area will edit both the specific area and the accompanying area and a designation to edit the accompanying area will solely edit the accompanying area.

45. A document processing method which can set a specific area, at a desired position of document information to be displayed on a screen, which moves in accordance with an editing process of the document information, said method comprising the steps of;

setting a display position of an area accompanying the specific area in a relative position to a position of the specific area;

designating an editing process; and an editing step for editing said accompanying area in response to said designating step providing a designation for performing an editing process in the accompanying area and for editing said specific area and said accompanying area in response to said designation step providing a designation for performing an editing process in the specific area, wherein a designation to edit the specific area will edit both the specific area and the accompanying area and a designation to edit the accompanying area will solely edit the accompanying area.

* * * * *

UNITED STATES PATENT AND TRADEMARK OFFICE
CERTIFICATE OF CORRECTION

PATENT NO.    : 6,324,554 B1
DATED         : November 27, 2001
INVENTOR(S)   : Yasuhiro Watanabe et al.

It is certified that error appears in the above-identified patent and that said Letters Patent is hereby corrected as shown below:

Column 13,
Line 34, "which making" should read -- which makes --.

Column 16,
Line 29, "an" should read -- and --; and
Line 41, "sticked." should read -- stuck. --.

Column 17,
Lines 45 and 59, "sticked" should read -- stuck --; and
Line 61, "acrried" should read -- carried --.

Column 20,
Line 26, "described" should read -- describe --.

Column 21,
Line 8, "Catchword" should read -- Catchword" --; and
Line 65, "shown" (second occurrence) should be deleted.

Column 22,
Line 51, "cross sectional" should read -- cross-sectional --.

Column 24,
Line 19, "FIG. 34B" should read -- FIG. 34B. --.

UNITED STATES PATENT AND TRADEMARK OFFICE
CERTIFICATE OF CORRECTION

PATENT NO.     : 6,324,554 B1
DATED          : November 27, 2001
INVENTOR(S)    : Yasuhiro Watanabe et al.

It is certified that error appears in the above-identified patent and that said Letters Patent is hereby corrected as shown below:

Column 32,
Line 36, "said" (second occurrence) should read -- said accompanying area --; and
Line 48, "of;" should read -- of: --.

Signed and Sealed this

Seventeenth Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.     : 6,324,554 B1
DATED          : November 27, 2001
INVENTOR(S)    : Yasuhiro Watanabe et al.

It is certified that error appears in the above-identified patent and that said Letters Patent is hereby corrected as shown below:

<u>Title page,</u>
Item [75], Inventors, "Masaka Hamada" should read -- Masaki Hamada --.

Signed and Sealed this

Eleventh Day of March, 2003

JAMES E. ROGAN
*Director of the United States Patent and Trademark Office*